US010394500B2

(12) United States Patent
Nakajima et al.

(10) Patent No.: US 10,394,500 B2
(45) Date of Patent: Aug. 27, 2019

(54) INFORMATION PROCESSING SYSTEM AND APPLICATION INSTALLATION METHOD

(71) Applicants: Masato Nakajima, Kanagawa (JP); Hiroyuki Matsushima, Kanagawa (JP)

(72) Inventors: Masato Nakajima, Kanagawa (JP); Hiroyuki Matsushima, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/666,679

(22) Filed: Aug. 2, 2017

(65) Prior Publication Data
US 2018/0039453 A1 Feb. 8, 2018

(30) Foreign Application Priority Data

Aug. 5, 2016 (JP) .................................. 2016-154556
Nov. 14, 2016 (JP) .................................. 2016-221718

(51) Int. Cl.
*H04N 21/262* (2011.01)
*G06F 3/12* (2006.01)
(Continued)

(52) U.S. Cl.
CPC ............ *G06F 3/123* (2013.01); *G06F 3/1205* (2013.01); *G06F 3/1222* (2013.01);
(Continued)

(58) Field of Classification Search
USPC ......... 358/1.1–3.29; 717/100, 101, 120, 121, 717/127, 131, 163–178
See application file for complete search history.

(56) References Cited

U.S. PATENT DOCUMENTS 7,818,585 B2 * 10/2010 Kilian-Kehr ............ G06F 21/10
705/59
8,739,123 B2 * 5/2014 Appleton ............... G06Q 30/02
717/120
(Continued)

FOREIGN PATENT DOCUMENTS

JP       2011-018133      1/2011
JP       2014-164743      9/2014
JP       2015-121919      7/2015

OTHER PUBLICATIONS

U.S. Appl. No. 15/440,632, filed Feb. 23, 2017.
U.S. Appl. No. 15/455,514, filed Mar. 10, 2017.

*Primary Examiner* — Marcellus J Augustin
(74) *Attorney, Agent, or Firm* — IPUSA, PLLC

(57) ABSTRACT

An information processing system includes an information processing apparatus; and an electronic device. The information processing apparatus executes a process including managing configuration information required for installing an application in the electronic device, the configuration information including a list of applications to be installed, license information required for installing the application, and status information of the configuration information, managed in association with each other, the status information indicating a status before execution of the configuration information is reserved or a status in which execution of the configuration information is reserved; and storing the application. The electronic device executes a process including acquiring, from the information processing apparatus, the configuration information for which the status information is indicating the status in which execution of the configuration information is reserved; and installing, in the electronic device, the application acquired from the information processing apparatus according to the acquired configuration information.

19 Claims, 63 Drawing Sheets

(51) Int. Cl.
*G06F 21/10* (2013.01)
*H04N 1/00* (2006.01)

(52) U.S. Cl.
CPC .......... *G06F 3/1254* (2013.01); *G06F 3/1288* (2013.01); *G06F 21/10* (2013.01); *H04N 1/00* (2013.01)

(56) References Cited

U.S. PATENT DOCUMENTS

| | | | | |
|---|---|---|---|---|
| 8,745,617 | B1* | 6/2014 | Stekkelpak | G06F 9/44505 717/173 |
| 8,930,910 | B2 | 1/2015 | Watanabe | |
| 8,989,850 | B2* | 3/2015 | Balda | A61B 5/0006 600/509 |
| 2001/0001147 | A1* | 5/2001 | Hutchison | G06Q 20/04 705/51 |
| 2007/0113066 | A1* | 5/2007 | Samba | G06F 8/61 713/1 |
| 2010/0233996 | A1* | 9/2010 | Herz | H04L 63/08 455/411 |
| 2011/0134459 | A1* | 6/2011 | Funane | G06F 3/0619 358/1.14 |
| 2016/0132314 | A1* | 5/2016 | Solsona-Palomar | G06F 8/65 717/172 |

\* cited by examiner

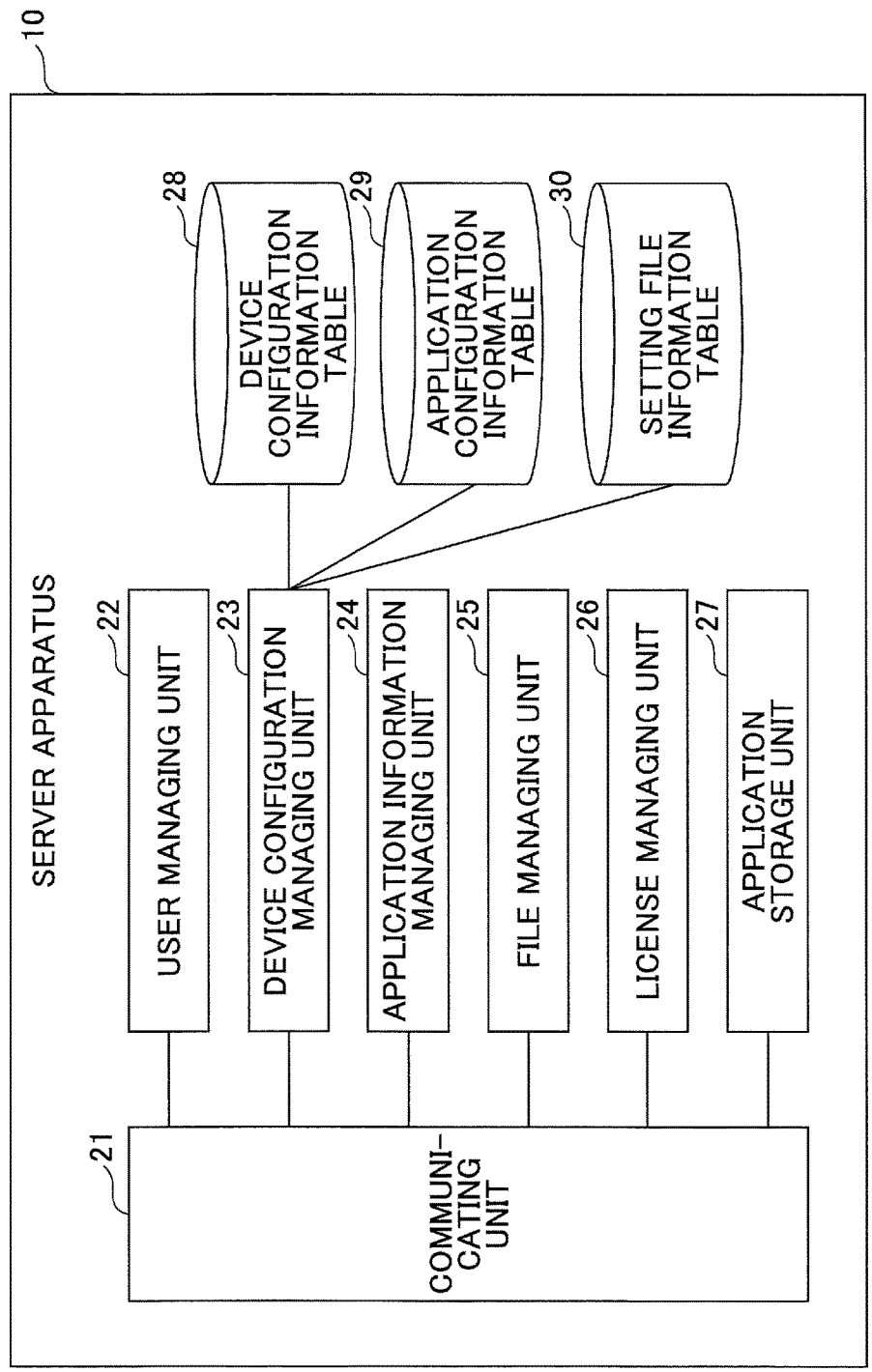

FIG.5

| TENANT ID | DEVICE CONFIGURATION INFORMATION ID | DEVICE NUMBER | GENERATION INFORMATION | STATUS | DESCRIPTION |
|---|---|---|---|---|---|
| Tenant1 | Conf_0000001 | Dev_000001 | Current | COMPLETED | A WING |
| Tenant1 | Conf_9000001 | Dev_000001 | Previous | COMPLETED | A WING |
| Tenant1 | Conf_0000002 | Dev_000002 | Current | COMPLETED | B WING |
| Tenant2 | Conf_0000003 | | | PREPARATION COMPLETED | 1F |
| Tenant3 | Conf_0000004 | | | PREPARATION COMPLETED | GENERAL AFFAIRS DEPARTMENT |
| Tenant3 | Conf_0000005 | | | PREPARATION COMPLETED | SALES DEPARTMENT |

DEVICE NUMBER: BLANK BEFORE DEVICE REGISTRATION,
DEVICE NUMBER IS STORED AT THE TIME OF DEVICE REGISTRATION
STATUS: PREPARATION IN PROGRESS (NotReady) →PREPARATION COMPLETED (Ready) →
EXECUTION SCHEDULED (Scheduled) →EXECUTION IN PROGRESS (SyncStarted) →COMPLETED (Synced)

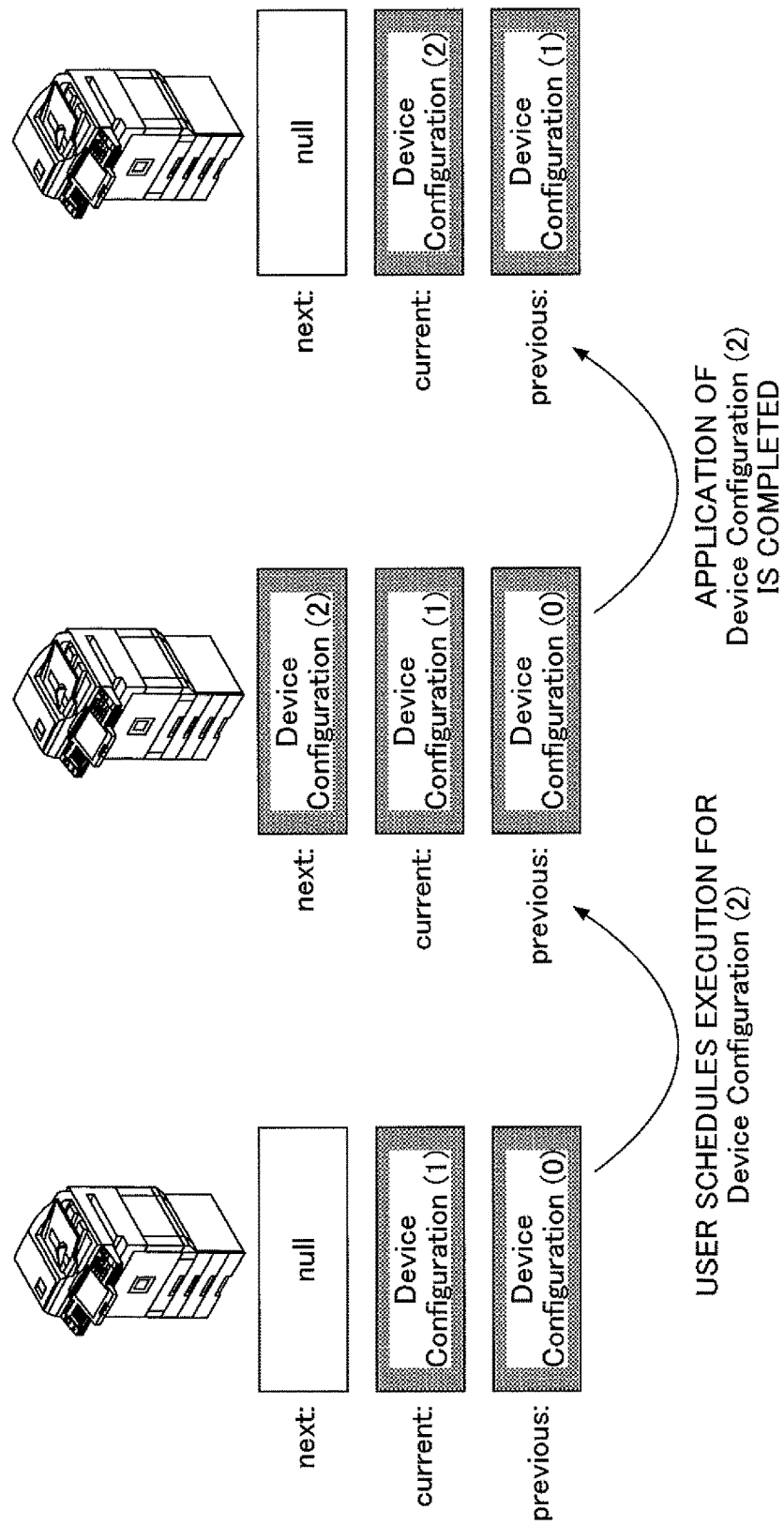

FIG.8

| DEVICE CONFIGURATION INFORMATION ID | APPLICATION ID | LICENSE KEY | STATUS |
|---|---|---|---|
| Conf_0000001 | FreeApp_001 | Lic_001_999999 | COMPLETED |
| Conf_0000002 | FreeApp_001 | Lic_001_999999 | COMPLETED |
| Conf_0000003 | FreeApp_001 | Lic_001_999999 | PREPARATION COMPLETED |
| Conf_0000003 | PaidApp_002 | Lic_002_000001 | PREPARATION COMPLETED |
| Conf_0000004 | FreeApp_001 | Lic_001_999999 | PREPARATION COMPLETED |
| Conf_0000005 | FreeApp_001 | Lic_001_999999 | PREPARATION COMPLETED |
| Conf_0000005 | PaidApp_002 | Lic_002_000002 | PREPARATION COMPLETED |
| Conf_9000001 | FreeApp_001 | Lic_001_999999 | COMPLETED |

FIG.9

| DEVICE CONFIGURATION INFORMATION ID | SETTING FILE | STATUS |
|---|---|---|
| Conf_0000001 | Prefs_0000001.xml | COMPLETED |
| Conf_0000002 | Prefs_0000002.xml | COMPLETED |
| Conf_0000003 | Prefs_0000003.xml | PREPARATION COMPLETED |
| Conf_9000001 | Prefs_0000001.xml | COMPLETED |

FIG.14

DEVICE CONFIGURATION INFORMATION
MANAGEMENT TOOL

LOG IN

USER ID

PASSWORD

LOG IN

FIG.15

DEVICE CONFIGURATION INFORMATION
MANAGEMENT TOOL

SELECT TENANT

TENANT ID

OPEN

FIG.16

DEVICE CONFIGURATION INFORMATION MANAGEMENT TOOL

TENANT: Tenant1

NEWLY CREATE

| DEVICE CONFIGURATION INFORMATION ID | DEVICE NUMBER | STATUS | DESCRIPTION | APPLICATION | SETTING | OPERATION |
|---|---|---|---|---|---|---|
| Conf_0000001 | Dev_000001 | COMPLETED | A WING | FreeApp_001 | DISPLAY | COPY |
| Conf_0000002 | Dev_000002 | COMPLETED | B WING | FreeApp_001 | DISPLAY | COPY |

FIG.19

DEVICE CONFIGURATION INFORMATION MANAGEMENT TOOL

TENANT: Tenant2

NEWLY CREATE

| DEVICE CONFIGURATION INFORMATION ID | DEVICE NUMBER | STATUS | DESCRIPTION | APPLICATION | SETTING | OPERATION |
|---|---|---|---|---|---|---|
| Conf_0000003 | | PREPARATION IN PROGRESS | 1F | [REGISTER] | [REGISTER] | COPY |

FIG.22

DEVICE CONFIGURATION INFORMATION MANAGEMENT TOOL

TENANT: Tenant2

NEWLY CREATE

| DEVICE CONFIGURATION INFORMATION ID | DEVICE NUMBER | STATUS | DESCRIPTION | APPLICATION | SETTING | OPERATION |
|---|---|---|---|---|---|---|
| Conf_0000003 | | PREPARATION COMPLETED | 1F | FreeApp_001<br>PaidApp_002 | [REGISTER] | [SCHEDULE] [COPY] |

FIG.24

DEVICE CONFIGURATION INFORMATION MANAGEMENT TOOL

TENANT: Tenant2

NEWLY CREATE

| DEVICE CONFIGURATION INFORMATION ID | DEVICE NUMBER | STATUS | DESCRIPTION | APPLICATION | SETTING | OPERATION |
|---|---|---|---|---|---|---|
| Conf_0000003 | | PREPARATION COMPLETED | 1F | FreeApp_001 PaidApp_002 | DISPLAY/ CORRECT | SCHEDULE COPY |

FIG.25

DEVICE CONFIGURATION INFORMATION MANAGEMENT TOOL

TENANT: Tenant2

NEWLY CREATE

| DEVICE CONFIGURATION INFORMATION ID | DEVICE NUMBER | STATUS | DESCRIPTION | APPLICATION | SETTING | OPERATION |
|---|---|---|---|---|---|---|
| Conf_0000003 | | EXECUTION SCHEDULED | 1F | FreeApp_001 PaidApp_002 | DISPLAY | RELEASE SCHEDULING  COPY |

FIG. 28A
```
GET /device/configs?deviceId=Dev_0000003?status=EXECUTION SCHEDULED HTTP/1.1
Host: www.example.com
Cookie: authTicket="xxxxxxxxx"
```

FIG. 28B
```
HTTP/1.1 200 OK
Content-Type: application/json; charset=UTF-8

[
  {
    "tenantId" : "Tenant2",
    "configId" : "Conf_0000003",
    "deviceId" : "",
    "status" : "EXECUTION SCHEDULED",
    "description" : "1F",
    "apps" : [
      { "appId" : "FreeApp_001", "licenseKey" : "Lic_001_999999" },
      { "appId" : "PaidApp_002", "licenseKey" : "Lic_002_000001" }
    ],
    "prefs" : "http://www.example.com/device/configs/Conf_0000003/Prefs_0000003.xml"
  }
]
```

FIG.29

DEVICE CONFIGURATION APPLICATION

| DESCRIPTION | APPLICATION | SETTING | START INSTALLATION |
|---|---|---|---|
| 1F | FreeApp_001<br>PaidApp_002 | DISPLAY | INSTALL |

FIG.30

```
HTTP/1.1 200 OK
Content-Type: application/json; charset=UTF-8

[
  {
    "tenantId" : "Tenant3",
    "configId" : "Conf_0000004",
    "deviceId" : "",
    "status" : "EXECUTION SCHEDULED",
    "description" : "GENERAL AFFAIRS DEPARTMENT",
    "apps" : [
      { "appId" : "FreeApp_001", "licenseKey" : "Lic_001_999999" }
    ],
    "prefs" : ""
  },
  {
    "tenantId" : "Tenant3",
    "configId" : "Conf_0000005",
    "deviceId" : "",
    "status" : "EXECUTION SCHEDULED",
    "description" : "SALES DEPARTMENT",
    "apps" : [
      { "appId" : "FreeApp_001", "licenseKey" : "Lic_001_999999" },
      { "appId" : "PaidApp_002", "licenseKey" : "Lic_002_000002" }
    ],
    "prefs" : ""
  }
]
```

FIG.31

DEVICE CONFIGURATION APPLICATION

| DESCRIPTION | APPLICATION | SETTING | START INSTALLATION |
|---|---|---|---|
| GENERAL AFFAIRS DEPARTMENT | FreeApp_001 | NONE | INSTALL |
| SALES DEPARTMENT | FreeApp_001 PaidApp_002 | NONE | INSTALL |

FIG.32

| TENANT ID | DEVICE CONFIGURATION INFORMATION ID | DEVICE NUMBER | GENERATION INFORMATION | STATUS | DESCRIPTION | SETTING FILE |
|---|---|---|---|---|---|---|
| Tenant2 | Conf_0000003 | Dev_000003 | next | EXECUTION IN PROGRESS | 1F | Prefs_0000003.xml |

FIG.34

DEVICE CONFIGURATION INFORMATION MANAGEMENT TOOL

TENANT: Tenant2

NEWLY CREATE

DEVICE NUMBER

DESCRIPTION

CREATE   CANCEL

FIG.37

| TENANT ID | DEVICE CONFIGURATION INFORMATION ID | DEVICE NUMBER | GENERATION INFORMATION | STATUS | DESCRIPTION |
|---|---|---|---|---|---|
| Tenant2 | Conf_0000003 | Dev_000003 | Current | COMPLETED | 1F |

FIG.39

DEVICE CONFIGURATION INFORMATION MANAGEMENT TOOL

TENANT: Tenant2

NEWLY CREATE

| DEVICE CONFIGURATION INFORMATION ID | DEVICE NUMBER | STATUS | DESCRIPTION | APPLICATION | SETTING | OPERATION |
|---|---|---|---|---|---|---|
| Conf_0000003 | Dev_000003 | COMPLETED | 1F | FreeApp_001 PaidApp_002 | DISPLAY | COPY |

FIG.41

| TENANT ID | DEVICE CONFIGURATION INFORMATION ID | DEVICE NUMBER | GENERATION INFORMATION | STATUS | DESCRIPTION |
|---|---|---|---|---|---|
| Tenant2 | Conf_0000003 | Dev_000003 | Current | PREPARATION COMPLETED | 1F |
| Tenant2 | Conf_0000006 | | | PREPARATION IN PROGRESS | COPY FROM "1F(Dev_000003)" |

FIG.42

| DEVICE CONFIGURATION INFORMATION ID | APPLICATION ID | LICENSE KEY | STATUS |
|---|---|---|---|
| Conf_0000003 | FreeApp_001 | Lic_001_999999 | COMPLETED |
| Conf_0000003 | PaidApp_002 | Lic_002_000001 | COMPLETED |
| Conf_0000006 | FreeApp_001 | Lic_001_999999 | PREPARATION COMPLETED |
| Conf_0000006 | PaidApp_002 | | PREPARATION IN PROGRESS |

FIG.43

| DEVICE CONFIGURATION INFORMATION ID | SETTING FILE | STATUS |
|---|---|---|
| Conf_0000003 | EXPORT Prefs_0000003.xml | PREPARATION COMPLETED |
| Conf_0000006 | COPY FROM Conf_0000003 | PREPARATION IN PROGRESS |

FIG.44

DEVICE CONFIGURATION INFORMATION MANAGEMENT TOOL

TENANT: Tenant2

NEWLY CREATE

| DEVICE CONFIGURATION INFORMATION ID | DEVICE NUMBER | STATUS | DESCRIPTION | APPLICATION | SETTING | OPERATION |
|---|---|---|---|---|---|---|
| Conf_0000003 | Dev_000003 | PREPARATION COMPLETED | 1F | FreeApp_001 PaidApp_002 | EXPORT IN PROGRESS | SCHEDULE  COPY |
| Conf_0000006 | | PREPARATION IN PROGRESS | COPY FROM "1F(Dev_000003)" | FreeApp_001 PaidApp_002 | PREPARATION IN PROGRESS | COPY |

FIG.45

| DEVICE CONFIGURATION INFORMATION ID | APPLICATION ID | LICENSE KEY | STATUS |
|---|---|---|---|
| Conf_0000003 | FreeApp_001 | Lic_001_999999 | COMPLETED |
| Conf_0000003 | PaidApp_002 | Lic_002_000001 (INVALIDATION IN PROGRESS) | PREPARATION COMPLETED |
| Conf_0000006 | FreeApp_001 | Lic_001_999999 | PREPARATION COMPLETED |
| Conf_0000006 | PaidApp_002 | Lic_002_000001 (LICENSE MIGRATION IN PROGRESS) | PREPARATION IN PROGRESS |

FIG.46

DEVICE CONFIGURATION INFORMATION MANAGEMENT TOOL

TENANT: Tenant2

NEWLY CREATE

| DEVICE CONFIGURATION INFORMATION ID | DEVICE NUMBER | STATUS | DESCRIPTION | APPLICATION | SETTING | OPERATION |
|---|---|---|---|---|---|---|
| Conf_0000003 | Dev_000003 | PREPARATION COMPLETED | 1F | FreeApp_001<br>PaidApp_002<br>(INVALIDATION IN PROGRESS) | EXPORT IN PROGRESS | SCHEDULE COPY |
| Conf_0000006 | | PREPARATION IN PROGRESS | COPY FROM "1F(Dev_000003)" | FreeApp_001<br>PaidApp_002<br>(LICENSE MIGRATION IN PROGRESS) | PREPARATION IN PROGRESS | COPY |

FIG.47

DEVICE CONFIGURATION INFORMATION MANAGEMENT TOOL

TENANT: Tenant2

NEWLY CREATE

| DEVICE CONFIGURATION INFORMATION ID | DEVICE NUMBER | STATUS | DESCRIPTION | APPLICATION | SETTING | OPERATION |
|---|---|---|---|---|---|---|
| Conf_0000003 | Dev_000003 | EXECUTION SCHEDULED | 1F | FreeApp_001 PaidApp_002 (INVALIDATION IN PROGRESS) | EXPORT IN PROGRESS | RELEASE SCHEDULING  COPY |
| Conf_0000006 | | PREPARATION IN PROGRESS | COPY FROM "1F(Dev_000003)" | FreeApp_001 PaidApp_002 (LICENSE MIGRATION IN PROGRESS) | PREPARATION IN PROGRESS | COPY |

FIG.48

DEVICE CONFIGURATION INFORMATION MANAGEMENT TOOL

TENANT: Tenant2

NEWLY CREATE

| DEVICE CONFIGURATION INFORMATION ID | DEVICE NUMBER | STATUS | DESCRIPTION | APPLICATION | SETTING | COPY |
|---|---|---|---|---|---|---|
| Conf_0000003 | Dev_000003 | COMPLETED | 1F | FreeApp_001<br>PaidApp_002 | DISPLAY | COPY |
| Conf_0000006 | | PREPARATION COMPLETED | 2F | FreeApp_001<br>PaidApp_002 | DISPLAY/<br>CORRECT | SCHEDULE COPY |

FIG.52

| DEVICE CONFIGURATION APPLICATION | | | |
|---|---|---|---|
| DESCRIPTION | APPLICATION | SETTING | START INSTALLATION |
| COPY FROM "1F(Dev_000003)" | FreeApp_001 PaidApp_002 | DISPLAY | INSTALL |

FIG.55

| DEVICE CONFIGURATION INFORMATION ID | ADDRESS BOOK ID | STATUS |
|---|---|---|
| Conf_0000001 | Address_001 | COMPLETED |
| Conf_0000002 | Address_003 | COMPLETED |
| Conf_0000003 | Address_002 | PREPARATION COMPLETED |
| ⋮ | ⋮ | ⋮ |

FIG.59A

DEVICE CONFIGURATION INFORMATION MANAGEMENT TOOL

TENANT: Tenant2

NEWLY CREATE

| DEVICE CONFIGURATION INFORMATION ID | DEVICE NUMBER | STATUS | DESCRIPTION | APPLICATION | ADDRESS BOOK | SETTING | OPERATION |
|---|---|---|---|---|---|---|---|
| Conf_0000003 | | PREPARATION IN PROGRESS | 1F | [REGISTER] | [REGISTER] | [REGISTER] | COPY |

FIG.59B

DEVICE CONFIGURATION INFORMATION MANAGEMENT TOOL

TENANT: Tenant2

NEWLY CREATE

| DEVICE CONFIGURATION INFORMATION ID | DEVICE NUMBER | STATUS | DESCRIPTION | APPLICATION | ADDRESS BOOK | SETTING | OPERATION |
|---|---|---|---|---|---|---|---|
| Conf_0000003 | | PREPARATION COMPLETED | 1F | [REGISTER] | Address_002 | [REGISTER] | [SCHEDULE] [COPY] |

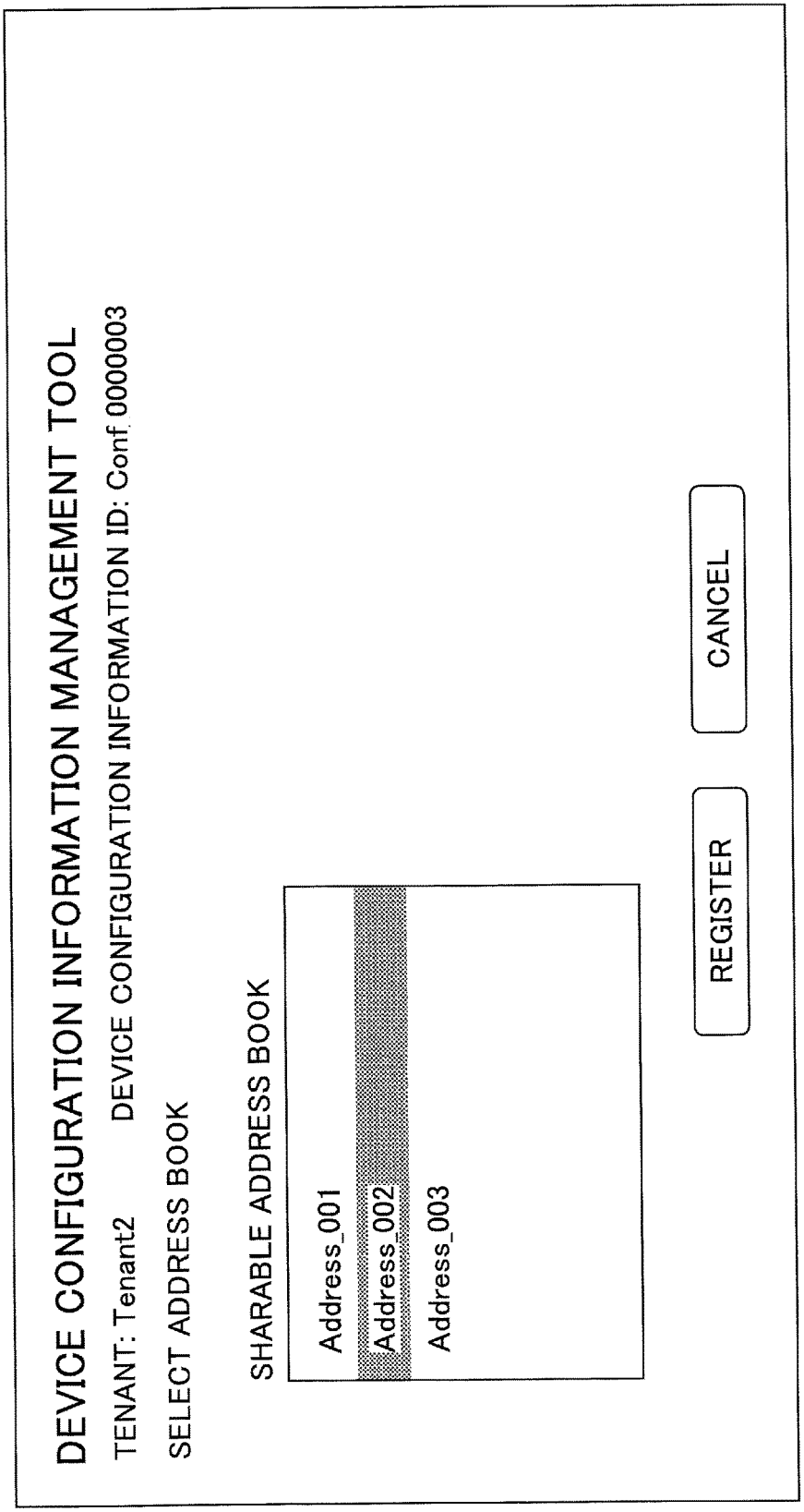

FIG.62

DEVICE CONFIGURATION APPLICATION

| DESCRIPTION | APPLICATION | ADDRESS BOOK | SETTING | START INSTALLATION |
|---|---|---|---|---|
| 1F | — | Address_002 | — | INSTALL |

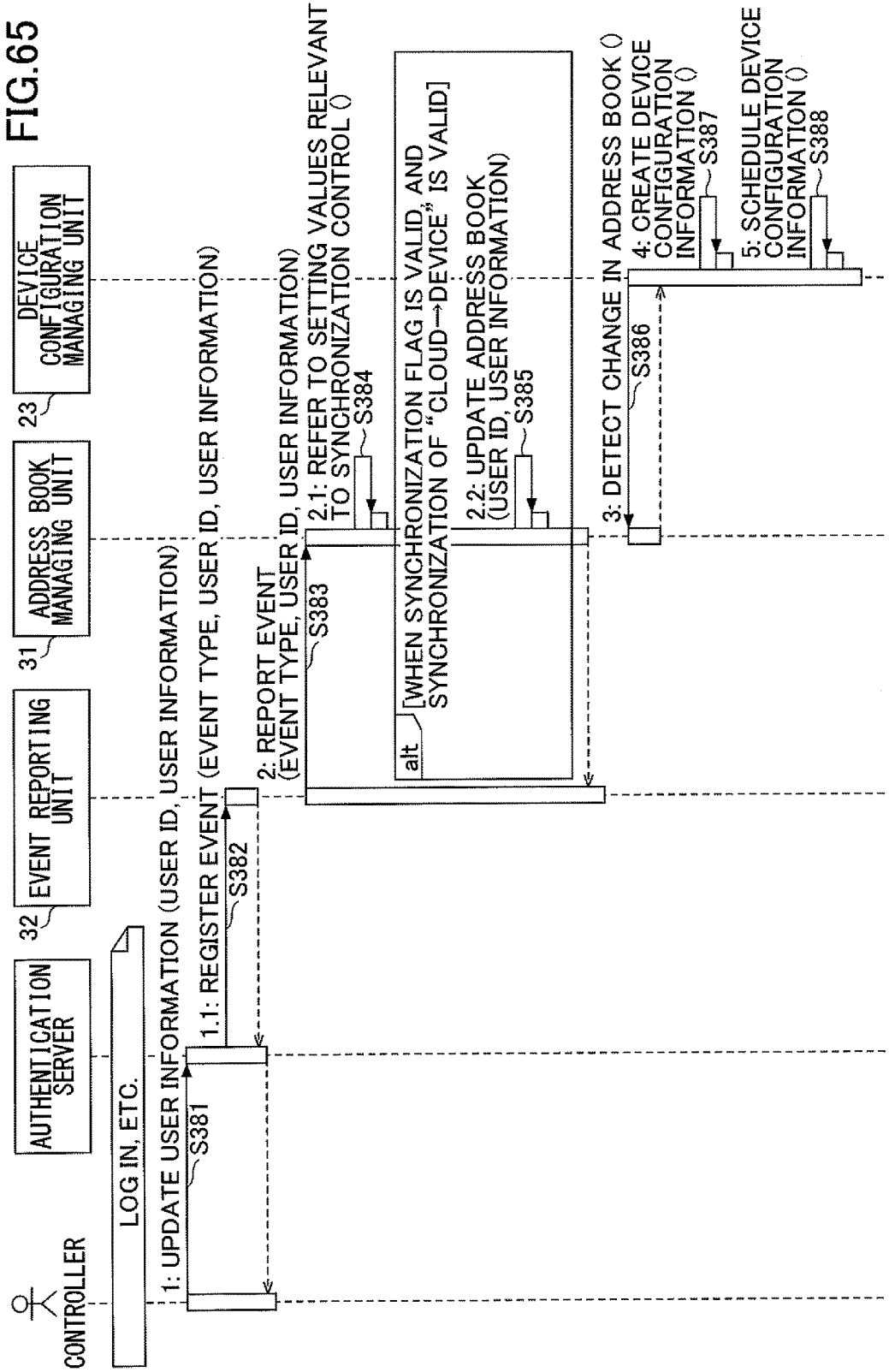

INFORMATION PROCESSING SYSTEM AND APPLICATION INSTALLATION METHOD

CROSS-REFERENCE TO RELATED APPLICATION

The present application claims priority under 35 U.S.C. § 119 to Japanese Patent Application No. 2016-154556, filed on Aug. 5, 2016 and Japanese Patent Application No. 2016-221718, filed on Nov. 14, 2016, the contents of which are incorporated herein by reference in their entirety.

BACKGROUND OF THE INVENTION

1. Field of the Invention

The present invention relates to an information processing system and an application installation method.

2. Description of the Related Art

In recent years, in electronic devices such as image forming apparatuses, applications can be used by downloading an application from an application market and installing the downloaded application in the electronic device. An application market is a generic term of an online service constructed for the purpose of distributing applications.

For example, in the related art, it is known that when setting an image forming apparatus at a customer, there are cases where a service man performs the operation of installing an application on the day of setting the image forming apparatus, and operations relevant to the license of the application also need to be performed (see, for example, Patent Document 1).

Patent Document 1: Japanese Unexamined Patent Application Publication No. 2015-121919

SUMMARY OF THE INVENTION

An aspect of the present invention provides an information processing system and an application installation method, in which one or more of the disadvantages of the related art are reduced.

According to one aspect of the present invention, there is provided an information processing system for installing an application, the information processing system including at least one information processing apparatus; and at least one electronic device, wherein the at least one information processing apparatus includes a processor, in communication with a memory, executing a process including managing a configuration information item required for installing the application in the at least one electronic device, the configuration information item including a list of one or more of the applications to be installed, license information required for installing the application, and status information of the configuration information item, managed in association with each other, the status information indicating a status before execution of the configuration information item is scheduled or a status in which execution of the configuration information item is scheduled, the configuration information item being registered in the at least one information processing apparatus according to an operation input via a user interface of the at least one information processing apparatus in a preliminary operation before the application is installed; and storing the application, and wherein the at least one electronic device includes a processor, in communication with a memory, executing a process including acquiring, from the at least one information processing apparatus over a communication network, the configuration information item for which the status information is indicating the status in which execution of the configuration information item is scheduled, the configuration information item being acquired from the at least one information processing apparatus in response to an operation input via a user interface of the at least one electronic device; and installing, in the at least one electronic device, the application acquired from the at least one information processing apparatus according to the acquired configuration information item.

BRIEF DESCRIPTION OF THE DRAWINGS

FIG. 4 is a functional block diagram of an example of a server apparatus according to the first embodiment of the present invention;

FIG. 5 is a configuration diagram of an example of a device configuration information table according to the first embodiment of the present invention;

FIG. 6 is a diagram for describing the item "generation information" according to the first embodiment of the present invention;

FIG. 8 is a configuration diagram of an example of an application configuration information table according to the first embodiment of the present invention;

FIG. 9 is a configuration diagram of an example of a setting file information table according to the first embodiment of the present invention;

FIG. 14 is an image diagram of an example of a login screen of a device configuration information management tool according to the first embodiment of the present invention;

FIG. 15 is an image diagram of an example of a tenant selection screen according to the first embodiment of the present invention;

FIG. 16 is an image diagram of an example of a device configuration information management screen according to the first embodiment of the present invention;

FIG. 19 is an image diagram of an example of a device configuration information management screen including the device configuration information that has been newly created according to the first embodiment of the present invention;

FIG. 22 is an image diagram of an example of a device configuration information management screen after the application registration has ended according to the first embodiment of the present invention;

FIG. 24 is an image diagram of an example of a device configuration information management screen after the application registration and the setting file registration have ended according to the first embodiment of the present invention;

FIG. 25 is an image diagram of an example of a device configuration information management screen after the execution scheduling has been made according to the first embodiment of the present invention;

FIGS. 28A and 28B illustrate examples of a request for searching for the device configuration information, and a response to the request, according to the first embodiment of the present invention;

FIG. 29 is an image diagram of an example of a device configuration information selection screen according to the first embodiment of the present invention;

FIG. 30 illustrates an example of a response including a plurality of device configuration information items according to the first embodiment of the present invention;

FIG. 31 is an image diagram of an example of a device configuration information selection screen according to the first embodiment of the present invention;

FIG. 32 is a configuration diagram of an example of the device configuration information when the installation of the application is in progress according to the first embodiment of the present invention;

FIG. 34 is an image diagram of an example of a new creation screen of device configuration information according to the first embodiment of the present invention;

FIG. 37 is a configuration diagram of an example of device configuration information when the installation of the application has been completed according to the first embodiment of the present invention;

FIG. 39 is an image diagram of an example of a device configuration information management screen according to the first embodiment of the present invention;

FIG. 41 is a configuration diagram of an example of a record that is added to the device configuration information table, when the setting value migration is specified as "necessary" and the license migration is specified as "unnecessary", according to the first embodiment of the present invention;

FIG. 42 is a configuration diagram of an example of a record that is added to the application configuration information table when the license migration is specified as "unnecessary", according to the first embodiment of the present invention;

FIG. 43 is a configuration diagram of an example of a record that is added to the setting file information table when the setting value migration is specified as "necessary", according to the first embodiment of the present invention;

FIG. 44 is an image diagram of an example of a device configuration information management screen when the device configuration information has been copied, according to the first embodiment of the present invention;

FIG. 45 is a configuration diagram of an example of a record to be added to the application configuration information table when the license migration is specified as "necessary", according to the first embodiment of the present invention;

FIG. 46 is an image diagram of an example of a device configuration information management screen when the device configuration information has been copied, according to the first embodiment of the present invention;

FIG. 47 is an image diagram of an example of a device configuration information management screen after the execution scheduling of copying the device configuration information has been made, according to the first embodiment of the present invention;

FIG. 48 is an image diagram of an example of a device configuration information management screen after the execution scheduling for copying the device configuration information has been made, according to the first embodiment of the present invention;

FIG. 52 is an image diagram of an example of a device configuration information selection screen according to the first embodiment of the present invention;

FIG. 55 is a configuration diagram of an example of address book configuration information according to the second embodiment of the present invention;

FIGS. 59A and 59B are image diagrams of examples of a device configuration information management screen including device configuration information according to the second embodiment of the present invention;

FIG. 60 is an image diagram of an example of an address book selection screen according to the second embodiment of the present invention;

FIG. 62 is an image diagram of an example of a device configuration information selection screen according to the second embodiment of the present invention;

FIG. 65 is a sequence diagram of another example of the process of synchronizing the address book, which is installed in the electronic device, with the authentication server according to the second embodiment of the present invention.

DETAILED DESCRIPTION OF THE PREFERRED EMBODIMENTS

In the related art, for example, in the case of a solution product, an electronic device and an application that can satisfy the customer's needs, are often proposed and sold in combination with each other to the customer. Even when the application to be used is determined in advance as in the case of a solution product, in the related art, when performing the operation of installing an application, the application is downloaded from the application market by manual procedures. Therefore, in the related art, the operation of installing an application in an electronic device such as an image forming apparatus, has been inconvenient.

A problem to be solved by an embodiment of the present invention is to provide an information processing system by which an application can be easily installed in an electronic device.

Embodiments of the present invention will be described by referring to the accompanying drawings.

First Embodiment

<System Configuration—First Embodiment>

Figure 1:
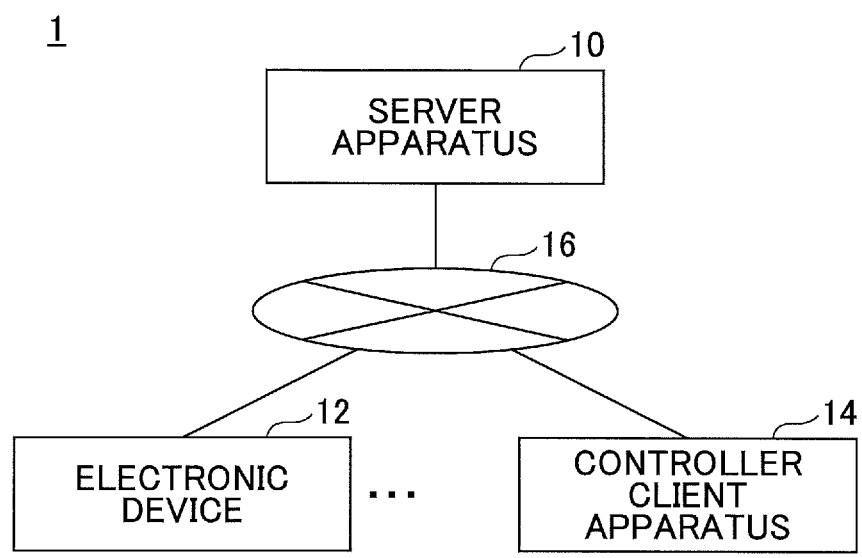
FIG. 1 is a system configuration diagram of an example of an information processing system according to a first embodiment of the present invention.

First, a description is given of a system configuration of an information processing system 1 according to the present embodiment. FIG. 1 is a system configuration diagram of an example of the information processing system 1 according to the present embodiment. The information processing system 1 includes a server apparatus 10, an electronic device 12, and a client apparatus 14 of the person (the controller) in charge of the business (controller client apparatus 14), which are communicatively coupled to each other via a wide-area network 16 such as the Internet.

The server apparatus 10 provides various services such as a cloud service via the network 16, to the electronic device 12 and the controller client apparatus 14. Note that the present embodiment is applicable to various service provided via the network 16, such as a service provided by an Application Service Provider (ASP) and a web service, etc., other than a cloud service. The server apparatus 10 is implemented by one or more information processing apparatuses.

The electronic device 12 is a device such as an image forming apparatus in which an application, which is downloaded from the server apparatus 10, is installed. An image forming apparatus is a device such as a multifunction peripheral, a scanner, a printer, a fax machine, an electronic whiteboard, and a projector. In the present embodiment, after the electronic device 12 is delivered (installed) to an organization such as a user company, an application, which is downloaded from the server apparatus 10, is installed in the electronic device 12. The information processing system 1 includes one or more electronic devices 12.

The controller client apparatus 14 is a client apparatus that is operated by the person (for example, the controller) in charge of the business such as a sales company. In the present embodiment, the person in charge of the business registers later-described device configuration information, application configuration information, and setting file information in the server apparatus 10, from the controller client apparatus 14. Furthermore, the person in charge of the business copies later-described device configuration information, application configuration information, and setting file information in the server apparatus 10, from the controller client apparatus 14.

The person in charge of the business registers device configuration information, application configuration information, and setting file information in the server apparatus 10, and therefore in the information processing system 1 of FIG. 1, the operation of installing an application in the electronic device 12 is facilitated as described below. Furthermore, the person in charge of the business can copy device configuration information, application configuration information, and setting file information, and therefore in the information processing system 1 of FIG. 1, the operation of installing an application in the electronic device 12, which is provided for the purpose of replacement or addition, is facilitated as described below.

Hardware Configuration—First Embodiment

Computer—First Embodiment

Figure 2:
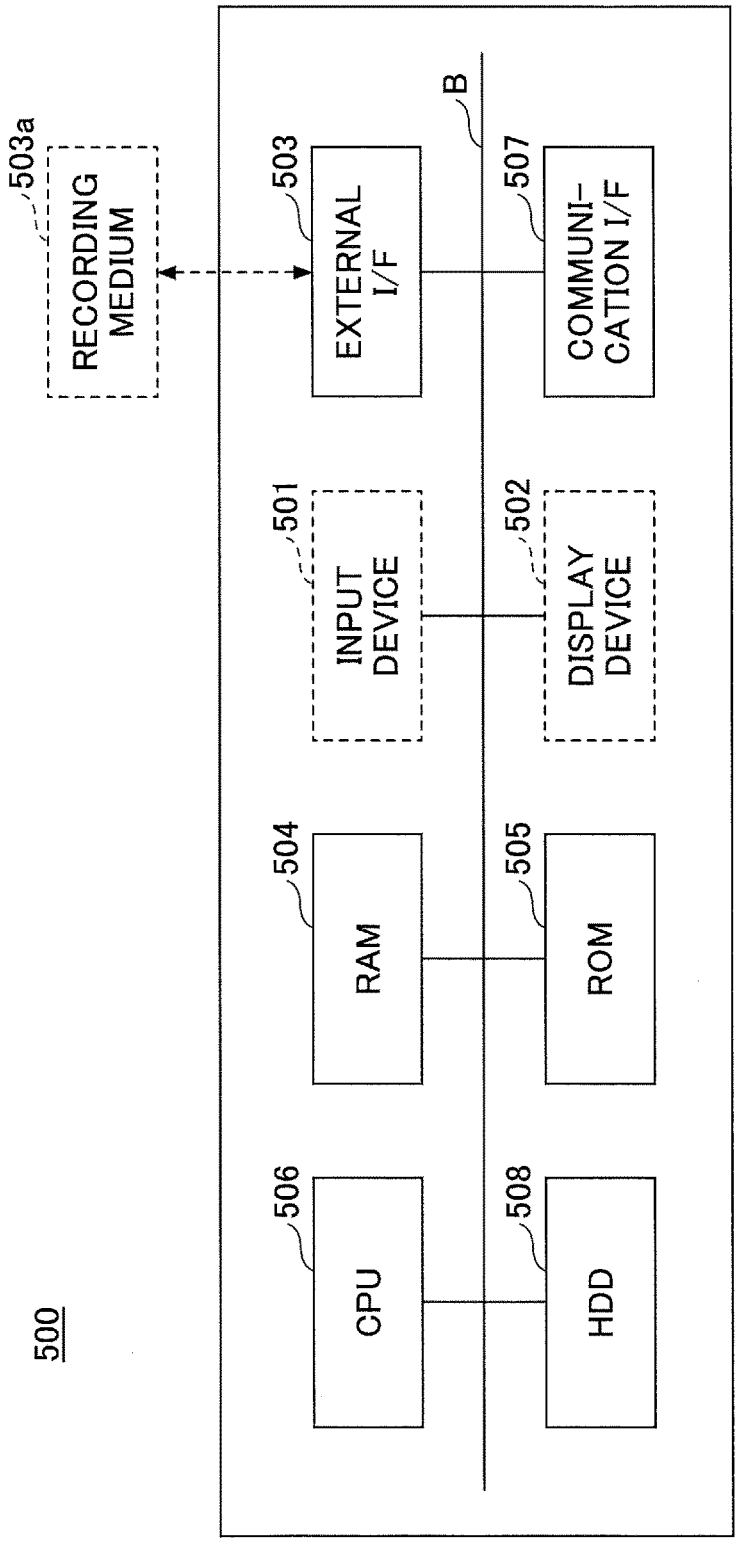
FIG. 2 is a hardware block diagram of an example of a computer according to the first embodiment of the present invention.

The server apparatus 10 and the controller client apparatus 14 are implemented by a computer having a hardware configuration, for example, as illustrated in FIG. 2. FIG. 2 is a hardware block diagram of an example of a computer according to the present embodiment.

A computer 500 illustrated in FIG. 2 includes an input device 501, a display device 502, an external interface (I/F) 503, a Random Access Memory (RAM) 504, a Read-Only Memory (ROM) 505, a Central Processing Unit (CPU) 506, a communication I/F 507, and a Hard Disk Drive (HDD) 508, which are coupled to each other by a bus B. Note that the input device 501 and the display device 502 may have a configuration of being coupled and used when necessary.

The input device 501 includes a keyboard, a mouse, and a touch panel, etc., and is used by the user for inputting various operation signals. The display device 502 includes a display, etc., and displays processing results obtained by the computer 500.

The communication I/F 507 is an interface that connects the computer 500 to various networks. Accordingly, the computer 500 is able to perform data communication via the communication I/F 507.

The HOD 508 is an example of a non-volatile storage device for storing programs and data. Examples of the stored programs and data include an OS that is the basic software for controlling the entire computer 500, and applications for providing various functions in the OS. Note that the computer 500 may use a drive device (for example, a solid status drive (SSD)) using a flash memory as the storage medium, instead of the HDD 508.

The external I/F 503 is an interface between the computer 500 and an external device. An example of the external device is a recording medium 503a. Accordingly, the computer 500 is able to read and/or write in the recording medium 503a via the external I/F 503. Examples of the recording medium 503a are a flexible disk, a Compact Disc (CD), a Digital Versatile Disc (DVD), a Secure Digital (SD) memory card, and a Universal Serial Bus (USB) memory.

The ROM 505 is an example of a non-volatile semiconductor memory (storage device) that can store programs and data even after the power is turned off. The ROM 505 stores programs and data such as a Basic Input/Output System (BIOS) that is executed when the computer 500 is activated, OS settings, and network settings, etc. The RAM 504 is an example of a volatile semiconductor memory (storage device) for temporarily storing programs and data.

The CPU 506 is an arithmetic device for controlling the entire computer 500 and implementing functions of the computer 500, by loading the programs and data from the storage devices such as the ROM 505 and the HDD 508, into the RAM 504, and executing processes.

The server apparatus 10 and the controller client apparatus 14 are able to implement various processes described below, by the hardware configuration of the computer 500, for example, as illustrated in FIG. 2.

MFP—First Embodiment

Figure 3:
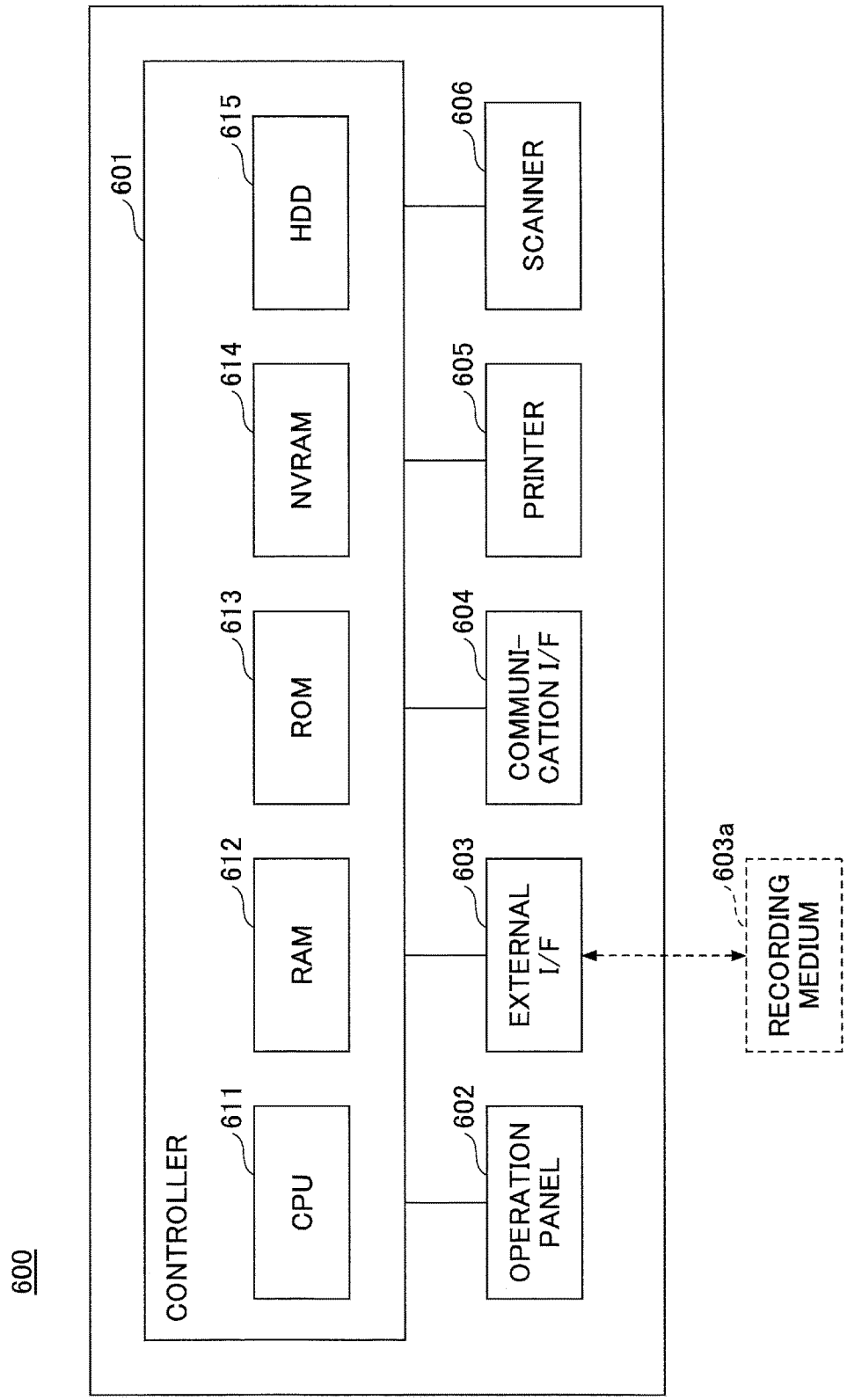
FIG. 3 is a hardware block diagram of an example of a multifunction peripheral (MFP) according to the first embodiment of the present invention.

An MFP 600, which is an example of the electronic device 12 of FIG. 1, is implemented by a computer having a hardware configuration, for example, as illustrated in FIG. 3. FIG. 3 is a hardware block diagram of an example of the MFP 600 according to the present embodiment.

The MFP 600 illustrated in FIG. 3 includes a controller 601, an operation panel 602, an external I/F 603, a communication I/F 604, a printer 605, and a scanner 606. The controller 601 includes a CPU 611, a RAM 612, a ROM 613, a NVRAM 614, and a HDD 615, etc. The ROM 613 stores various programs and data. The RAM 612 temporarily stores programs and data. The NVRAM 614 stores, for example, setting information. Furthermore, the HDD 615 stores various programs and data.

The CPU 611 controls the entire MFP 600 and implements functions of the MFP 600, by loading the programs, the data, and setting information from the ROM 613, the NVRAM 614, and the HDD 615, into the RAM 612, and executing processes.

The operation panel 602 includes an input unit for accepting input from a user, and a display unit for displaying information. The external I/F 603 is an interface between the MFP 600 and an external device. An example of the external device is a recording medium 603a. Accordingly, the MFP 600 is able to read and/or write in the recording medium 603a via the external I/F 603. Examples of the recording medium 603a are an integrated circuit (IC) card, a flexible disk, a CD, a DVD, an SD memory card, and a USB memory.

The communication I/F 604 is an interface that couples the MFP 600 to the network 16. Accordingly, the MFP 600 is able to perform data communication via the communication I/F 604. The printer 605 is a printing device for printing print data onto a conveyed object. Examples of a conveyed object are paper, a coat sheet, cardboard, an Over Head Projector (OHP) film, a plastic film, prepreg, and copper foil, etc., and the conveyed object is not limited to paper. Furthermore, the scanner 606 is a reading device for reading image data (electronic data) from an original document, and generating an image file (electronic file).

The electronic device 12 according to the first embodiment is able to implement various processes described below, by the hardware configuration of the MFP 600, for example, as illustrated in FIG. 3.

Functional Configuration—First Embodiment

Next, a description is given of a functional configuration of the information processing system 1 according to the present embodiment.

Server Apparatus—First Embodiment

FIG. 4 is a functional block diagram of an example of the server apparatus 10 according to the present embodiment. The server apparatus 10 of FIG. 4 includes a communicating unit 21, a user managing unit 22, a device configuration managing unit 23, an application information managing unit 24, a file managing unit 25, a license managing unit 26, and an application storage unit 27. Furthermore, the server apparatus 10 illustrated in FIG. 4 includes a device configuration information table 28, an application configuration information table 29, and a setting file information table 30.

The communicating unit 21 performs communication with the electronic device 12 and the controller client apparatus 14. The user managing unit 22 manages tenant information and user information that are necessary for user authentication. Furthermore, the user managing unit 22 performs user authentication.

The device configuration managing unit 23 manages device configuration information, application configuration information, and setting file information that are described below. Furthermore, the device configuration managing unit 23 performs device authentication. The application information managing unit 24 manages application information. The application information includes information such as the name, a description, a license key of a complimentary application, the area where the application is made public, and the model in which the application can operate, etc. The file managing unit 25 manages a later-described setting file. The license managing unit 26 performs license management, such as issuing, validating, and invalidating a license of an application. The application storage unit 27 stores the execution file of an application.

The device configuration information table 28 stores device configuration information as illustrated in FIG. 5. FIG. 5 is a configuration diagram of an example of a device configuration information table. The device configuration information of FIG. 5 includes the items of a tenant ID, a device configuration information ID, a device number, generation information, a status, and a description.

The item "tenant ID" is an example of information for uniquely identifying an organization, such as a user company, a school, and a hospital, etc. The item "device configuration information ID" is an example of information for uniquely identifying device configuration information that is a record in the device configuration information table. The item "device number" is an example of information for uniquely identifying the registered electronic device 12. When the electronic device 12 is not yet registered, the item "device number" is a blank space in which a device number of the electronic device 12 is not saved. When the electronic device 12 is registered, the device number of the electronic device 12 is stored at the item "device number".

The item "generation information" expresses the relationship with respect to the electronic device 12 for which the device configuration information has been registered. In the item "generation information", information for managing the generation of the device configuration information is stored, such as current, next, or previous, etc.

In the item "status", the status of the installation of an application with respect to the electronic device 12 is stored, such as preparation in progress, preparation completed, execution scheduled, execution in progress, and completed, etc. The item "description" is information that is displayed as a description of each of the device configuration information items in a device configuration information selection screen described below. As indicated in the device configuration information of FIG. 5, one device configuration information item is associated with one device number (one electronic device 12) when a device is registered.

FIG. 6 is a diagram for describing the item "generation information". The value of the generation information "current" expresses the device configuration information that is presently applied. The value of the generation information "next" expresses the device configuration information for which the execution is presently scheduled. Furthermore, the value of the generation information "previous" expresses the device configuration information that has been applied in the last generation.

For example, as illustrated in FIG. 6, the value of the generation information of the device configuration information "Device Configuration (2)" for which the execution is scheduled, is "next". When the applying of the "Device Configuration (2)" is completed, the value of the generation information of the device configuration information "Device Configuration (2)" changes from "next" to "current". Furthermore, the value of the generation information of the device configuration information "Device Configuration (1)" changes from "current" to "previous". Tn this way, the generation of the device configuration information can be managed by the item "generation information".

Figure 7:
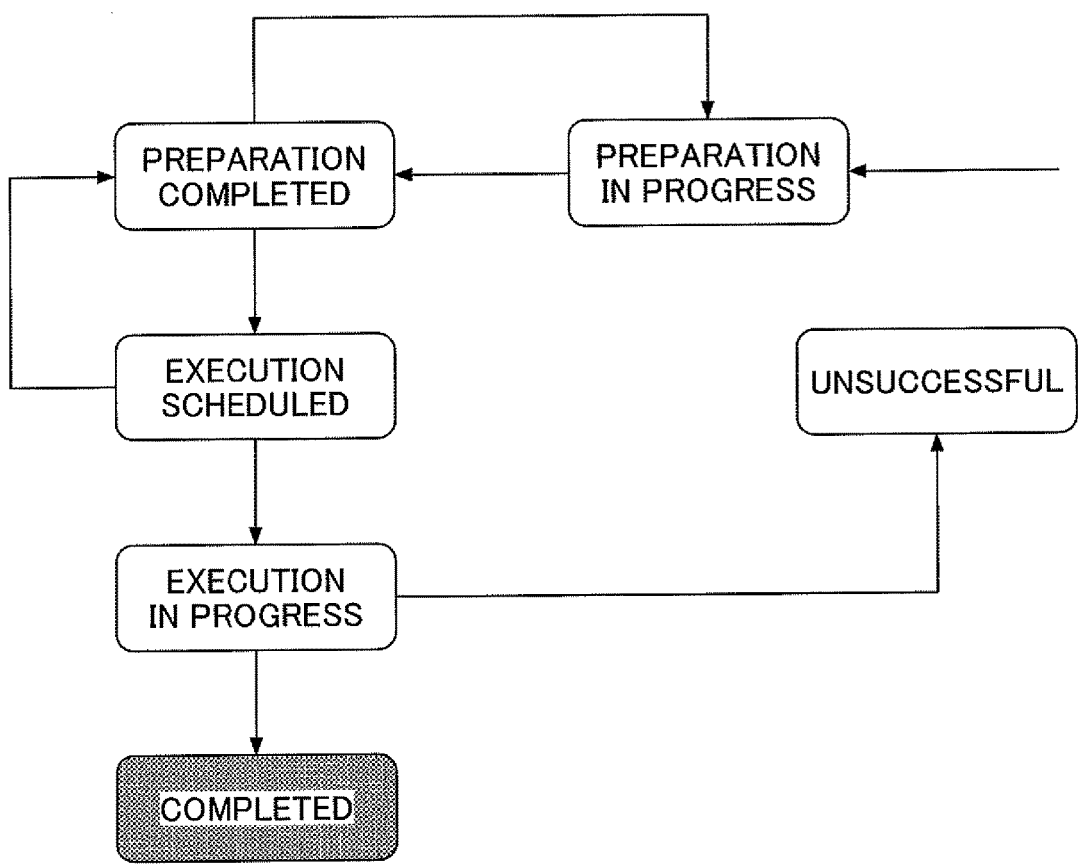
FIG. 7 is a transition diagram of the item "status" according to the first embodiment of the present invention.

FIG. 7 is a transition diagram of the item "status". A value "preparation in progress" of the status expresses a status where the preparation of the device configuration information is not yet completed to be in an applicable status. A value "preparation completed" of the status expresses a status where the preparation of the device configuration information has been completed to be in an applicable status, but the device configuration information is not yet made public to the electronic device 12.

A value "execution scheduled" of the status expresses a status where the execution of the device configuration information is scheduled, and the device configuration information is made public to the electronic device 12. A value "execution in progress" of the status expresses a status where application of the device configuration information to the electronic device 12 has started. A value "completed" of the status expresses a status where application of the device configuration information to the electronic device 12 has been completed. A value "unsuccessful" of the status expresses a status where an error has occurred and the applying of the device configuration information to the electronic device 12 has been unsuccessful.

As described above, even when the status of the device configuration information transitions to "preparation completed", the device configuration information cannot be viewed from the electronic device 12. After the status of the device configuration information transitions from "preparation completed" to "execution scheduled", the device configuration information can be viewed from the electronic device 12.

Furthermore, the application configuration information table 29 of FIG. 4 stores application configuration information, for example, as illustrated in FIG. 8. FIG. 8 is a configuration diagram of an example of an application configuration information table. The application configuration information of FIG. 8 includes the items of a device configuration information ID, an application ID, a license key, and a status.

The item "device configuration information ID" is an example of information for uniquely identifying device configuration information that is a record in the device configuration information table. The item "application ID" is an example of information for uniquely identifying an application. The item "license key" is an example of information for uniquely identifying a license key of an application identified by an application ID. The item "status" expresses the status of the application, such as preparation in progress, preparation completed, execution in process, and completed, etc.

When an application is registered, a new application configuration information item associated with a device configuration information ID is registered in the application configuration information table 29. Note that as illustrated in the application configuration information table of FIG. 1, there may be cases where a plurality of applications are registered with respect to a single device configuration information ID.

Furthermore, the setting file information table 30 of FIG. 4 stores setting file information, for example, as illustrated in FIG. 9. FIG. 9 is a configuration diagram of an example of a setting file information table. The setting file information of FIG. 9 includes the items of a device configuration information ID, a setting file, and a status.

The item "device configuration information ID" is an example of information for uniquely identifying device configuration information that is a record in the device configuration information table. The item "setting file" is an example of information for uniquely identifying a setting file registered with respect to the device configuration information. The item "status" expresses the status of the setting file, such as preparation in progress, preparation completed, execution in progress, and completed, etc.

Here, a description is given of the device configuration information of FIG. 5, the application configuration information of FIG. 8, and the setting file information of FIG. 9. Each of the records in the device configuration information of FIG. 5, the application configuration information of FIG. 8, and the setting file information of FIG. 9 are associated with each other by a device configuration information ID.

In the electronic device 12 having the device number "Dev_000001" and the electronic device 12 having the device number "Dev_000002", the application having the application ID "FreeApp_001" has been installed. With respect to the device configuration information having the device configuration information ID "Conf_0000003", for which a device number is not registered, the status of this device configuration information is "preparation completed".

In the electronic device 12 whose device number is registered in the device configuration information having the device configuration information ID "Conf_0000003", the applications having the application IDs "FreeApp_001" and "PaidApp_002" are to be installed.

Furthermore, with respect to the device configuration information having a device configuration information ID "Conf_0000004" for which a device number is not registered, the status of this device configuration information is "preparation completed". In the electronic device 12 whose device number is registered in the device configuration information having the device configuration information ID "Conf_0000004", an application having an application ID "FreeApp_001" is to be installed. Furthermore, with respect to the device configuration information having a device configuration information ID "Conf_0000005" for which a device number is not registered, the status of this device configuration information is "preparation completed". In the electronic device 12 whose device number is registered in the device configuration information having the device configuration information ID "Conf_0000005", applications having the application IDs "FreeApp_001" and "PaidApp_002" are to be installed.

Controller Client Apparatus—First Embodiment

Figure 10:
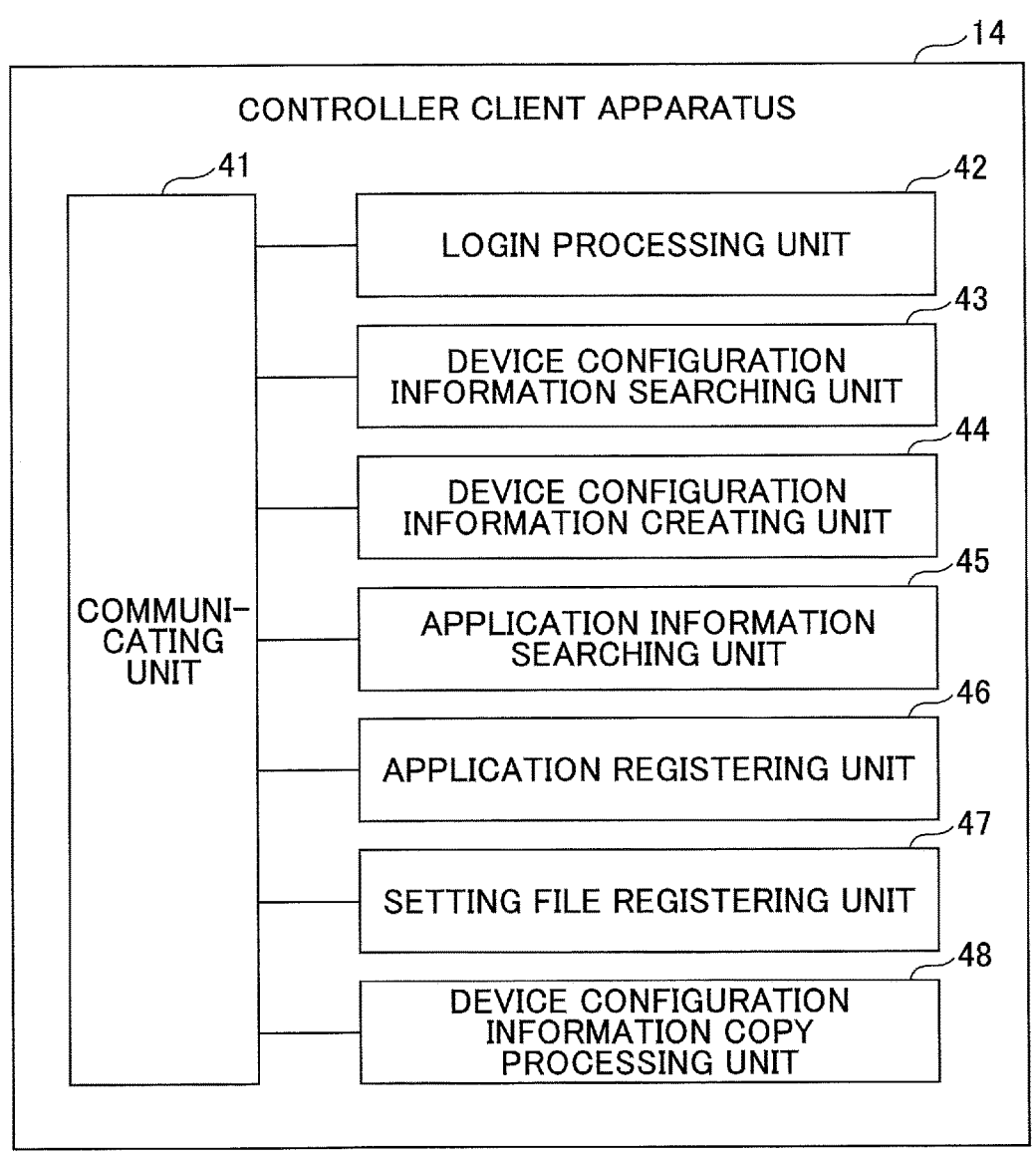
FIG. 10 is a functional block diagram of an example of a controller client apparatus according to the first embodiment of the present invention.

FIG. 10 is a functional block diagram of an example of the controller client apparatus 14 according to the present embodiment. The controller client apparatus 14 of FIG. 10 includes a communicating unit 41, a login processing unit 42, a device configuration information searching unit 43, a device configuration information creating unit 44, an application information searching unit 45, an application registering unit 46, a setting file registering unit 47, and a device configuration information copy processing unit 48. For example, the communicating unit 41, the login processing unit 42, the device configuration information searching unit 43, the device configuration information creating unit 44, the application information searching unit 45, the application registering unit 46, the setting file registering unit 47, and the device configuration information copy processing unit 48 illustrated in FIG. 10 are implemented by a web application executed in a browser.

The communicating unit 41 performs communication with the server apparatus 10. The login processing unit 42 performs a login process with respect to the server apparatus 10. The device configuration information searching unit 43 searches a device configuration information list registered in the server apparatus 10. The device configuration information creating unit 44 creates device configuration information, application configuration information, and setting file information in the server apparatus 10. The application information searching unit 45 searches the application information registered in the server apparatus 10. The application registering unit 46 registers the application information in the server apparatus 10. The setting file registering unit 47 registers a setting file in the server apparatus 10. The device configuration information copy processing unit 48 causes the server apparatus 10 to copy the device configuration information.

Electronic Device—First Embodiment

Figure 11:
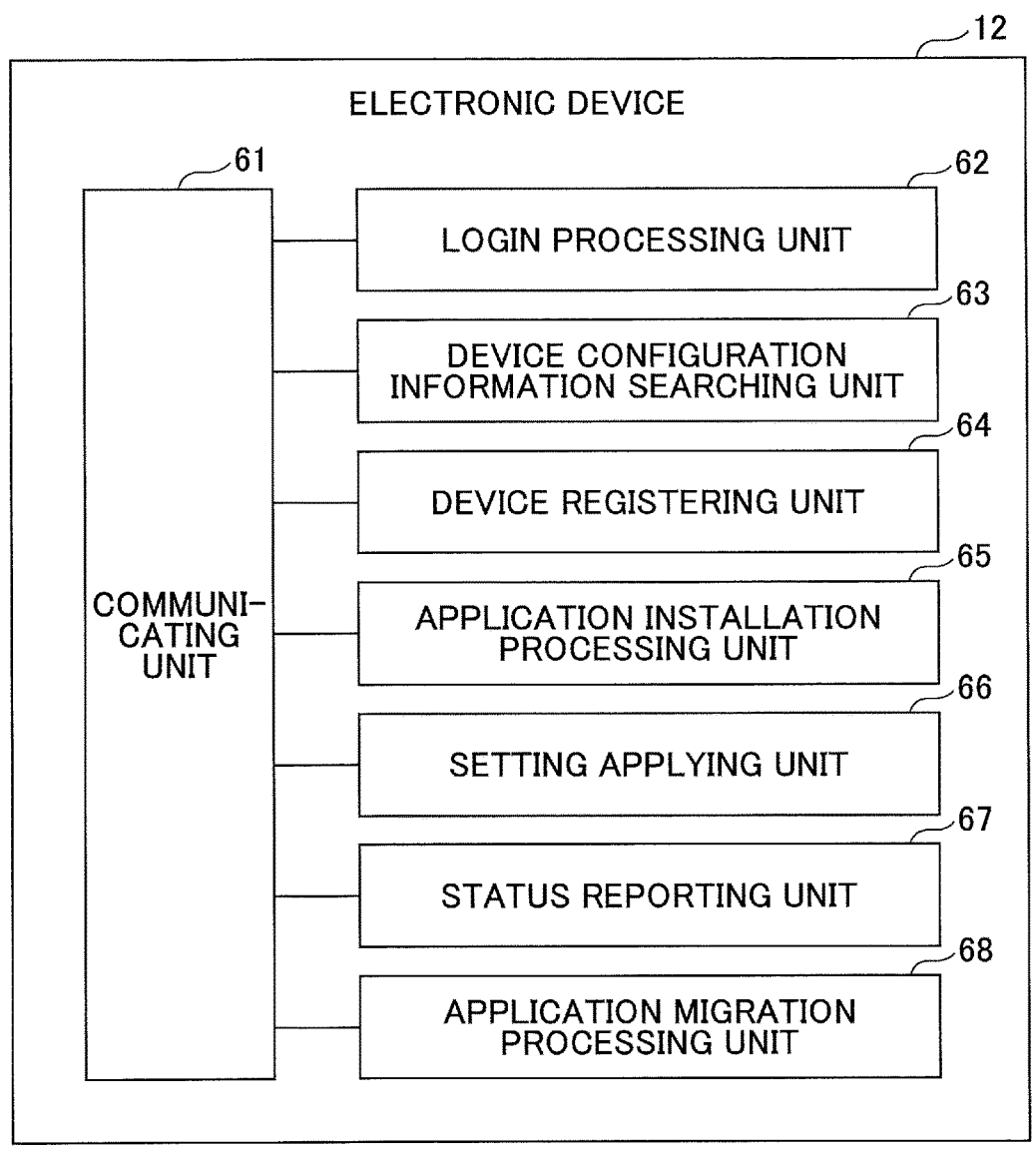
FIG. 11 is a functional block diagram of an example of an electronic device according to the first embodiment of the present invention.

FIG. 11 is a functional block diagram of an example of the electronic device 12 according to the present embodiment. The electronic device 12 of FIG. 11 includes a communicating unit 61, a login processing unit 62, a device configuration information searching unit 63, a device registering unit 64, an application installation processing unit 65, a setting applying unit 66, a status reporting unit 67, and an application migration processing unit 68. For example, the communicating unit 61, the login processing unit 62, the device configuration information searching unit 63, the device registering unit 64, the application installation processing unit 65, the setting applying unit 66, the status reporting unit 67, and the application migration processing unit 68 illustrated in FIG. 11 are implemented by applications executed at the electronic device 12.

The communicating unit 61 performs communication with the server apparatus 10. The login processing unit 62 performs a login process with respect to the server apparatus 10. The device configuration information searching unit 63 searches the device configuration information, the application configuration information, and the setting file information registered in the server apparatus 10. The device registering unit 64 registers the electronic device 12 in the server apparatus 10. The application installation processing unit 65 performs a process of installing an application in the electronic device 12. The setting applying unit 66 acquires a setting file from the server apparatus 10 and applies the settings. The status reporting unit 67 reports the status of the application (the status of installation) to the server apparatus 10.

The application migration processing unit 68 performs, as described below, an application migration process of installing an application in the electronic device 12 (copy destination) provided for the purpose of replacement or addition, such that the electronic device 12 (copy destination) is in the same status as the electronic device 12 (copy source) that is already operating.

Process Details—First Embodiment

Figure 12:
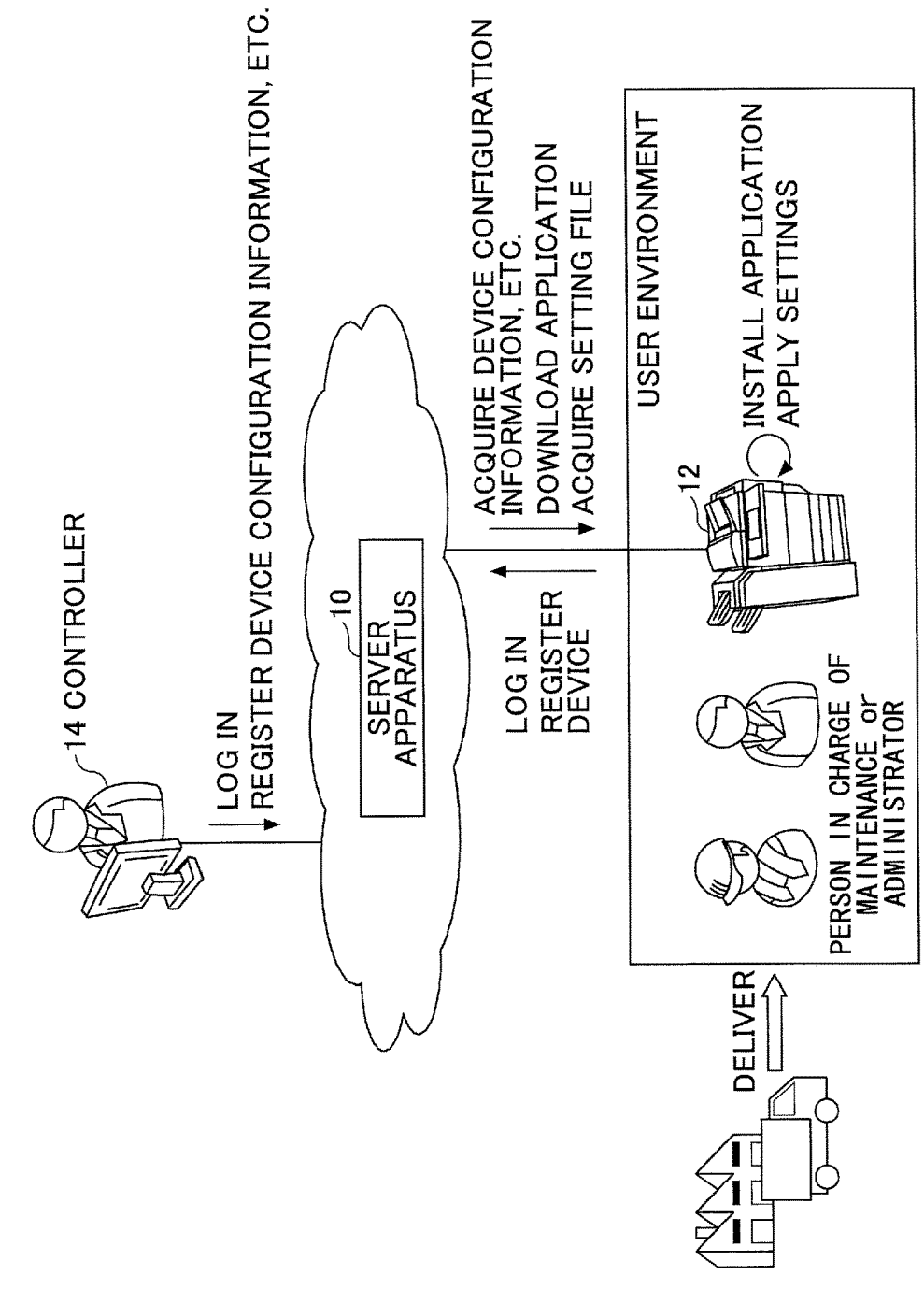
FIG. 12 is a diagram for describing an example of an operation scenario of using the device configuration information, etc., to install an application in the electronic device according to the first embodiment of the present invention.

Next, a description is given of details of processes of the information processing system 1 according to the present embodiment. The present embodiment is based on the premise that an application is installed in a new electronic device 12, for example, as illustrated in FIG. 12. FIG. 12 is for describing an operation scenario in which the person in charge of the business associates device configuration information, application configuration information, and setting file information (hereinafter referred to as "device configuration information, etc.") with a tenant, and uses the device configuration information, etc., to install an application in the electronic device 12.

FIG. 12 is a diagram for describing an example of an operation scenario of using the device configuration information, etc., to install an application in the electronic device 12. The person in charge of the business (hereinafter referred to as "controller") logs into the server apparatus 10 from the controller client apparatus 14, and registers the device configuration information, etc., in the server apparatus 10 in association with the tenant. In this way, as a preliminary operation, the controller registers the device configuration information, etc., in the server apparatus 10 in association with the tenant.

After the electronic device 12 is delivered to the user environment, the person in charge of maintenance and the administrator (hereinafter simply referred to as an "operator") performs an operation of installing the application. The operator operates the electronic device 12, and logs into the server apparatus 10. The electronic device 12 specifies a tenant and acquires device configuration information, etc., from the server apparatus 10, and performs a process of registering the device number in the device configuration information, etc.

The electronic device 12 downloads the application from the server apparatus 10 and installs the application, based on the device configuration information, etc., in which the device number has been registered. Furthermore, the electronic device 12 acquires a setting file from the server apparatus 10 and applies the settings to the electronic device 12, based on the device configuration information, etc., in which the device number has been registered.

In the following, a description is given of a registration operation of registering the device configuration information, etc., that is performed in advance at the controller client apparatus 14 by the controller, and an installation operation of installing the application performed at the electronic device 12 in the user environment by the operator, with respect to the operation scenario illustrated in FIG. 12.

Figure 13:
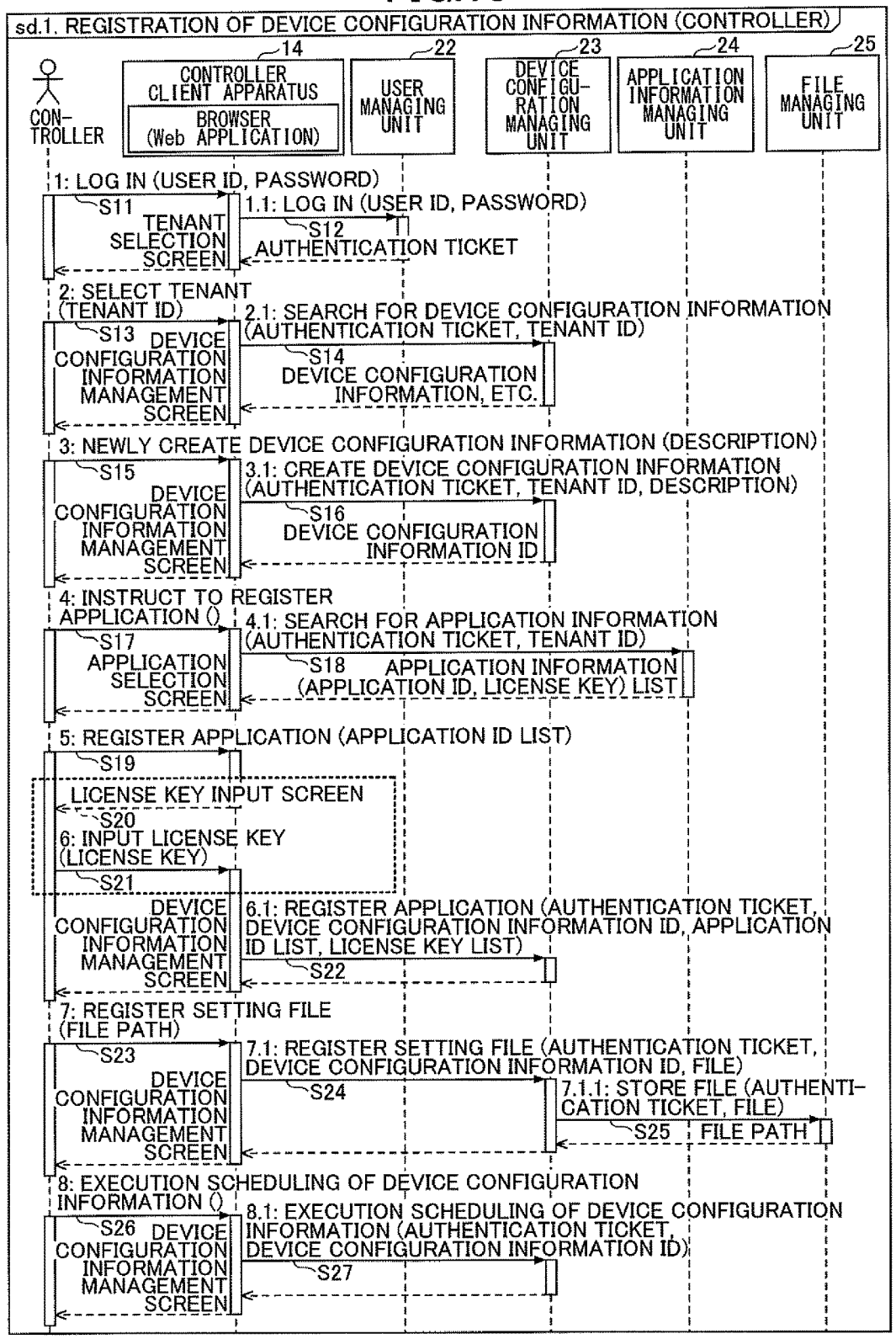
FIG. 13 is a sequence diagram of an example of a registration operation of device configuration information, etc., according to the first embodiment of the present invention.

Registration Operation of Device Configuration Information, Etc.—First Embodiment FIG. 13 is a sequence diagram of an example of a registration operation of device configuration information, etc. (device registration). The controller accesses a device configuration information management tool from a browser operating in the controller client apparatus 14, to display a login screen illustrated in FIG. 14. FIG. 14 is an image diagram of an example of a login screen of a device configuration information management tool.

In step S11, the controller inputs a user ID and a password in the login screen, and requests to log in. In step S12, the login processing unit 42 of the controller client apparatus 14 makes a login request to the user managing unit 22 of the server apparatus 10, by the user ID and password input to the login screen. The user managing unit 22 performs user authentication, and when the login is successful, the user managing unit 22 returns an authentication ticket.

The device configuration information searching unit 43 of the controller client apparatus 14, which has received the returned authentication ticket, displays a tenant selection screen illustrated in FIG. 15. FIG. 15 is an image diagram of an example of a tenant selection screen. Note that the tenant selection screen of FIG. 15 is an example in which a tenant ID is input; however, a tenant ID may be selected from a list of tenants. Furthermore, the tenant selection screen may be configured such that a tenant ID can be selected from a part of a tenant ID or from a tenant name.

In step S13, the controller inputs a tenant ID in the tenant selection screen of FIG. 15, and presses an "open" button. In step S14, the device configuration information searching unit 43 requests the device configuration managing unit 23 of the server apparatus 10 to search for the device configuration information, etc., by the tenant ID input to the tenant selection screen. The device configuration managing unit 23 searches for the device configuration information, etc., associated with the tenant ID, and returns the device configuration information, etc.

The device configuration information creating unit 44 of the controller client apparatus 14, which has received the returned device configuration information, etc., displays a device configuration information management screen illustrated in FIG. 16. FIG. 16 is an image diagram of an example of a device configuration information management screen. Note that the example of the device configuration information management screen of FIG. 16 has been created based on the device configuration information, etc., illustrated in FIGS. 5, 8, and 9. The device configuration information management screen of FIG. 16 is displaying two device configuration information items indicating that the installation of the application has been completed. Note that when a "display" link in the device configuration information management screen of FIG. 16 is pressed, the device configuration information creating unit 44 displays a setting file that has been applied. Furthermore, when a "copy" button in the device configuration information management screen of FIG. 16 is pressed, the device configuration information copy processing unit 48 requests the server apparatus 10 to copy the device configuration information, etc.

Figure 17:
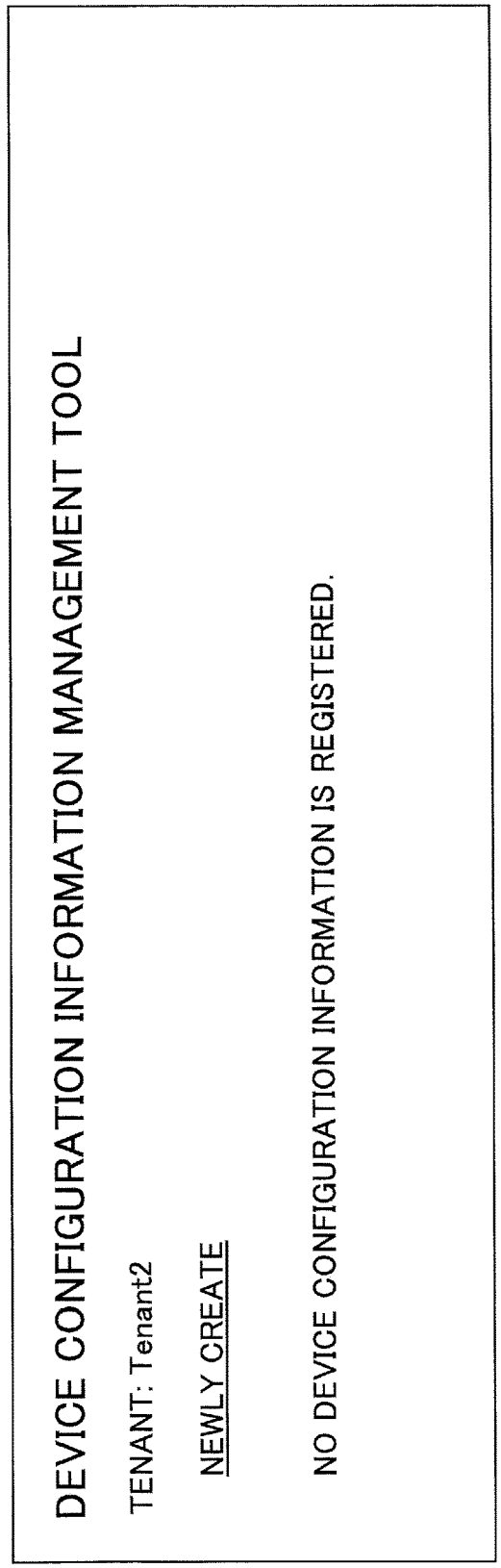
FIG. 17 is an image diagram of an example of a device configuration information management screen in a case where the device configuration information is not registered according to the first embodiment of the present invention.

Furthermore, when there is no device configuration information that is associated with the tenant ID, the device configuration information creating unit 44 of the controller client apparatus 14 displays a device configuration information management screen illustrated in FIG. 17. FIG. 17 is an image diagram of an example of a device configuration information management screen in a case where no device configuration information is registered.

Figure 18:
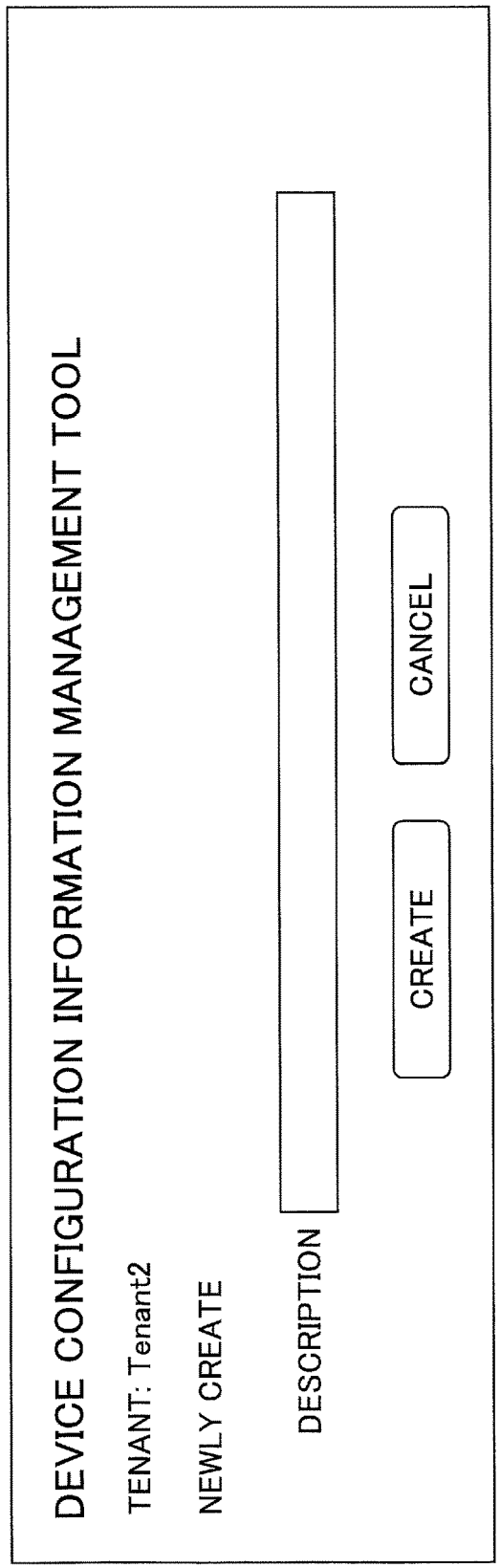
FIG. 18 is an image diagram of an example of a new creation screen of device configuration information according to the first embodiment of the present invention.

The controller can press a "newly create" link of FIG. 16 or 17 to display a new creation screen of device configuration information illustrated in FIG. 18. FIG. 18 is an image diagram of an example of a new creation screen of device configuration information. In step S15, the controller inputs a description in the new creation screen of FIG. 18, and presses a "create" button. The device configuration information creating unit 44 specifies the description input to the new creation screen and requests the device configuration managing unit 23 of the server apparatus 10 to create device configuration information.

The device configuration managing unit 23 of the server apparatus 10 adds, to the device configuration information table 28, the device configuration information in which the specified description is registered, and returns the device configuration information ID of the added device configuration information to the controller client apparatus 14 (step S16). The device configuration information creating unit 44 of the controller client apparatus 14, which has received the returned device configuration information ID, displays a device configuration information management screen, for example, as illustrated in FIG. 19.

FIG. 19 is an image diagram of an example of a device configuration information management screen including the device configuration information that has been newly created. The device configuration information displayed in the device configuration information management screen of FIG. 19 has been newly created, and therefore the item "status" indicates preparation in progress.

Furthermore, the device configuration information displayed in the device configuration information management screen of FIG. 19 has been newly created, and therefore the items "application" and "setting" are not registered. Thus, a "register" link is displayed at the items "application" and "setting" in the device configuration information management screen of FIG. 19.

In step S17, the controller presses the "register" link in the application item in FIG. 19 to give an instruction to register an application. In step S18, the application information searching unit 45 of the controller client apparatus 14 specifies the tenant ID and requests the application information managing unit 24 of the server apparatus 10 to search for the application information.

The application information managing unit 24 of the server apparatus 10 returns application information including an application ID and a license key, to the controller client apparatus 14. The license key included in the application information is a license key that is necessary for installing a complimentary application.

Note that the application information returned to the controller client apparatus 14 may be application information of an application for which the controller has the authority to register, or application information of an application that is made public to the area of the tenant.

Figure 20:
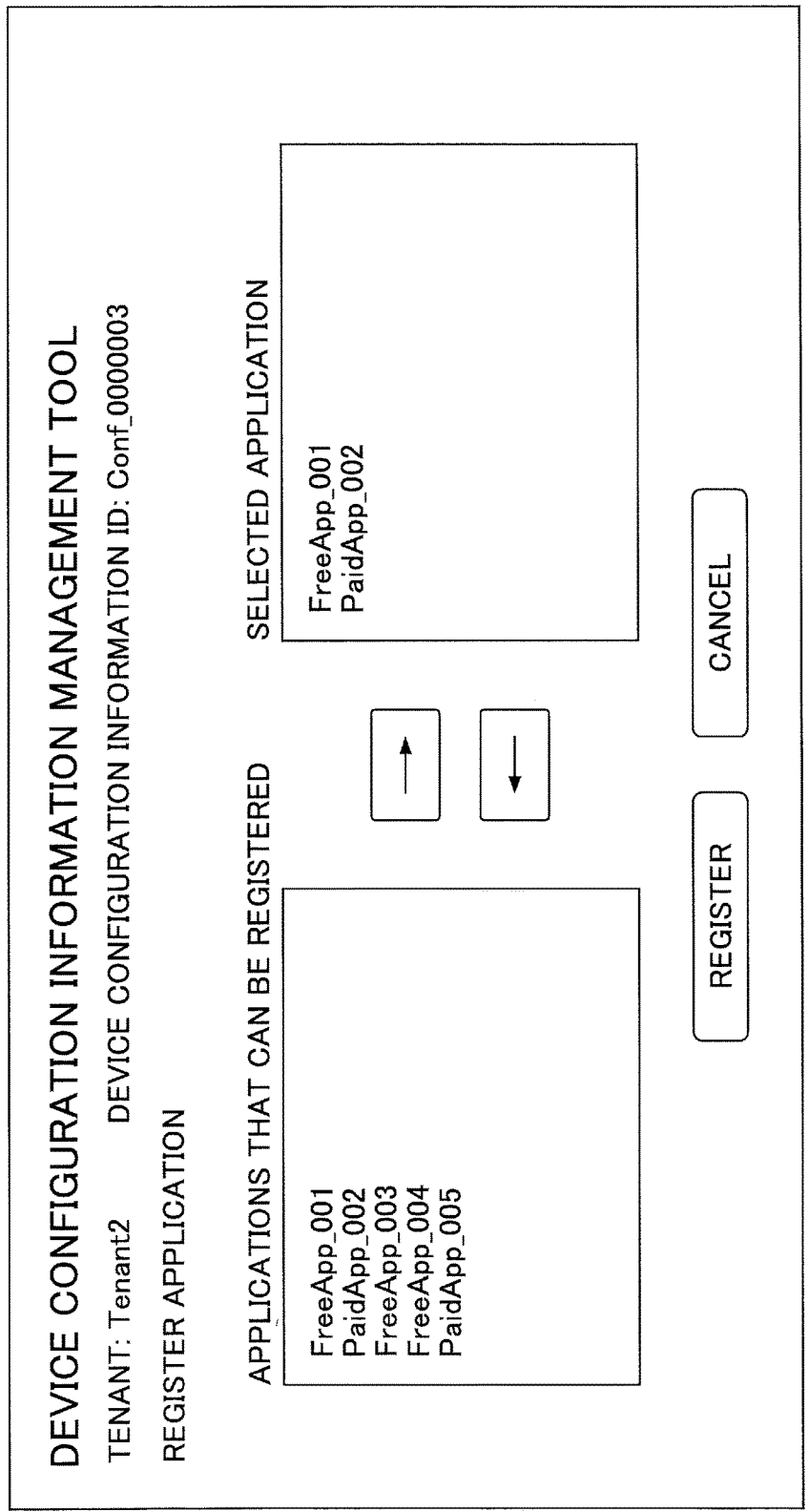
FIG. 20 is an image diagram of an example of an application selection screen according to the first embodiment of the present invention.

The application registering unit 46 of the controller client apparatus 14, which has received the returned application information, displays an application selection screen, for example, as illustrated in FIG. 20. FIG. 20 is an image diagram of an example of an application selection screen. The application registering unit 46 displays the application ID included in the application information returned from the server apparatus 10, in a list at "applications that can be registered" in the application selection screen. Note that when the application information includes the name and the description of the application, the application registering unit 46 may display the name and the description of the application in the application selection screen.

The controller can operate the application selection screen of FIG. 20 to specify an application ID, which is displayed in the list at "applications that can be registered", and add the specified application ID to "selected application" or delete an application ID from "selected application".

In step S19, the controller presses the "register" button in the application selection screen, to make a request to register the application ID that has been added to "selected application", in the application configuration information. The application registering unit 46 of the controller client apparatus 14 displays a license key input screen at step S20, with respect to an application ID for which a license key has not be acquired, among the application IDs added to "selected application".

Figure 21:
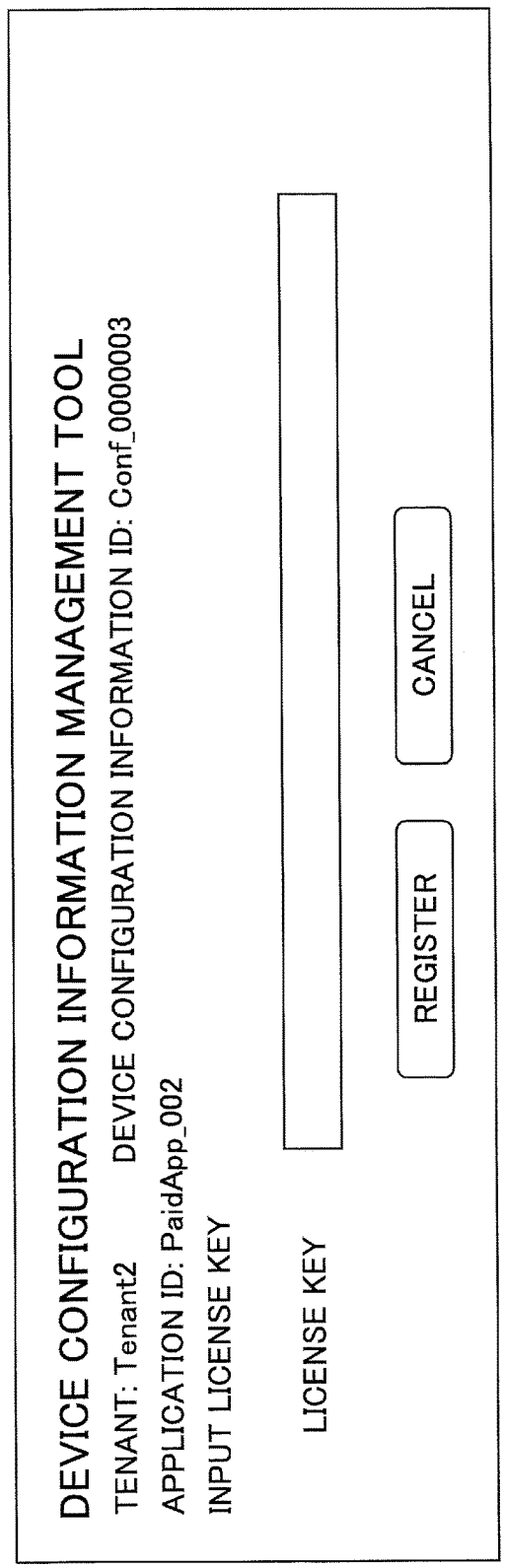
FIG. 21 is an image diagram of an example of a license key input screen according to the first embodiment of the present invention.

FIG. 21 is an image diagram of an example of a license key input screen. In step S21, the controller inputs the license key in the license key input screen of FIG. 21, and presses the "register" button. By performing the processes of steps S20 and S21, the application registering unit 46 is able to acquire a license key of the application ID for which a license key has not been acquired, among the application IDs added to "selected application".

In step S22, the application registering unit 46 of the controller client apparatus 14 specifies the device configuration information ID, the application ID list, and the license key list, and requests the device configuration managing unit 23 of the server apparatus 10 to register an application.

Based on the request to register an application, the device configuration managing unit 23 adds a record to the application configuration information table 29 of FIG. 8.

For example, when the "register" button is pressed in the status of the application selection screen of FIG. 20, the device configuration managing unit 23 adds two records of the device configuration information ID "Conf_0000003" as in the application configuration information table 29 of FIG. 8.

Note that when there is no application ID for which a license key has not been acquired, among the application IDs added to "selected application", the application registering unit 46 omits the processes of steps S20 and S21 and performs the process of step S22.

After the request to register the application is made in step S22, the device configuration information creating unit 44 of the controller client apparatus 14 causes the device configuration information management screen to transition from the display of FIG. 19 to the display of FIG. 22. FIG. 22 is an image diagram of an example of a device configuration information management screen after the application registration has ended. In the device configuration information management screen of FIG. 22, the application IDs registered in step S22 are displayed at the item "application" in the device configuration information.

Furthermore, in the device configuration information management screen of FIG. 22, the item "status" has transitioned from preparation in progress to preparation completed. The device configuration information management screen of FIG. 22 indicates an example in which, the item "status" transitions from preparation in progress to preparation completed when either the item "application" or the item "setting" is registered. Furthermore, in the device configuration information management screen of FIG. 22, the application ID described in the item "application" has a link format, and therefore by clicking the application ID, the registered application ID can be edited.

Figure 23:
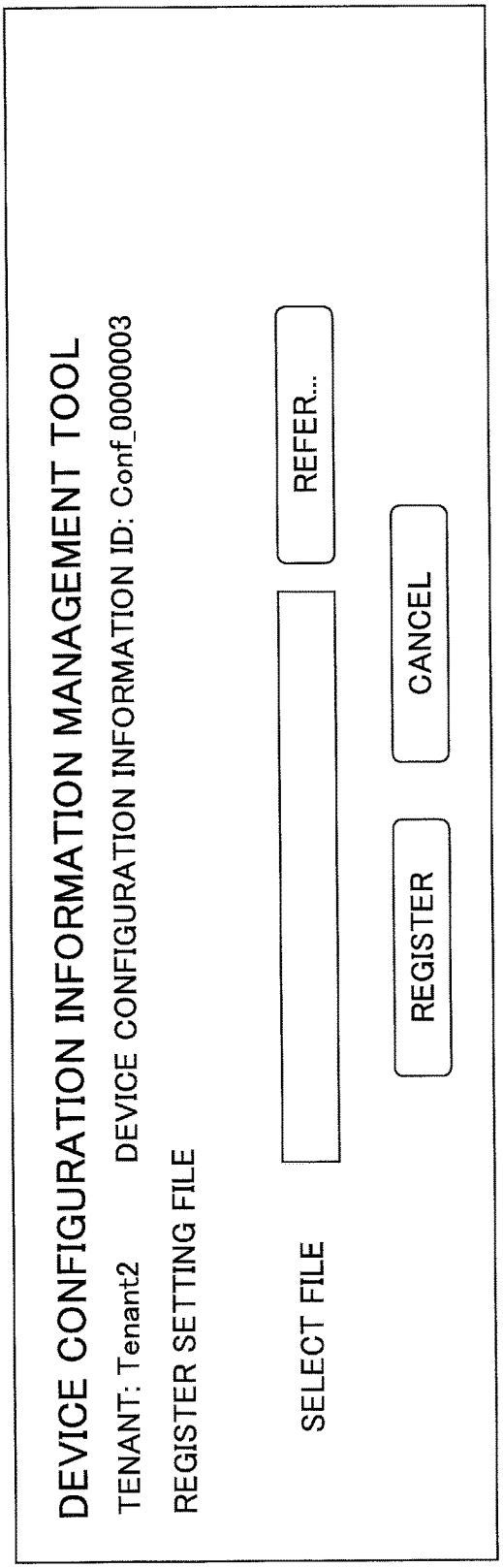
FIG. 23 is an image diagram of an example of a setting file registration screen according to the first embodiment of the present invention.

Furthermore, the controller presses a "register" link at setting in FIG. 22, to display a setting file registration screen, for example, as illustrated in FIG. 23. FIG. 23 is an image diagram of an example of a setting file registration screen. When a "refer" button in the setting file registration screen is pressed, the setting file registering unit 47 displays a file selection dialog, and prompts the controller to select a file.

After selecting a file, when the controller presses a "register" button (step S23), the process proceeds to step S24, and the setting file registering unit 47 uploads the file, which has been selected by the controller, in the device configuration managing unit 23 of the server apparatus 10, and makes a request to register the setting file. In step S25, the device configuration managing unit 23 stores the setting file in the file managing unit 25.

The device configuration managing unit 23 registers a record in the setting file information table 30 of FIG. 9, based on a file path returned from the file managing unit 25. The item "status" in the record, which has been registered in the setting file information table 30, becomes preparation completed.

The device configuration information creating unit 44 of the controller client apparatus 14 displays a "display/correct" link at the item "setting" in the device configuration information, as in the device configuration information of FIG. 24. FIG. 24 is an image diagram of an example of a device configuration information management screen after the application registration and the setting file registration have ended.

In step S26, the controller presses a "schedule" button in the device configuration information management screen of FIG. 24, to make a request for execution scheduling for the registered device configuration information. When the "schedule" button is pressed, in step S27, the device configuration information creating unit 44 specifies the device configuration information ID and requests the device configuration managing unit 23 of the server apparatus 10 to make an execution scheduling. The device configuration managing unit 23 causes the "status" in the device configuration information associated with the device configuration information ID, to transition from preparation completed to execution scheduled.

When the process of the sequence diagram of FIG. 13 is ended, the controller client apparatus 14 displays a device configuration information management screen as illustrated in FIG. 25. FIG. 25 is an image diagram of an example of a device configuration information management screen after the execution scheduling has been made. For example, in the device configuration information management screen of FIG. 25, the item "status" indicates execution scheduled. Furthermore, in the device configuration information management screen of FIG. 25, a "release scheduling" button, which is for changing the item "status" from execution scheduled back to preparation completed, is displayed at the item "operation".

Note that in the process of the sequence diagram of FIG. 13, the browser of the controller client apparatus 14 acquires the license key (of a complimentary application, etc.) held by the application information managing unit 24 of the server apparatus 10, and uses the license key for the application registration process. The device configuration managing unit 23 may acquire the license key from the application information managing unit 24.

Furthermore, in the process of the sequence diagram of FIG. 13, the controller inputs a license key (of a paid application, etc.) that is not held by the application information managing unit 24 of the server apparatus 10; however, a license may be immediately issued (at the time of registering an application), by cooperating with the license managing unit 26.

Operation of Installing Application—First Embodiment

Figure 26:
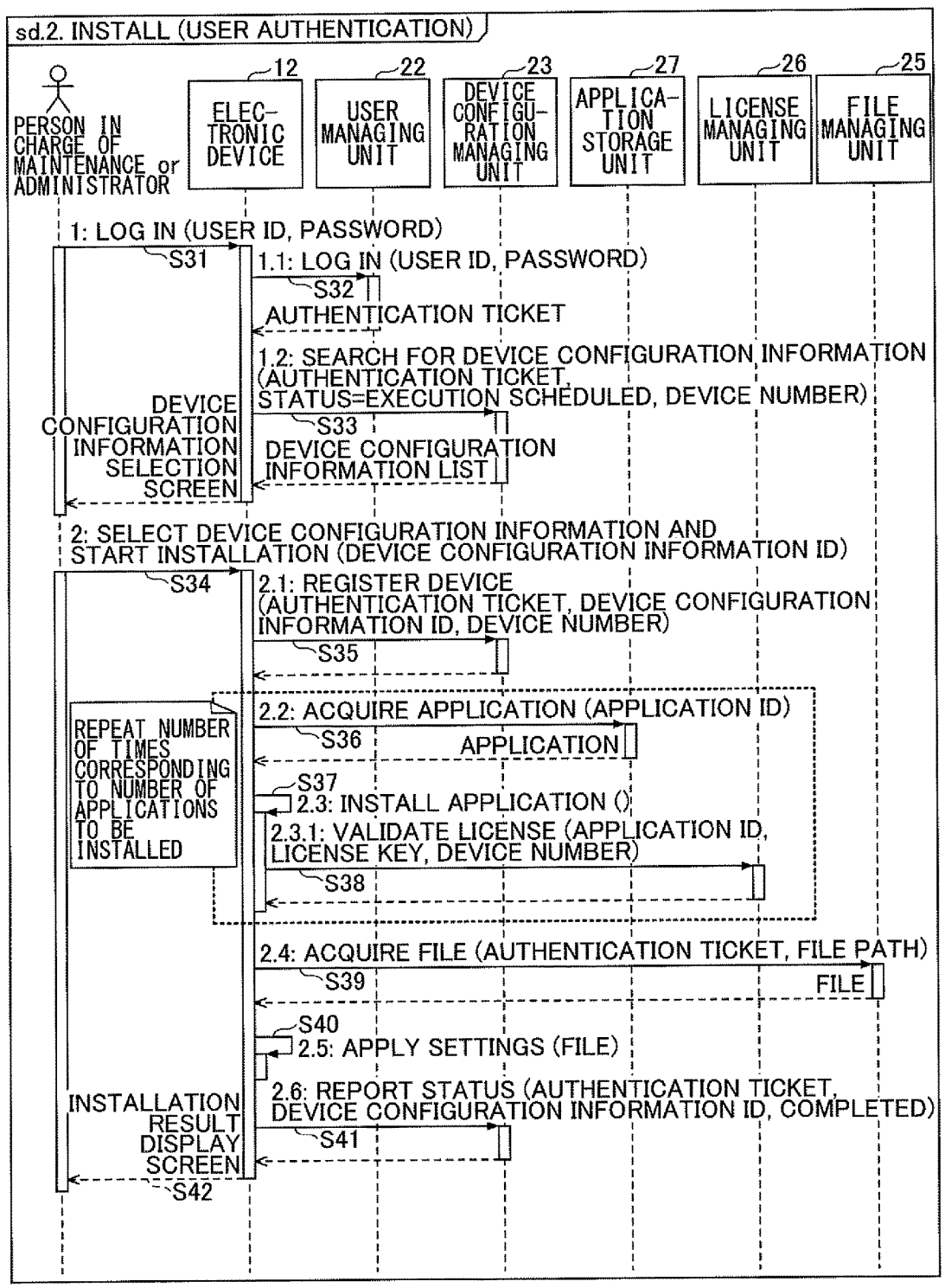
FIG. 26 is a sequence diagram of an example of an operation of installing an application according to the first embodiment of the present invention.
Figure 27:
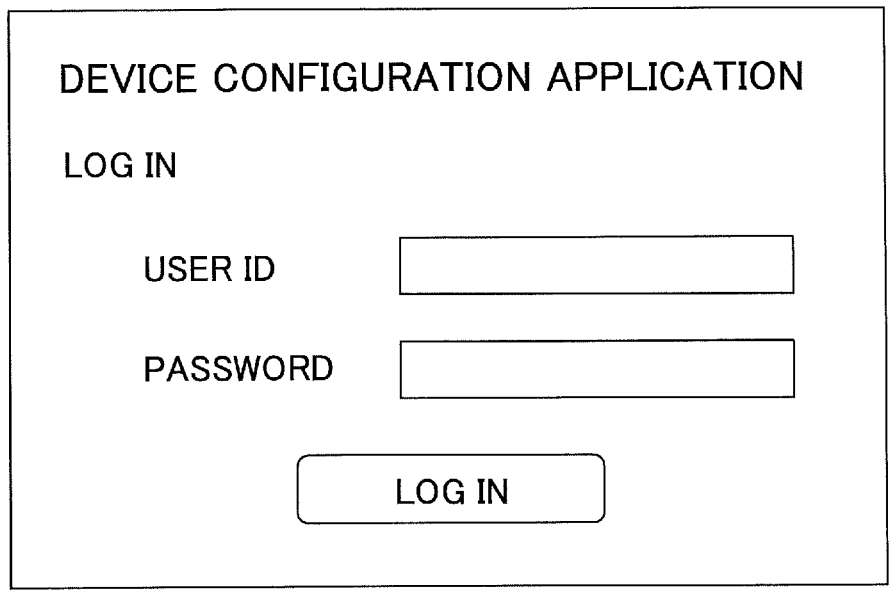
FIG. 27 is an image diagram of an example of a login screen of the device configuration application according to the first embodiment of the present invention.

FIG. 26 is a sequence diagram of an example of an operation of installing an application. An operator activates a device configuration application from, for example, the operation panel of the electronic device 12, and displays a login screen illustrated in FIG. 27. FIG. 27 is an image diagram of an example of a login screen of the device configuration application. The device configuration application may be a web application operating in the browser, or an installed application.

In step S31, the operator inputs a user ID and a password in the login screen of FIG. 27, and requests to log in. In step S32, the login processing unit 62 of the electronic device 12 makes a request to the user managing unit 22 of the server apparatus 10, to log in by the user ID and the password input in the login screen. The user managing unit 22 performs user authentication, and when the login is successful, the user managing unit 22 returns an authentication ticket.

For example, when the administrator logs in as the operator, the login processing unit 62 can identify the tenant to which the administrator belongs, by the returned authentication ticket. In another example, when a maintenance person logs in by using a user ID and a password exclusively used by the maintenance person, the login processing unit 62 is unable to identify the tenant by the returned authentication ticket. Therefore, when the maintenance person logs in as the operator, the maintenance person inputs a tenant ID that is different from the user ID of the maintenance person.

In step S33, the device configuration information searching unit 63 requests the device configuration managing unit 23 of the server apparatus 10 to search for the device configuration information by the tenant ID. The device configuration managing unit 23 searches the device configuration information table 28 for device configuration information in which the status is "execution scheduled", based on the tenant ID, and returns a device configuration information list.

Note that when the parameters of the request to search for the device configuration information includes a parameter of the electronic device 12, the device configuration managing unit 23 searches for device configuration information in which the status is "execution scheduled" and in which there is a matching device number. When there is device configuration information in which the status is "execution scheduled" and in which there is a matching device number, the device configuration managing unit 23 returns the device configuration information in which the status is "execution scheduled" and in which there is a matching device number, to the electronic device 12.

When there is no device configuration information in which the status is "execution scheduled" and in which there is a matching device number, the device configuration managing unit 23 searches the device configuration information table 28 for device configuration information in which the status is "execution scheduled" and in which a device number is not registered based on the tenant ID, and returns a device configuration information list.

FIGS. 28A and 28B illustrate examples of a request for searching for the device configuration information, and a response, respectively. For example, FIG. 28A illustrates an example of a request for searching for device configuration information, and includes a device number (Dev_000003), an authentication ticket (xxxxxxxxxx), and the status "execution scheduled". Furthermore, FIG. 28B illustrates an example of a response, and includes the device configuration information having the device configuration information ID "Conf_0000003" indicated in FIG. 5 and the application configuration information having the device configuration information ID "Conf_0000003" indicated in FIG. 8.

The device registering unit 64 of the electronic device 12, which has received the returned device configuration information list, displays a device configuration information selection screen, for example, as illustrated in FIG. 29. FIG. 29 is an image diagram of an example of a device configuration information selection screen. Note that the example of the device configuration information selection screen of FIG. 29 has been created based on the response illustrated in FIG. 28B.

Furthermore, when the status is "execution scheduled" in the device configuration information table 28 of FIG. 5, the device configuration managing unit 23 searches for device configuration information by the tenant ID "Tenant3", and returns the device configuration information items having the device configuration information IDs "Conf_0000004" and "Conf_0000005", to the electronic device 12. FIG. 30 illustrates an example of a response including a plurality of device configuration information items.

The example of a response illustrated in FIG. 30 includes device configuration information items of the device configuration information IDs of "Conf_0000004" and "Conf_0000005" of FIG. 5, and the application configuration information items of the device configuration information IDs of "Conf_0000004" and "Conf_0000005" of FIG. 8.

The device registering unit 64 of the electronic device 12, which has received the returned device configuration information list, displays a device configuration information selection screen, for example, as illustrated in FIG. 31. FIG. 31 is an image diagram of an example of a device configuration information selection screen. Note that the example of the device configuration information selection screen of FIG. 31 has been created based on the response illustrated in FIG. 30.

When the device configuration information list returned from the server apparatus 10 is blank, there is no device configuration information to be installed, and therefore the device configuration application of the electronic device 12 ends the process of installing an application. For example, in the device configuration information table 28 of FIG. 5, the status of the device configuration information of the tenant ID "Tenant1" is "completed", and therefore this corresponds to an example where there is no device configuration information to be installed.

In step S34, the operator of the electronic device 12 presses an "install" button in the device configuration information selection screen of FIG. 29 or 31, to select device configuration information, and request to start the installation of an application. Note that when the device configuration information can be uniquely identified as in the device configuration information selection screen of FIG. 29, the installation of the application may be automatically started, without displaying the "install" button.

Furthermore, even when a plurality of device configuration information items are registered, if all of the device configuration information items have the same description, the same setting file, and the same application configuration, one of the device configuration information items may be automatically selected and the installation of the application may be automatically started, without displaying the "install" button. A typical case is when a plurality of the electronic devices 12, which are to be used for the same purpose, are delivered at once.

When a large number of the electronic devices 12 are delivered, the work load of registering the device configuration information by the controller increases, and therefore it is preferable to register the device configuration information for a plurality of the electronic devices 12 at once. For example, the device configuration information creating unit 44 may be able to input the number of the electronic devices 12 in the new creation screen illustrated in FIG. 18. The device configuration managing unit 23 of the server apparatus 10 creates a number of records corresponding to the number of the electronic devices 12, in the device configuration information table 28.

Furthermore, in the license key input screen of FIG. 21, when the controller is prompted to input a volume license key for a plurality of the electronic devices 12, and the license managing unit 26 confirms the volume license key, the same license key is registered with respect to a plurality of the electronic devices 12.

After the request to start the installation of an application is made, when a device number is not registered in the device configuration information selected by the operator, in step S35, the device registering unit 64 of the electronic device 12 requests the device configuration managing unit 23 of the server apparatus 10 to register the electronic device 12. In the request to register the electronic device 12 of step S35, the device registering unit 64 specifies the device number of the electronic device 12 and the device configuration information ID of the device configuration information in which the device number is to be registered, and requests the device configuration managing unit 23 to register the device number. The device configuration managing unit 23 registers the device number of the electronic device 12 in the device configuration information having the specified device configuration information ID. Furthermore, the device configuration managing unit 23 updates the status of the specified device configuration information to "execution in progress".

For example, the record of the tenant ID "Tenant2" in the device configuration information table of FIG. 5 is updated as illustrated in FIG. 32. FIG. 32 is a configuration diagram of an example of the device configuration information when the installation of the application is in progress. In the device configuration information of FIG. 32, the item "generation information" is next.

Next, the application installation processing unit 65 of the electronic device 12 repeats the processes of steps S36 through S38 for a number of times corresponding to the number of the applications to be installed, and installs the applications. In step S36, the application installation processing unit 65 specifies the application ID that is associated with the device configuration information selected in step S34, and acquires an execution file of the application from the application storage unit 27 of the server apparatus 10. The device configuration managing unit 23 updates the status of the application configuration information associated with the specified device configuration information ID, to "execution in progress". In step S37, the application installation processing unit 65 installs the application by the acquired execution file.

In step S38, the application installation processing unit 65 specifies the application ID, the license key, and the device number associated with the device configuration information selected in step S34, and causes the license managing unit 26 of the server apparatus 10 to validate the license. The device configuration managing unit 23 updates the status of the application configuration information associated with the specified device configuration information ID, to "completed".

In step S39, the setting applying unit 66 specifies the file path of the setting file of the device configuration information selected by the operator in step S34, and acquires the setting file from the file managing unit 25 of the server apparatus 10. The device configuration managing unit 23 updates the status of the setting file information associated with the specified device configuration information ID, to "execution in progress".

In step S40, the setting applying unit 66 applies the settings of the setting file acquired from the server apparatus 10. The setting file may include settings of the installed application. Therefore, the applying of the settings in step S40 is performed after installing the application in step S37.

In step S41, the status reporting unit 67 of the electronic device 12 reports the status "completed" to the device configuration managing unit 23 of the server apparatus 10. The device configuration managing unit 23 updates the status of the specified device configuration information, to "completed". Furthermore, the device configuration managing unit 23 updates the status of the setting file information associated with the specified device configuration information ID, to "completed".

Subsequently, in step S42, the electronic device 12 displays an installation result display screen on the operation panel, and completes the operation of installing an application.

Figure 33:
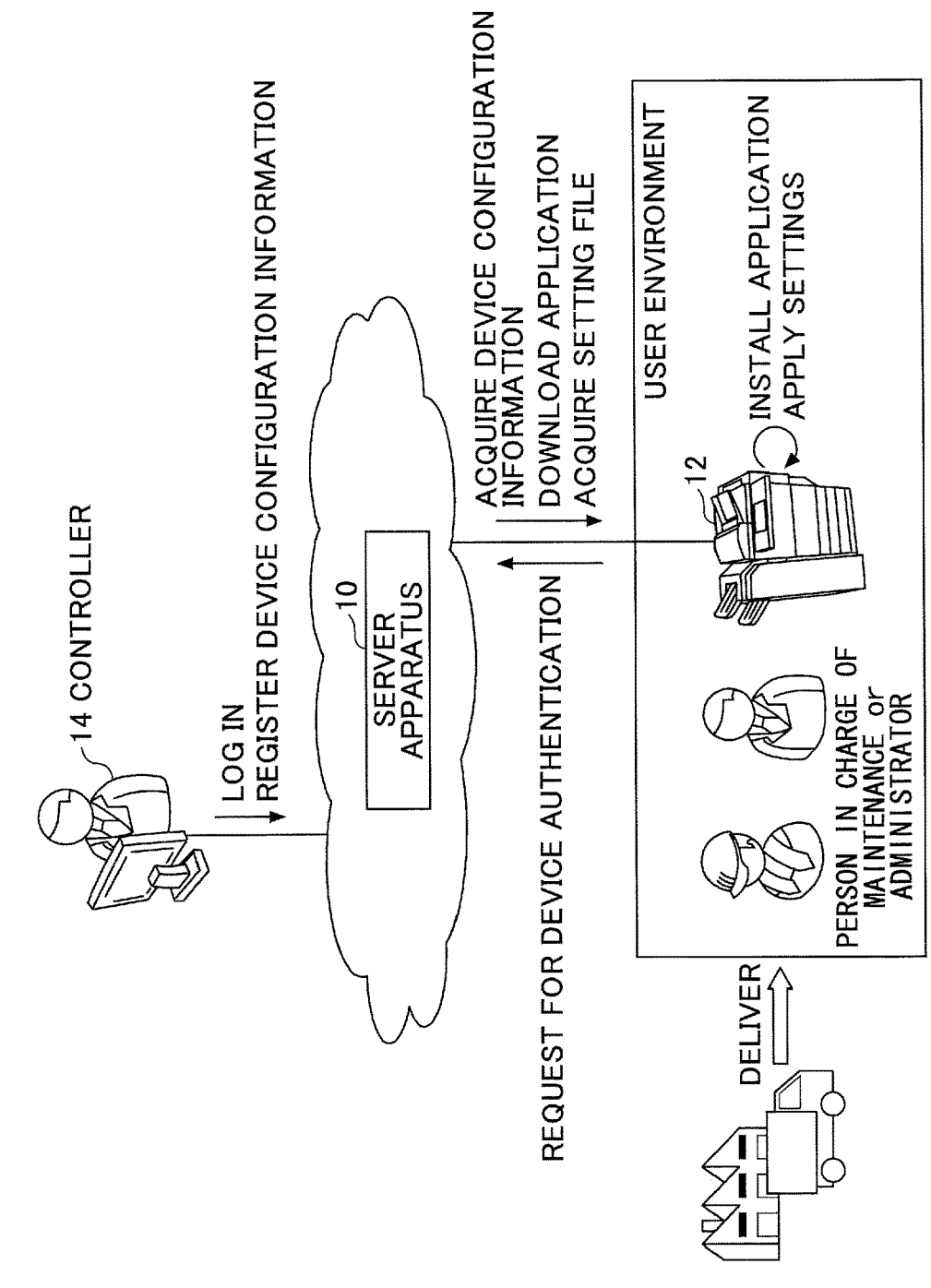
FIG. 33 is a diagram for describing an example of an operation scenario in which the device configuration information is used to install an application in the electronic device according to the first embodiment of the present invention.

Referring to FIG. 12 above, a description has been given of the operation scenario in which the controller associates the device configuration information with the tenant, and this associated device configuration information is used to install an application in the electronic device 12; however, the operation scenario may be as illustrated in FIG. 33.

FIG. 33 is a diagram for describing an example of an operation scenario in which the device configuration information is used to install an application in the electronic device 12. The controller logs into the server apparatus 10 from the controller client apparatus 14, and registers the device configuration information in the server apparatus 10 in association with the device number. In this way, as a preliminary operation, the controller registers the device configuration information in the server apparatus 10 in association with the device number.

After the electronic device 12 is delivered to the user environment, the operator performs an operation of installing the application. The operator operates the electronic device 12, and opens an installation screen. The electronic device 12 requests the server apparatus 10 to perform device authentication. When the device authentication is successful, the electronic device 12 specifies the device number, and acquires device configuration information in which the status is "execution scheduled", from the server apparatus 10.

The electronic device 12 downloads the application from the server apparatus 10 based on the acquired device configuration information, and installs the application. Furthermore, the electronic device 12 acquires a setting file from the server apparatus 10 based on the acquired device configuration information, and applies the settings.

In the following, a description is given of an operation of registering the device configuration information performed in advanced at the controller client apparatus 14 by the controller and an operation of installing an application at the electronic device 12 by the operator, relevant to the operation scenario of FIG. 33.

Operation of Registering Device Configuration Information—First Embodiment

The sequence diagram of the operation of registering the device configuration information relevant to the operation scenario of FIG. 33, is the same as that of FIG. 13, except for some parts. Therefore, a description is given of the different parts by referring to FIG. 13. The process of selecting a tenant of step S13 may be omitted. When the process of selecting a tenant of step S13 is omitted, all of the device configuration information items, which can be referred to by the controller, are displayed on the device configuration information management screen of FIG. 16.

Furthermore, by pressing the "newly create" link of FIG. 16 or 17, the new creation screen of device configuration information is displayed as illustrated in FIG. 34. FIG. 34 is an image diagram of an example of a new creation screen of device configuration information. In FIG. 15, the controller inputs a device number and a description in the new creation screen of FIG. 34, and presses a "create" button.

The device configuration information creating unit 44 specifies the device number and the description input to the new creation screen, and requests the device configuration managing unit 23 of the server apparatus 10 to create device configuration information. The device configuration managing unit 23 of the server apparatus 10 adds device configuration information in which the specified device number and description are registered, in the device configuration information table 28. In this way, in the record in the device configuration information table 28 relevant to the operation scenario of FIG. 33, a device number is already registered from the beginning. Other processes are the same as the operation scenario of FIG. 12, and therefore descriptions are omitted.

Figure 35:
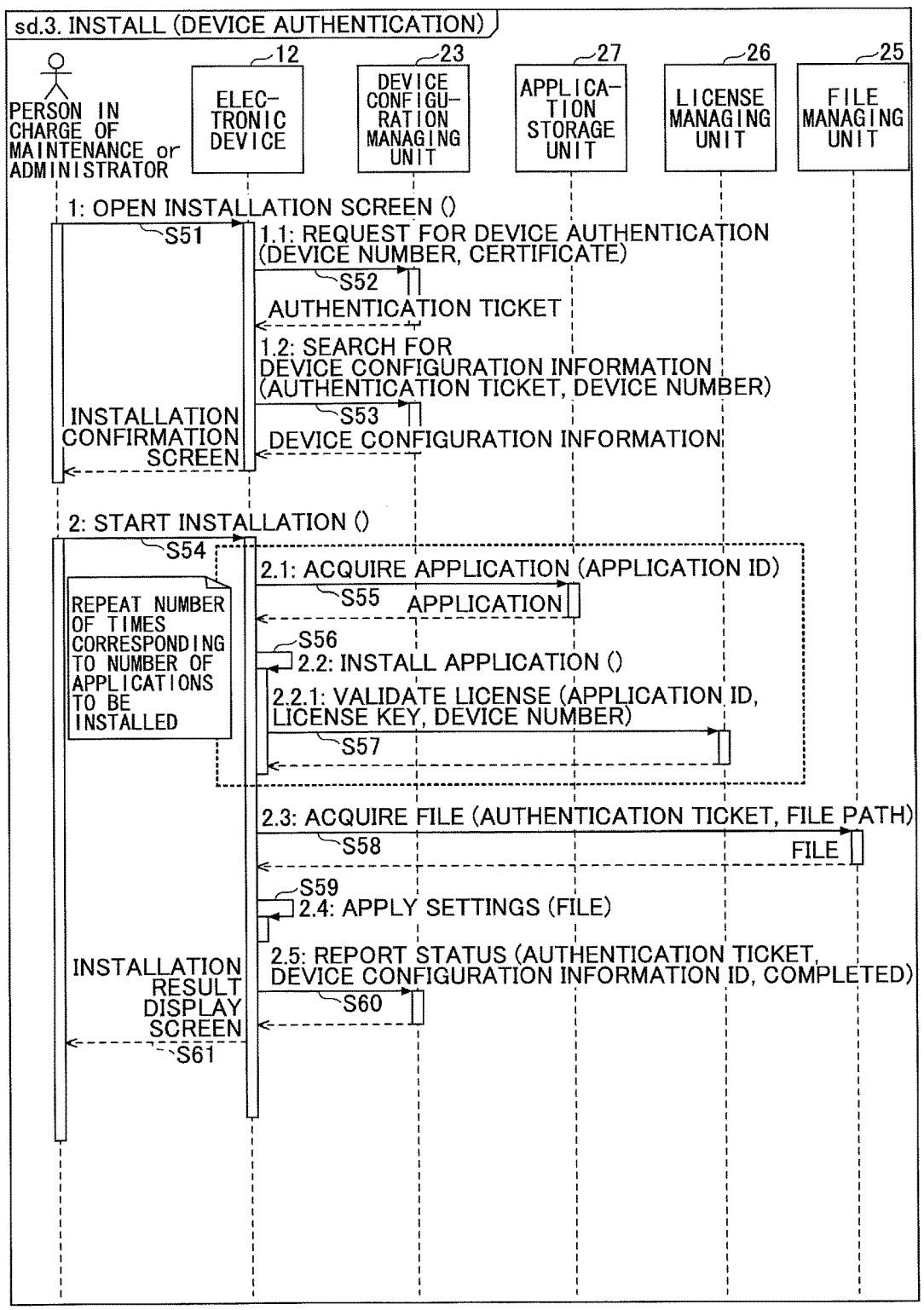
FIG. 35 is a sequence diagram of an example of an operation of installing an application according to the first embodiment of the present invention.

FIG. 35 is a sequence diagram of an example of an operation of installing an application. In the sequence diagram of FIG. 35, device authentication is performed by the electronic device 12, instead of the login process by the operator. Device authentication is performed between a device configuration application operating in the electronic device 12 and the device configuration managing unit 23 of the server apparatus 10, and therefore there is no need for the operator to input information.

For example, in the case where the electronic device 12 is shipped, with a digital certificate identifying an individual device stored in the storage device of the electronic device 12, the device authentication can be implemented by SSL (Secure Sockets Layer)/TLS (Transport Layer Security) client authentication using this digital certificate.

In step S51, when the operator opens the installation screen, in step S52, the electronic device 12 performs device authentication. When the device authentication is successful, in step S53, the electronic device 12 requests the device configuration managing unit 23 of the server apparatus 10 to search for the device configuration information, by the device number. The device configuration managing unit 23 searches the device configuration information table 28 for device configuration information in which the status is "execution scheduled" and in which there is a matching device number, and returns the device configuration information to the electronic device 12.

Either one device configuration information item, or no device configuration information, is returned to the electronic device 12. When there is no corresponding device configuration information, the device configuration application ends the process. When there is corresponding device configuration information, the electronic device 12 performs the processes of step S54 and onward, according to the device configuration information returned from the server apparatus 10. The device configuration information can be uniquely identified by the device number, and therefore the installation of the application can be automatically started, without displaying the "install" button in the device configuration information selection screen of FIG. 29 or 31. Furthermore, the device number is already registered from the beginning, and therefore there is no need for the process of registering the electronic device 12 of step S35 in FIG. 26.

Figure 36:
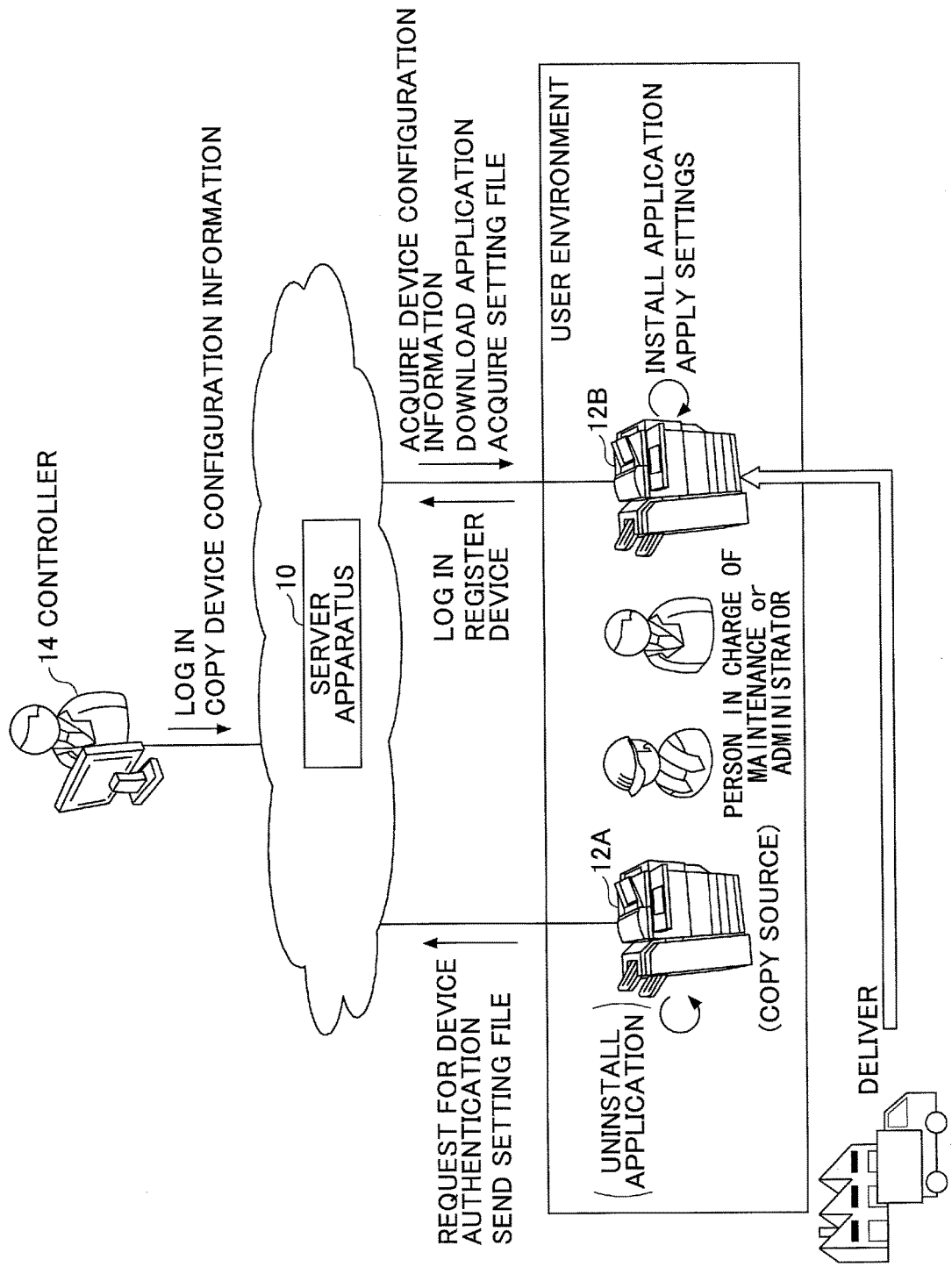
FIG. 36 is a diagram for describing an example of an operation scenario in which device configuration information is used to install an application in the electronic device provided for the purpose of replacement or addition according to the first embodiment of the present invention.

Installation of Application to Electronic Device for Replacement or Addition—First Embodiment In the present embodiment, for example, as illustrated in FIG. 36, an application is installed in the electronic device 12 provided for the purpose of replacement or addition. FIG. 36 is a diagram for describing an example of an operation scenario in which device configuration information is used to install an application in the electronic device 12 provided for the purpose of replacement or addition.

In FIG. 36, the electronic device 12 installed in the user environment is expressed by two separate electronic devices; that is, an electronic device 12A that is the copy source from which the device configuration information is copied, and an electronic device 12B that is the copy destination and that is provided for the purpose of replacement or addition.

The electronic device 12A is replaced by the electronic device 12B, for example, when the operation of the electronic device 12A having a device number "Dev_000003" in "Tenant2" becomes unstable. Furthermore, the electronic device 12B may be installed in addition to the electronic device 12A, for example, to increase the efficiency of the business. Note that it is assumed that the device configuration information, which is associated with "Tenant2" in the device configuration information table 28 in the server apparatus 10, is updated, for example, from the device configuration information of FIG. 5 to the device configuration information in FIG. 37, by the operation scenario of installing the application as described above. FIG. 37 is a configuration diagram of an example of device configuration information when the installation of the application has been completed.

The controller logs into the server apparatus 10 from the controller client apparatus 14, and copies the device configuration information of the electronic device 12A that is the copy source, as a preliminary operation. The copied device configuration information is registered in the server apparatus 10 in association with "Tenant2".

After the electronic device 12B that is the copy destination is delivered to the user environment, the operator performs a data migration operation at the electronic device 12A that is the copy source, and an application installation operation at the electronic device 12B that is the copy destination.

Operation of Copying Device Configuration Information—First Embodiment

Figure 38:
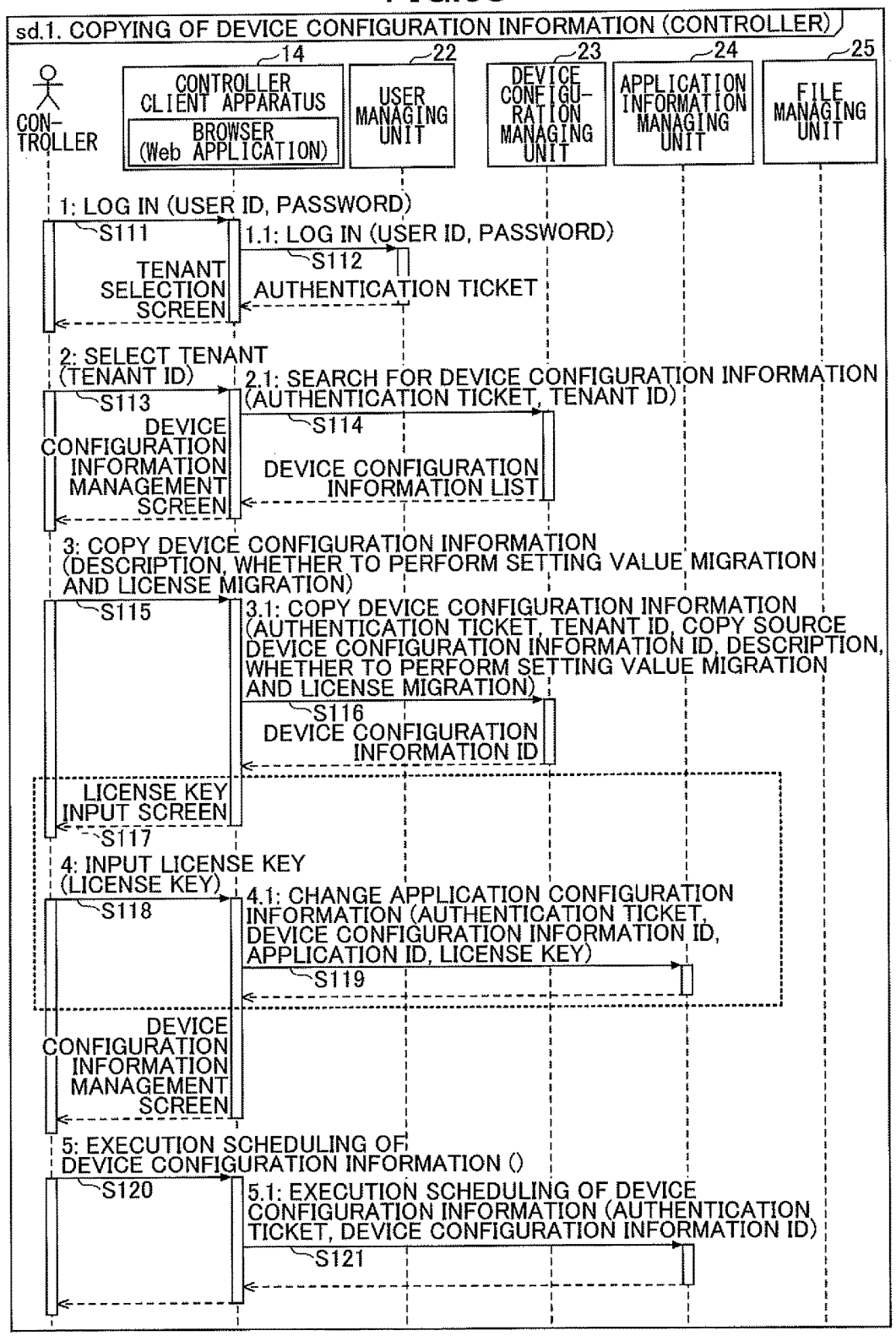
FIG. 38 is a sequence diagram of an example of an operation of copying device configuration information according to the first embodiment of the present invention.

FIG. 38 is a sequence diagram of an example of an operation of copying device configuration information. The controller accesses a device configuration information management tool from a browser operating in the controller client apparatus 14 to log into the server apparatus 10 from the login screen of FIG. 14, and displays the tenant selection screen of FIG. 15. (steps S111 and S112).

The controller inputs a tenant ID in the tenant selection screen of FIG. 15 and presses an "open" button, to display a device configuration information management screen, for example, as illustrated in FIG. 39 (steps S113 and S114). FIG. 39 is an image diagram of an example of a device configuration information management screen. Note that the example of the device configuration information management screen of FIG. 39 has been created based on the device configuration information table illustrated in FIG. 37.

Figure 40:
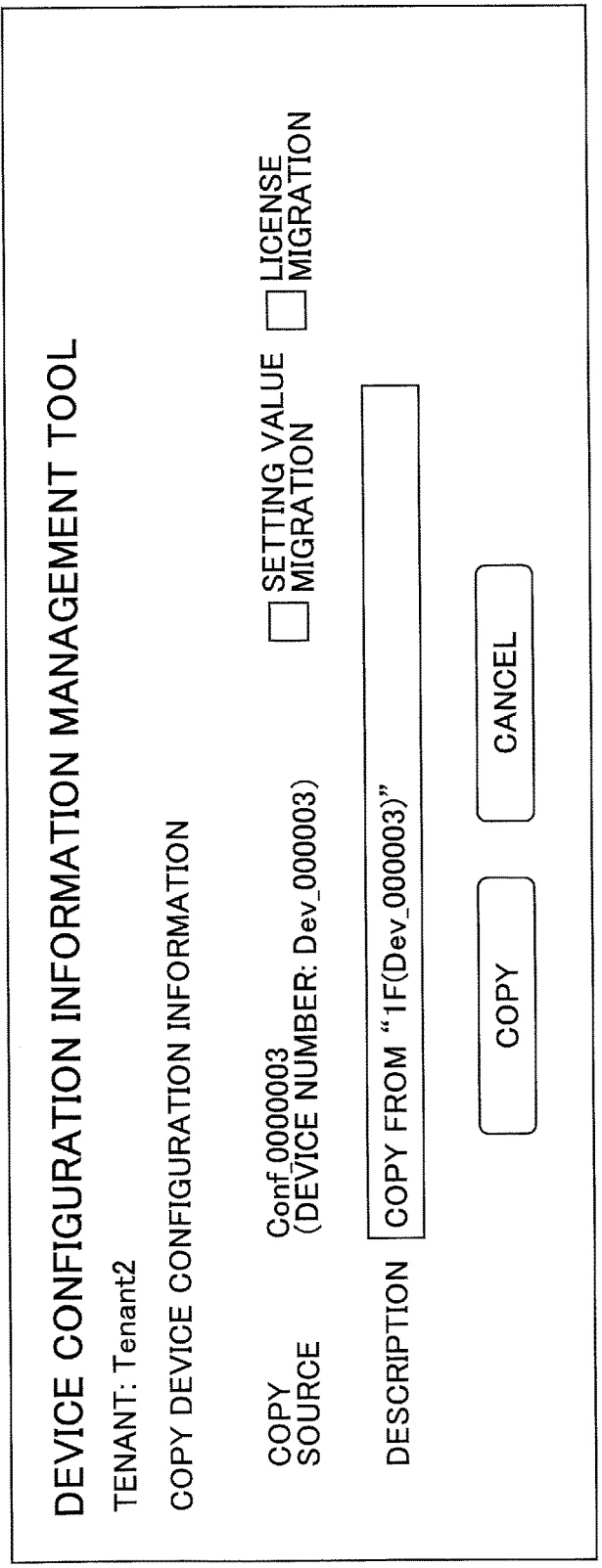
FIG. 40 is an image diagram of an example of a device configuration information copy screen according to the first embodiment of the present invention.

When a "copy" button in the device configuration information management screen of FIG. 39 is pressed, the device configuration information copy processing unit 48 of the controller client apparatus 14 displays a device configuration information copy screen as illustrated in FIG. 40 (step S115). FIG. 40 is an image diagram of an example of a device configuration information copy screen. In the example of the device configuration information copy screen of FIG. 40, the device configuration information ID and the device number of the electronic device 12A that is the copy source, and a description of the device configuration information to be copied are displayed, and also a tick-box of setting value migration and a tick-box of license migration are displayed.

For example, when replacing the electronic device 12A with the electronic device 12B, the setting values and the license of the electronic device 12A need to be transferred to the electronic device 12B that is the copy destination. Therefore, when the electronic device 12A is to be replaced with the electronic device 12B, the controller ticks the tick-boxes of "setting value migration" and "license migration". Furthermore, at the description of the device configuration information to be copied, a description by which the electronic device 12A, which is the copy source of the device configuration information, can be recognized (for example, copy from 1F (Dev_000003)), is displayed. The controller may be able to change the description of the device configuration information to be copied.

For example, when the electronic device 12B is to be added based on the electronic device 12A, the setting values of the electronic device 12A need to be transferred to the electronic device 12B that is the copy destination. Therefore, the controller ticks the tick-box of "setting value migration", when adding the electronic device 12B based on the electronic device 12A.

Note that the controller can freely select whether to have the setting values and the license transferred from the electronic device 12 to the electronic device 12B that is the copy destination. Furthermore, when adding a plurality of the electronic devices 12B based on the electronic device 12A, in order to simplify the task of the controller, an input field for inputting the number of electronic devices may be provided in the device configuration information copy screen of FIG. 40, and device configuration information may be copied at once for a plurality of electronic devices.

When the "copy" button in the device configuration information management screen of FIG. 40 is pressed, the device configuration information copy processing unit 48 specifies the tenant ID, the device configuration information ID of the copy source, the description, whether the setting values are to be transferred, and whether the license is to be transferred, and requests the server apparatus 10 to copy the device configuration information (step S116).

When the device configuration managing unit 23 of the server apparatus 10 receives, from the controller client apparatus 14, the request to copy the device configuration information, the device configuration managing unit 23 adds (copies) a record to the device configuration information table 28, the application configuration information table 29, and the setting file information table 30.

When the setting value migration is specified as "necessary" and the license migration is specified as "unnecessary", the device configuration managing unit 23 adds the records, for example, as illustrated in FIG. 41, to the device configuration information table 28. Furthermore, the device configuration managing unit 23 adds the records, for example, as illustrated in FIG. 42, to the application configuration information table 29. Furthermore, the device configuration managing unit 23 adds the records, for example, as illustrated in FIG. 43, to the setting file information table 30.

FIG. 41 is a configuration diagram of an example of the records that are added to the device configuration information table, when the setting value migration is specified as "necessary" and the license migration is specified as "unnecessary". FIG. 42 is a configuration diagram of an example of the records that are added to the application configuration information table when the license migration is specified as "unnecessary". Furthermore, FIG. 43 is a configuration diagram of an example of the records that are added to the setting file information table when the setting value migration is specified as "necessary".

The status of the setting file of the copy source in the setting file information table in FIG. 43 (top record) is "preparation completed". This is because it is not known whether the setting file, which is registered in the device configuration information of the copy source, is the latest setting, and therefore this setting file is temporarily deleted. Note that at this stage, data, which indicates to export a setting file associated with the device configuration information of the copy source, is stored in the setting file information table.

The latest setting file exported from the electronic device 12A that is the copy source, is imported later into the electronic device 12B that is the copy destination. Note that at this stage, data, which indicates to copy a setting file associated with the device configuration information of the copy source, is stored in the setting file information table.

In the application configuration information table of FIG. 42, the bottom two records are the added records. The application having the application ID "FreeApp_001" is an example of a complimentary application, and therefore the license key is copied from the application configuration information of the copy source. Note that a query may be sent to the license managing unit 26 to ask whether it is possible to copy the license key.

The license may have a flag indicating complementary or paid, as an attribute. Furthermore, when the license is applicable to a plurality of electronic devices 12 and the license key can be copied, the number of electronic devices 12 to which the license is applicable may be set as unlimited.

The application having the application ID "PaidApp_002" is an example of a paid application, and therefore a new license key needs to be input. Thus, in the application configuration information table of FIG. 42, the item "license key" is blank.

The device configuration managing unit 23 of the server apparatus 10 returns the device configuration information ID of the copied device configuration information, to the controller client apparatus 14. In step S117, the device configuration information copy processing unit 48 of the controller client apparatus 14, which has received the returned device configuration information ID, displays a license key input screen, for example, as illustrated in FIG. 21, with respect to an application ID for which the item "license key" is blank.

In step S118, the controller inputs a license key in the license key input screen of FIG. 21, and presses the "register" button. In step S119, the application registering unit 46 of the controller client apparatus 14 specifies the device configuration information ID, the application ID, and the license key, and requests the device configuration managing unit 23 of the server apparatus 10 to change the application configuration information.

The device configuration managing unit 23 adds, for example, a license key "Lic_002_000003" to the record in the application configuration information table 29 of the application ID "PaidApp_002" illustrated in FIG. 42, based on the request to change the application configuration information. In response to the license key being added, the status of the record of the application ID "PaidApp_002" in the application configuration information table 29 illustrated in FIG. 42 transitions from preparation in progress to preparation completed.

After the request to change the application configuration information is made in step S119, the device configuration information copy processing unit 48 of the controller client apparatus 14 displays a device configuration information management screen of FIG. 44. FIG. 44 is an image diagram of an example of a device configuration information management screen when the device configuration information has been copied. Note that the device configuration information copy processing unit 48 of the controller client apparatus 14 may be able to further add an application with respect the copied device configuration information, from the device configuration information management screen of FIG. 44.

Furthermore, when the device configuration information has been copied at once for a plurality of electronic devices 12, a license key is input with respect to the application configuration information corresponding to each device configuration information item. Note that when the license key is for a volume license, the same license key may be registered at the same time for a plurality of device configuration information items.

Furthermore, when a request to copy the device configuration information is received from the controller client apparatus 14, and when the setting value migration is specified as "necessary" and the license migration is specified as "necessary", the device configuration managing unit 23 of the server apparatus 10 performs the following process.

The device configuration managing unit 23 adds (copies) the records to the device configuration information table 28, the application configuration information table 29, and the setting file information table 30. The records to be added to the device configuration information table are the same as those illustrated in FIG. 41.

The record to be added to the application configuration information table is as illustrated in FIG. 45. FIG. 45 is a configuration diagram of an example of a record to be added to the application configuration information table when the license migration is specified as "necessary". With respect to the complimentary application having the application ID "FreeApp_001", the record will be the same as that of the case when the license migration is specified as "unnecessary" illustrated in FIG. 42.

On the other hand, with respect to the paid application having the application ID "PaidApp_002", data, which indicates "invalidation in progress", is stored at the item "license key" of the electronic device 12A that is the copy source. Furthermore, data, which indicates "license migration in progress", is stored together with the license key of the copy source, at the item "license key" of the electronic device 12B that is the copy destination. Note that there is no need for a new license key, and therefore the device configuration information copy processing unit 48 of the controller client apparatus 14 displays a device configuration information management screen of FIG. 46, without displaying a license key input screen. FIG. 46 is an image diagram of an example of a device configuration information management screen when the device configuration information has been copied. That is, the processes of steps S117 through S119 of FIG. 38 are omitted.

Furthermore, when the device configuration information has been copied at once for a plurality of electronic devices 12, with respect to the first electronic device 12, license migration can be performed according to the case where the license migration is specified as "necessary"; however, with respect to the second electronic device 12 and onward, the license key is input and registered according to the case where the license migration is specified as "unnecessary", in the application configuration information. Note that the device configuration information copy processing unit 48 of the controller client apparatus 14 may be able to further add an application with respect the copied device configuration information, from the device configuration information management screen of FIG. 46.

In step S120, the controller presses a "schedule" button in the device configuration information of the copy source provided in the device configuration information management screen of FIG. 44 or 46, to make a request for execution scheduling for the process of copying the device configuration information.

When the "schedule" button in the device configuration information of the copy source is pressed, the process proceeds to step S121, and the device configuration information creating unit 44 specifies the device configuration information ID and requests the device configuration managing unit 23 of the server apparatus 10 to make the execution scheduling. The device configuration managing unit 23 causes the "status" in the device configuration information associated with the device configuration information ID, to transition from preparation completed to execution scheduled.

When the process of the sequence diagram of FIG. 38 is ended, the controller client apparatus 14 displays a device configuration information management screen as illustrated in FIG. 47. FIG. 47 is an image diagram of an example of a device configuration information management screen after the execution scheduling of copying the device configuration information has been made. For example, in the device configuration information management screen of FIG. 47, the item "status" in the device configuration information of the copy source is execution scheduled. Furthermore, in the device configuration information management screen of FIG. 47, there is provided a "release scheduling" button, which is for changing the item "status" of the device configuration information of the copy source from execution scheduled back to preparation completed.

Note that when the controller presses the "copy" button in the device configuration information management screen, without ticking the tick-boxes of "setting value migration" or "license migration" in the device configuration information copy screen of FIG. 40, a device configuration information management screen as illustrated in FIG. 48 is displayed. FIG. 48 is an image diagram of an example of a device configuration information management screen after the execution scheduling for copying the device configuration information has been made. Neither the setting value migration nor the license migration is to be performed, and therefore the item "status" in the device configuration information of the copy source indicates completed, in the device configuration information management screen of FIG. 48. Furthermore, in the device configuration information management screen of FIG. 48, the item "status" in the device configuration information of the copy destination indicates preparation completed, and a "schedule" button is provided for causing the item "status" in the device configuration information of the copy destination to transition from preparation completed to execution scheduled.

Figure 49:
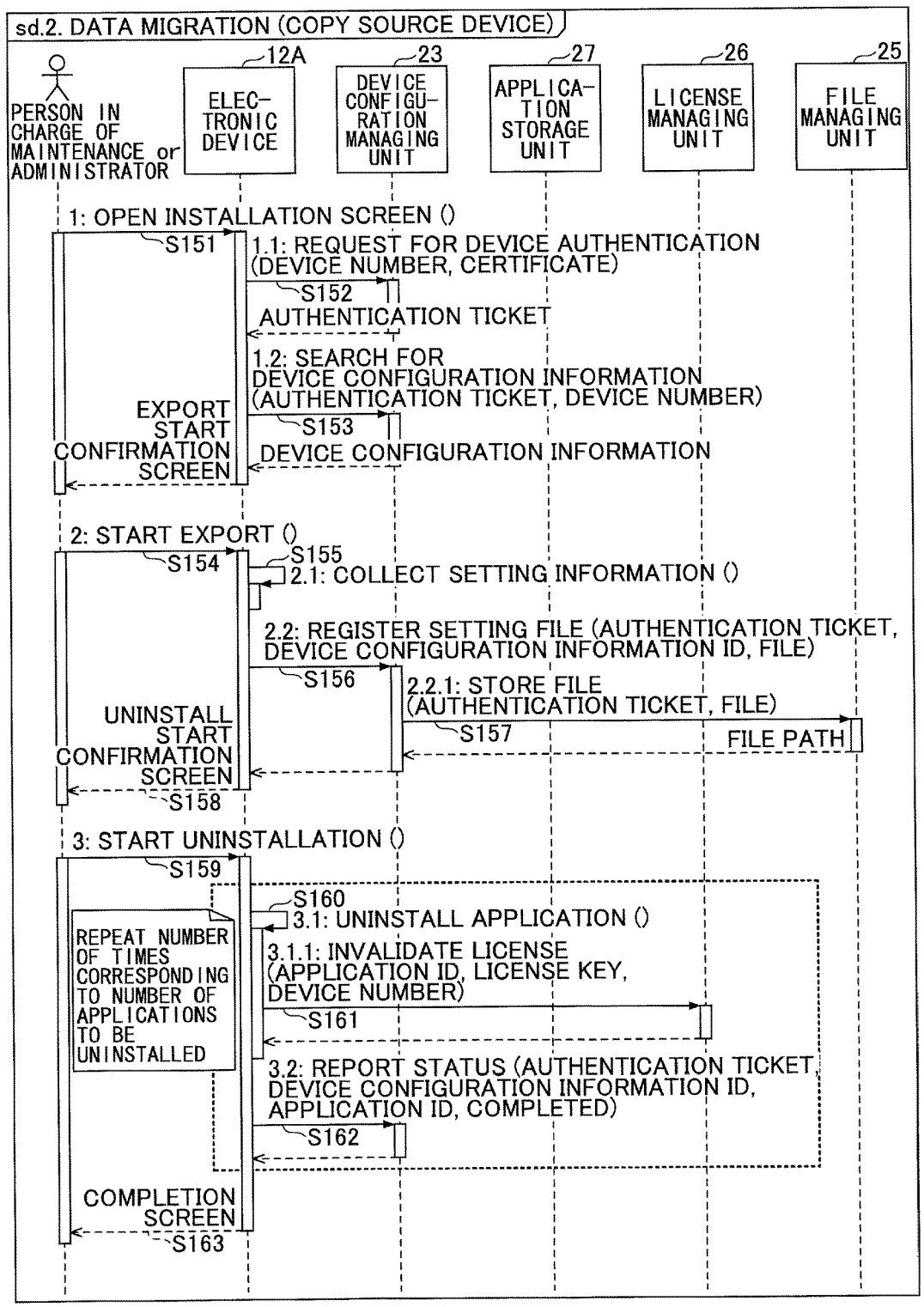
FIG. 49 is a sequence diagram of an example of a data migration operation at the electronic device that is the copy source according to the first embodiment of the present invention.

Data Migration Operation at Electronic Device that is Copy Source—First Embodiment FIG. 49 is a sequence diagram of an example of a data migration operation at the electronic device 12 that is the copy source. For the electronic device 12A that is the copy source, the device registration has been done, and therefore the device configuration information can be identified by device authentication. Thus, the sequence diagram of FIG. 49 indicates a sequence that starts from device authentication; however, the sequence may start from the login by the operator.

The processes of steps S151 and S152 are the same as steps S51 and S52 of FIG. 35. When the device authentication is successful, in step S153, the device configuration information searching unit 63 of the electronic device 12A requests the device configuration managing unit 23 of the server apparatus 10 to search for the device configuration information by the device number. The device configuration managing unit 23 searches the device configuration information table 28 for device configuration information having a matching device number, and returns search-found device configuration information to the electronic device 12A.

Figure 50:
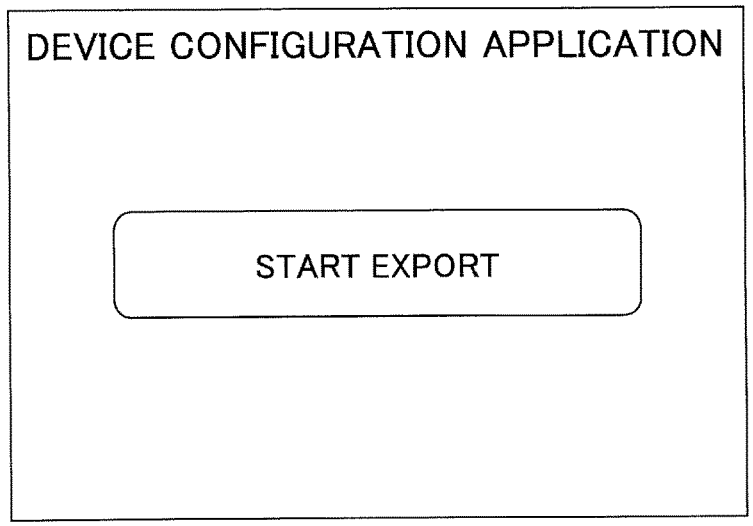
FIG. 50 is an image diagram of an example of an export start confirmation screen according to the first embodiment of the present invention.

When the status is "execution scheduled", and device configuration information storing data indicating to export a setting file is received, the device configuration application of the electronic device 12A displays an export start confirmation screen of FIG. 50. FIG. 50 is an image diagram of an example of an export start confirmation screen. The export start confirmation screen of FIG. 50 is a screen for prompting the operator to confirm the start of a process of exporting the setting file.

In step S154, the electronic device 12A accepts an instruction to start the export from the operator as the operator presses a "start export" button in the export start confirmation screen of FIG. 50. In step S155, the application migration processing unit 68 of the electronic device 12A collects the setting values of the respective modules store in a secondary storage area, and creates a setting file.

In step S156, the application migration processing unit 68 specifies the device configuration information ID and requests the device configuration managing unit 23 of the server apparatus 10 to register the created setting file. In step S157, the device configuration managing unit 23 causes the file managing unit 25 to store the setting file for which a registration request has been received from the electronic device 12A. Then, the file managing unit 25 uses a file path of the setting file returned from the file managing unit 25, to update the setting file information table of FIG. 43, and also causes the item "status" to transition from preparation completed to completed.

Figure 51:
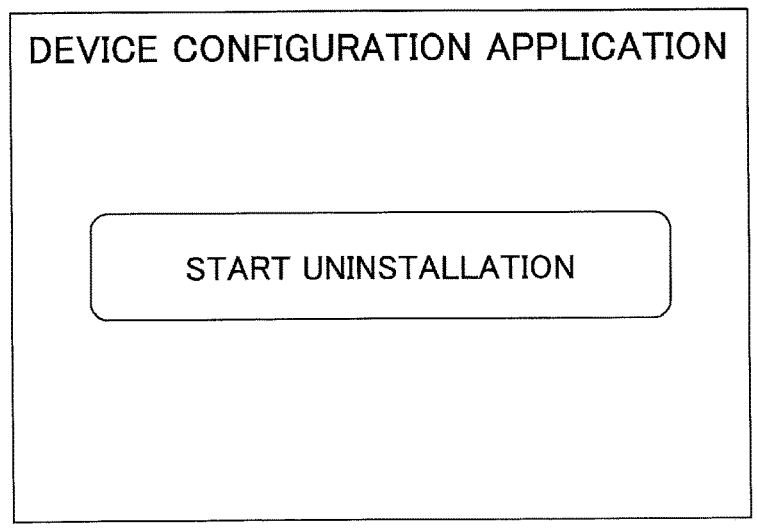
FIG. 51 is an image diagram of an example of an uninstall start confirmation screen according to the first embodiment of the present invention.

The application migration processing unit 68 of the electronic device 12A performs the process of step S158, when data indicating "invalidation in progress" is stored at the item "license key" in the application configuration information received together with the device configuration information. In step S158, the application migration processing unit 68 displays an uninstall start confirmation screen of FIG. 51 that is for prompting the operator to confirm the start of the uninstalling. FIG. 51 is an image diagram of an example of an uninstall start confirmation screen.

In step S159, the electronic device 12A accepts an instruction to start the uninstalling from the operator, as the operator presses a "start uninstall" button in the uninstall start confirmation screen of FIG. 51. The processes of steps S160 through S162 are repeated for a number of times corresponding to the number of applications to be uninstalled.

In step S160, the application migration processing unit 68 uninstalls an application for which data indicating "invalidation in progress" is stored in the item "license key" in the application configuration information. In step S161, the application migration processing unit 68 specifies the application ID, the license key, and the device number, and requests the license managing unit 26 to invalidate the license.

In step S162, the status reporting unit 67 of the electronic device 12A specifies the device configuration information ID and the application ID, and reports the status of uninstall completed, to the device configuration managing unit 23 of the server apparatus 10. The device configuration managing unit 23 stores data indicating "uninstall done" at the item "license key" in the application configuration information.

Note that the device configuration managing unit 23 may delete the record of the invalidated license from the application configuration information table 29. Furthermore, in the sequence diagram of FIG. 49, the license is invalidated in the process of uninstalling the application; however, only the license may be invalidated without uninstalling the application.

Furthermore, the reporting of the status of uninstall completed in step S162 may be implemented by having the license managing unit 26, which has accepted the request to invalidate license, to send the report to the device configuration managing unit 23. In this case, data indicating "invalidation done" is stored at the item "license key" in the application configuration information.

After repeating the processes of steps S160 through S162 for a number of times corresponding to the number of applications to be uninstalled, in step S163, the application migration processing unit 68 of the electronic device 12A displays a data transition operation completion screen. Furthermore, the item "status" in the device configuration information of the copy source transitions from execution scheduled to completed.

Application Installation Operation at Electronic Device that is Copy Destination—First Embodiment The application installation operation at the electronic device 12B that is the copy destination is the same as that indicated in the sequence diagram of FIG. 26, except for some parts. The application installation operation at the electronic device 12B that is the copy destination is different from that of the sequence diagram of FIG. 26 in that the application installation operation is performed after the data migration operation of transferring the data from the electronic device 12A that is the copy source (the installing of the application and the applying of the setting file) has been completed.

It can be determined as to whether the data migration operation of transferring the data from the electronic device 12A that is the copy source (the installing of the application and the applying of the setting file) has been completed, according to whether the item "status", in the device configuration information of the copy source, is "completed".

For example, in the case of the device configuration information table 28 of FIG. 41, in step S33, device configuration information having a device configuration information ID of "Conf_0000006" is returned as the device configuration information of the copy destination. When device configuration information for a plurality of the electronic devices 12 has been copied at once, the operator is prompted to select device configuration information from a plurality of device configuration information items returned n step S33. In step S35, the electronic device 12B is registered, and the device number of the electronic device 12B that is the copy destination is registered at the item "device number" in the device configuration information of the copy destination. The device registering unit 64 of the electronic device 12, which has received the returned device configuration information of the copy destination, displays a device configuration information selection screen, for example, as illustrated in FIG. 52. FIG. 52 is an image diagram of an example of a device configuration information selection screen.

When the license is to be transferred, the process of uninstalling of the application of steps S36 through S39 needs to wait for the process of invalidating of the license at the electronic device 12A that is the copy source, to be completed. When the status of the device configuration information ID "Conf_0000003" is "completed", the electronic device 12B can determine that the invalidation of the license has been completed.

When the electronic device 12B determines that the invalidation of the license has not been completed, after proceeding to the installing of the application of step S37, the electronic device 12B stands by without performing the process of step S38 until the electronic device 12B determines that the invalidation of the license has been completed. In step S38, the electronic device 12B validates the license key "Lic_002_000001". Then, in step S39, the status reporting unit 67 of the electronic device 12 reports a status "application installation completed" to the device configuration managing unit 23 of the server apparatus 10.

Furthermore, the process of applying of the setting file in steps S40 through S42 needs to be waited until the exporting of the setting file is completed at the electronic device 12A that is the copy source. When the status of the device configuration information ID "Conf_0000003" is "completed", the electronic device 12B can determine that the exporting of the setting file has been completed. When the electronic device 12B determines that the exporting of the setting file has not been completed, the electronic device 12B stands by without performing the process of step S40.

Specifically, the electronic device 12B acquires the device configuration information having the device configuration information ID "Conf_0000003" from the server apparatus 10 at predetermined time intervals, and waits for the item "status" to transition from "execution scheduled" to "completed".

After detecting this status (completed), the electronic device 12B performs the process of step S40. The electronic device 12B specifies the file path and acquires the setting file from the server apparatus 10. In step S41, the electronic device 12B applies the settings of acquired setting file.

In step S42, the status reporting unit 67 of the electronic device 12B reports the status "completed" to the device configuration managing unit 23 of the server apparatus 10. The device configuration managing unit 23 updates the item "setting file" in the setting file information associated with the specified device configuration information.

Flowchart of Electronic Device—First Embodiment

Figure 53:
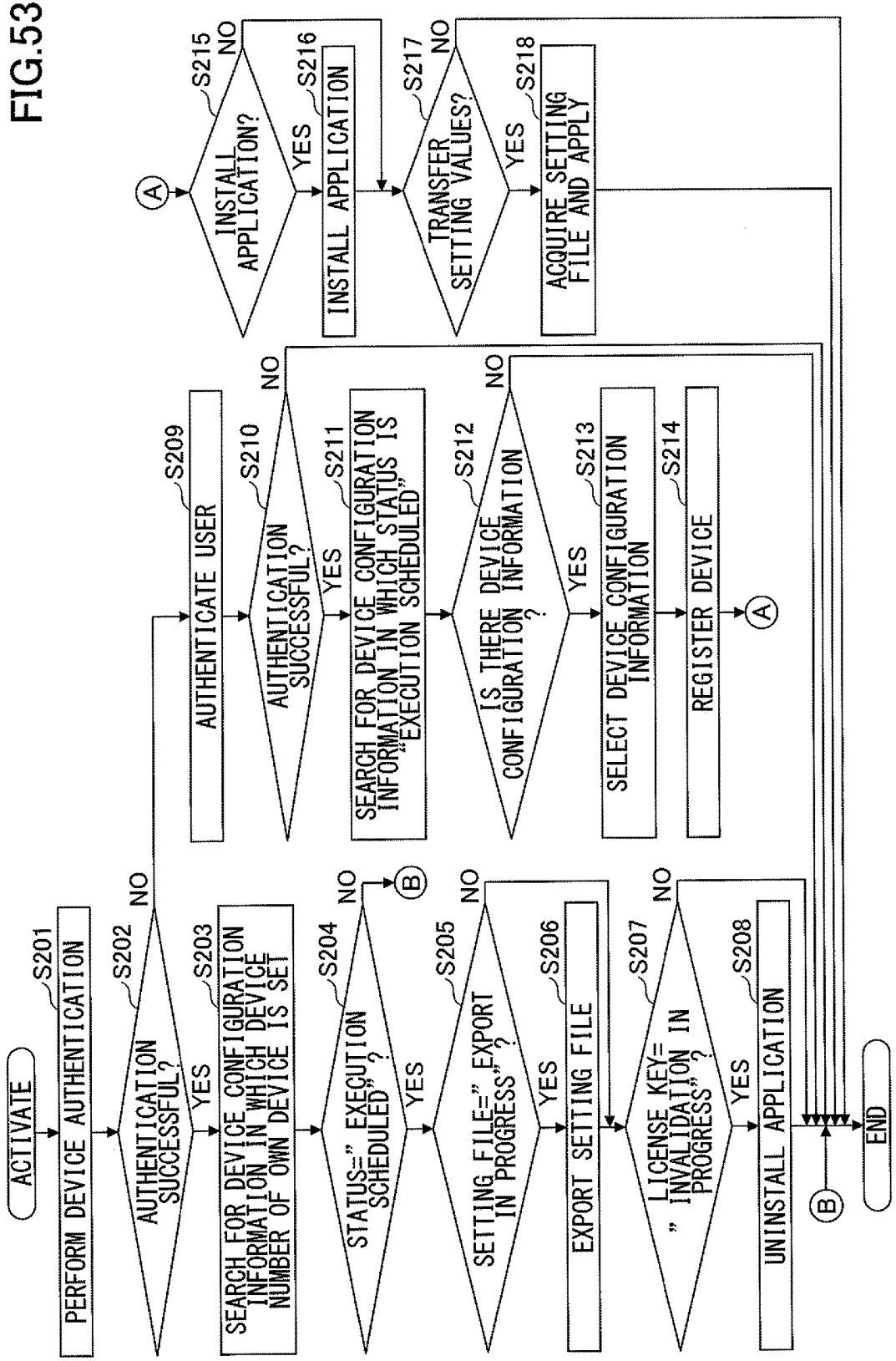
FIG. 53 is a flowchart of an example of a process by the electronic device according to the first embodiment of the present invention.

The process of the above sequence diagram can be implemented by a process by the electronic device 12 as illustrated in a flowchart of FIG. 53. FIG. 53 is a flowchart of an example of a process by the electronic device 12. Note that in the flowchart of FIG. 53, the displaying of a screen, user input, and the loop with respect to a plurality of targets are omitted.

In step S201, the electronic device 12 starts with device authentication, and only when device registration has been completed, the device authentication becomes successful in this example. Steps S203 through S208 are processes performed by the electronic device 12A that is the copy source. Steps S209 through S218 are processes performed by the electronic device 12B that is the copy destination (or the electronic device 12 that installs an application independently). Note that a description of an example of the operation scenario of FIG. 36 is described here.

In step S201, the electronic device 12A or 12B performs device authentication. In the case of performing device authentication from the electronic device 12A, the device authentication is successful (YES in step S202), and the process proceeds to step S203. Note that in the case of performing device authentication from the electronic device 12B, the device authentication is unsuccessful (NO in step S202), and the process proceeds to step S209.

In step S203, the electronic device 12A searches the server apparatus 10 for device configuration information in which the device number of the own device is set. When the status of the search-found device configuration information is not "execution scheduled" (NO in step S204), the electronic device 12A ends the process.

When the status of the search-found device configuration information is "execution scheduled" (YES in step S204), the process proceeds to step S205, and the electronic device 12A determines whether exporting of the setting file is in progress, based on the item "setting file" in the setting file information associated with the search-found device configuration information.

When the electronic device 12A determines that the exporting of the setting file is in progress (YES in step S205), the process proceeds to step S206 where the electronic device 12A exports the setting file, and the process proceeds to step S207. Furthermore, when the electronic device 12A determines that the exporting of the setting file is not in progress (NO in step S205), the electronic device 12A skips the process of step S206.

In step S207, when the electronic device 12A confirms that data indicating "invalidation in process" is stored at the item "license key" in the application configuration information associated with the search-found device configuration information, the process proceeds to step S208. In step S208, the electronic device 12A performs a process of uninstalling the application. Furthermore, when the electronic device 12A confirms that data indicating "invalidation in process" is not stored at the item "license key" in the application configuration information associated with the search-found device configuration information, the process of step S208 is skipped.

In step S209, the electronic device 12B performs user authentication. When the user authentication is successful (YES in step S210), the process proceeds to step S211. When the user authentication is unsuccessful (NO in step S210), the process of the flowchart of FIG. 53 is ended. In step S211, the electronic device 12B searches the server apparatus 10 for device configuration information in which the status is "execution scheduled". When there is no device configuration information in which the status is "execution scheduled" (NO in step S212), the electronic device 12B ends the process of the flowchart of FIG. 53.

When there is device configuration information in which the status is "execution scheduled" (YES in step S212), the electronic device 12B accepts a selection of device configuration information from the user (step S213), and registers the device in the server apparatus 10 (step S214). After step S214, the electronic device 12B performs the processes of step S215 and onward.

In step S215, the electronic device 12B determines whether to install the application. When the electronic device 12B determines to install the application (YES in step S215), the process proceeds to step S216, and the electronic device 12B performs a process of installing the application. Conversely, when the electronic device 12B determines not to install the application (NO in step S215), the electronic device 12B skips the process of step S216.

In step S217, the electronic device 12B determines whether to transfer the setting values. When the electronic device 12B determines to transfer the setting values (YES in step S217), the electronic device 12B performs a process of applying the setting file acquired from the server apparatus 10, and ends the process. Conversely, when the electronic device 12B determines not to transfer the setting values (NO in step S217), the electronic device 12B skips the process of step S218 and ends the process.

When the device number of the electronic device 12B that is the copy destination is known in advance, for example, similar to the case of the operation scenario illustrated in FIG. 36, the device configuration information may be managed in association with the device number, and the application may be installed according to device authentication. In this case, an input field for inputting a device number is provided in the device configuration information copy screen of FIG. 40, and the device number of the electronic device 123 that is the copy destination is stored at the time point of copying the device configuration information.

Overview—First Embodiment

As described above, according to the first embodiment, the operation of installing an application and the operation of applying a setting file with respect to the electronic device 12 can be easily performed.

Second Embodiment

In the first embodiment, the application and the setting values are handled as synchronization target data per individual device. In a second embodiment, an address book is also handled as synchronization target data per individual device. In the second embodiment, by a mechanism similar to that of the first embodiment, in the new electronic device 12A and in the electronic device 125 provided for the purpose of replacement or addition, an address book is installed, transferred, or copied. Note that in the following, descriptions of the same parts as the first embodiment are omitted.

System Configuration—Second Embodiment

The system configuration of the information processing system 1 according to the second embodiment is the same as that of the first embodiment. However, the information processing system 1 according to the second embodiment may include a Lightweight Directory Access Protocol (LDAP) server, an authentication server, or a mail server.

The electronic device 12 is a device such as an image forming apparatus using an address book. In the second embodiment, the electronic device 12 uses an address book downloaded from the server apparatus 10. The controller registers, in the server apparatus 10, the device configuration information and address book configuration information described below, from the controller client apparatus 14. Furthermore, the controller copies the device configuration information and the address book configuration information from the controller client apparatus 14 as described below.

The controller registers the device configuration information and the address book configuration information in the server apparatus 10, and therefore in the information processing system 1 of FIG. 1, the process of installing of an address book in the electronic device 12 is facilitated, as described below. Furthermore, the controller copies the device configuration information and the address book configuration information, and therefore in the information processing system 1 of FIG. 1, the process of installing of an address book in the electronic device 12 provided for the purpose of replacement or addition is facilitated, as described below.

Functional Configuration—Second Embodiment

Next, a description is given of a functional configuration of the information processing system 1 according to the second embodiment.

Server Apparatus—Second Embodiment

Figure 54:
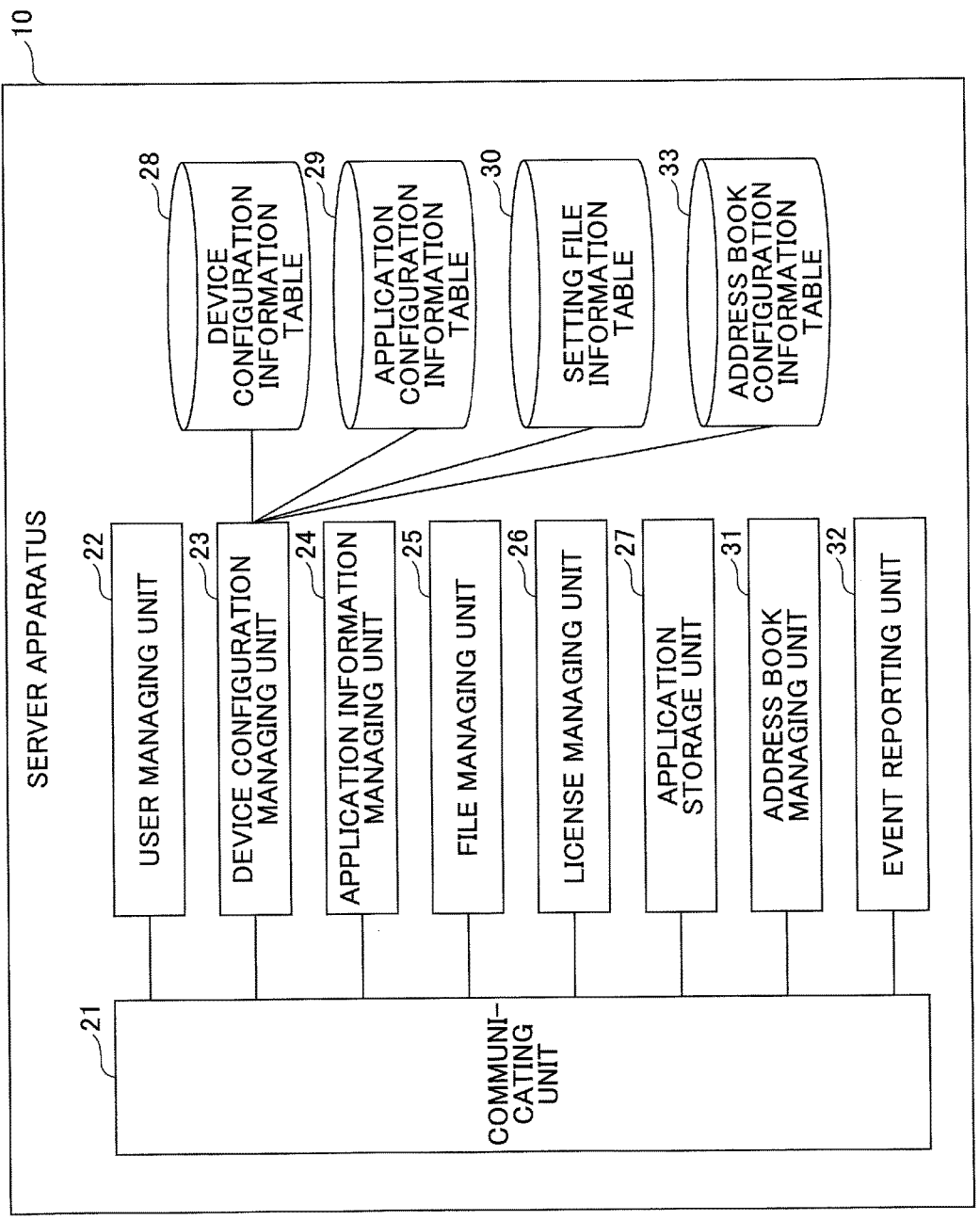
FIG. 54 is a functional block diagram of another example of the server apparatus according to a second embodiment of the present invention.

FIG. 54 is a functional block diagram of another example of the server apparatus 10 according to the present embodiment. In the server apparatus 10 of FIG. 54, an address book managing unit 31, an event reporting unit 32, and an address book configuration information table 33 are added to the configuration of the server apparatus 10 of FIG. 4.

The device configuration managing unit 23 manages device configuration information, application configuration information, setting file information, and address book configuration information. The address book managing unit 31 manages an address book. The event reporting unit 32 accepts event registration, such as changing user information, from an authentication server, and reports the event registration to the address book managing unit 31.

The address book configuration information table 33 stores address book configuration information as illustrated in FIG. 55. FIG. 55 is a configuration diagram of an example of address book configuration information. The address book configuration information of FIG. 55 includes the items of a device configuration information ID, an address book ID, and a status.

The item "device configuration information ID" is an example of information for uniquely identifying device configuration information that is a record in the device configuration information table. The item "address book ID" is an example of information for uniquely identifying an address book. The item "status" expresses the status of the address book, such as preparation in progress, preparation completed, execution in progress, and completed, etc.

By registering an address book, new address book configuration information associated with a device configuration information ID, is registered in the address book configuration information table 33. Note that a plurality of address books may be registered with respect to a device configuration information ID.

Controller Client Apparatus—Second Embodiment

Figure 56:
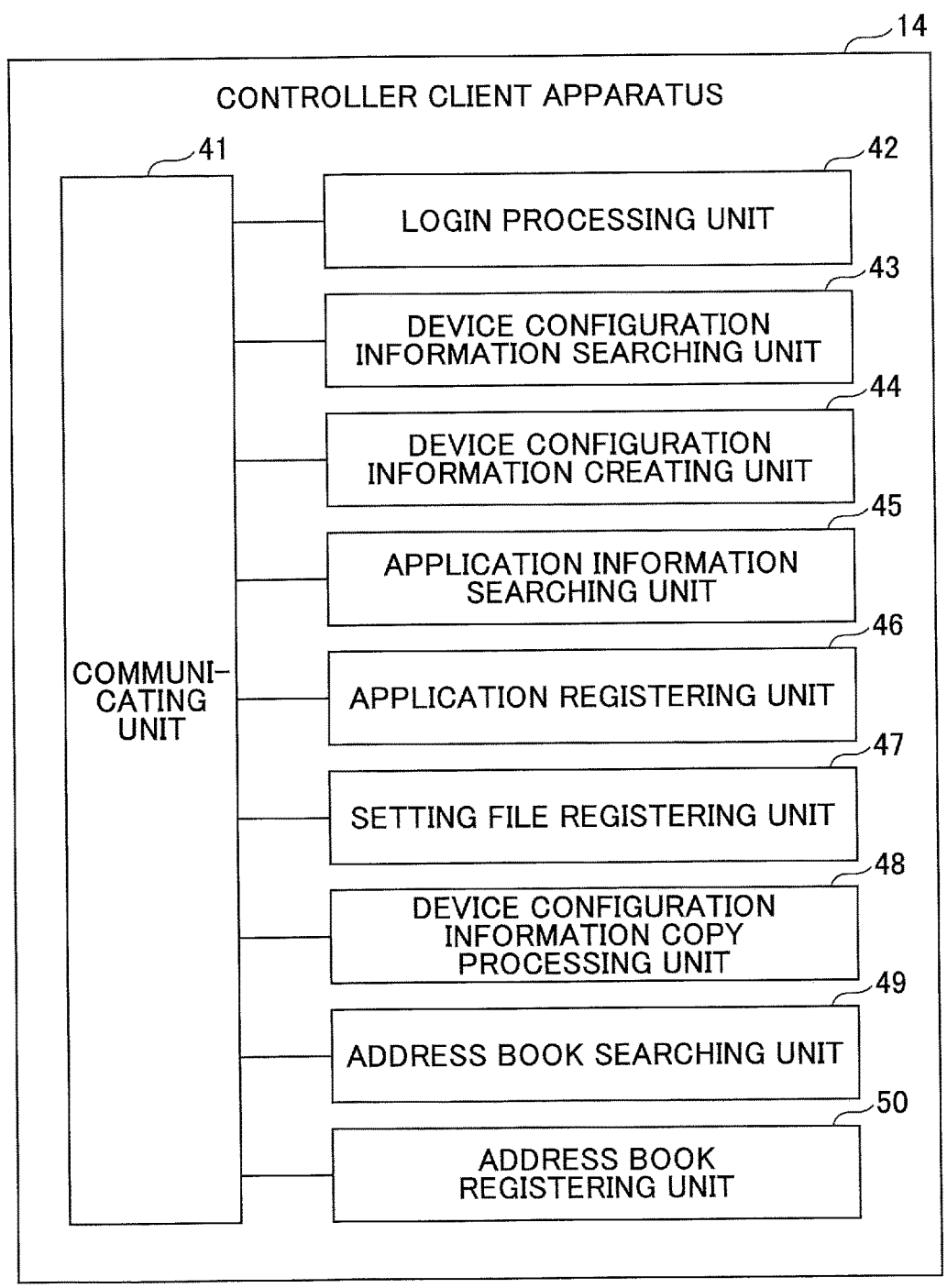
FIG. 56 is a functional block diagram of another example of the controller client apparatus according to the second embodiment of the present invention.

FIG. 56 is a functional block diagram of another example of the controller client apparatus 14 according to the present embodiment. In the controller client apparatus 14 of FIG. 56, an address book searching unit 49 and an address book registering unit 50 are added to the configuration of the controller client apparatus 14 of FIG. 10. The address book searching unit 49 searches for an address book registered in the server apparatus 10. The address book registering unit 50 registers an address book in the server apparatus 10.

Electronic Device—Second Embodiment

Figure 57:
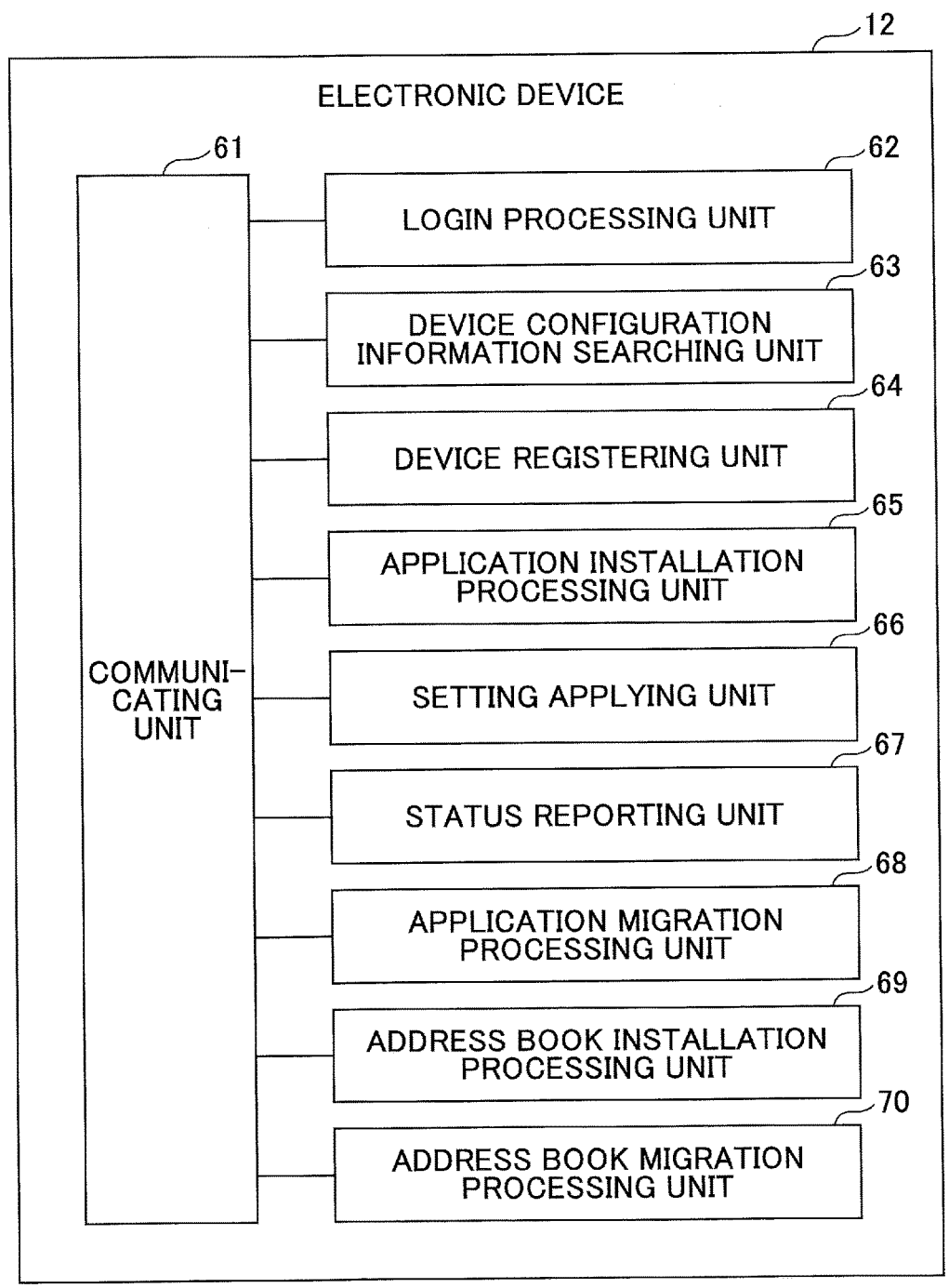
FIG. 57 is a functional block diagram of another example of the electronic device according to the second embodiment of the present invention.

FIG. 57 is a functional block diagram of another example of the electronic device 12 according to the present embodiment. In the electronic device 12 of FIG. 57, an address book installation processing unit 69 and an address book migration processing unit 70 are added to the configuration of the electronic device 12 of FIG. 11. The address book installation processing unit 69 performs a process of installing an address book in the electronic device 12.

The address book migration processing unit 70 performs an address book migration process of installing an address book in the electronic device (copy destination) provided for the purpose of replacement or addition, such that the electronic device 12 (copy destination) is in the same status as the electronic device 12 (copy source) that is already operating.

Process Details—Second Embodiment

Next, a description is given of details of processes of the information processing system 1 according to the second embodiment. In the second embodiment, an address book is installed in the electronic device 12. In the second embodiment, a description is given of an operation scenario in which the operator associates device configuration information and address book configuration information (hereinafter referred to as "device configuration information, etc.") with a tenant, and the device configuration information, etc., is used for installing an address book in the electronic device 12.

The controller logs into the server apparatus 10 from the controller client apparatus 14, and registers the device configuration information, etc., in the server apparatus 10 in association with a tenant. The operator performs an operation of installing an address book in the electronic device 12 in the user environment. The operator operates the electronic device 12 to log into the server apparatus 10. The electronic device 12 specifies the tenant and acquires the device configuration information, etc., from the server apparatus 10, and acquires and installs an address book based on the acquired device configuration information, etc.

In the following, a description is given of a registration operation of registering the device configuration information, etc., that is performed in advance at the controller client apparatus 14 by the controller, and an installation operation of installing an address book performed at the electronic device 12 in the user environment by the operator, with respect to the operation scenario of installing an address book.

Figure 58:
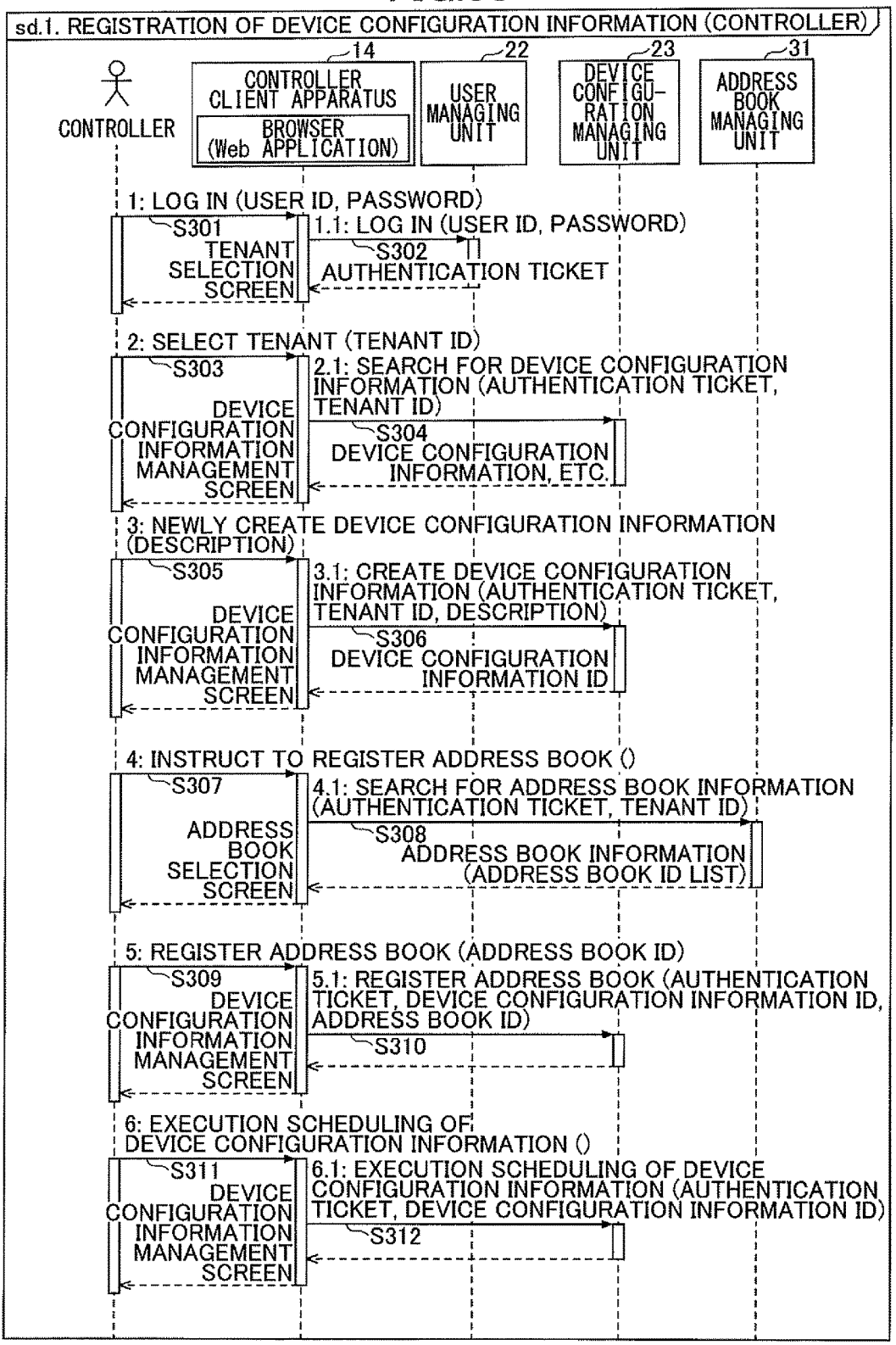
FIG. 58 is a sequence diagram of an example of a registration operation of device configuration information, etc., according to the second embodiment of the present invention.

Registration Operation of Device Configuration Information, Etc.—Second Embodiment FIG. 58 is a sequence diagram of an example of a registration operation of device configuration information, etc. (device registration). The processes of steps S301 through S306 are the same as steps S11 through S16 of FIG. 13. The device configuration information creating unit 44 of the controller client apparatus 14, which has received the returned device configuration information, etc., displays a device configuration information management screen.

When there is no device configuration information that is associated with the tenant ID, the device configuration information creating unit 44 of the controller client apparatus 14 displays a device configuration information management screen, for example, as illustrated in FIG. 59A. FIG. 59A is an image diagram of an example of a device configuration information management screen including device configuration information.

The device configuration information displayed in the device configuration information management screen of FIG. 59A has been newly created, and therefore the item "status" indicates preparation in progress. Furthermore, the device configuration information displayed in the device configuration information management screen of FIG. 59A has been newly created, and therefore the item "application", the item "address book", and the item "setting" are not registered. Therefore, a "register" link is displayed in the item "application", the item "address book", and the item "setting" in the device configuration information management screen of FIG. 59A.

In step S307, the controller presses the "register" link in the address book item in FIG. 59A, to give an instruction to register an address book. In step S308, the address book searching unit 49 of the controller client apparatus 14 specifies the tenant ID and requests the address book managing unit 31 of the server apparatus 10 to search for the address book.

The address book managing unit 31 of the server apparatus 10 returns address book information including an address book ID, to the controller client apparatus 14. Note that the address book information returned to the controller client apparatus 14 may be address book information of an address book for which the controller has the authority to register.

The address book registering unit 50 of the controller client apparatus 14, which has received the returned address book configuration information, displays an address book selection screen, for example, as illustrated in FIG. 60. FIG. 60 is an image diagram of an example of an address book selection screen. The address book registering unit 50 displays the address book ID included in the address book information returned from the server apparatus 10, in a list at "sharable address books" in the address book selection screen. Note that when the address book information includes the name and the description of the address book, the address book registering unit 50 may display the name and the description of the address book in the address book selection screen. The controller can operate the address book selection screen of FIG. 60 to select an address book ID from the address book ID list displayed in the list at "sharable address books".

In step S309, the controller presses the "register" button in the address book selection screen in a status where the address book ID is selected in the address book ID list, to make a request to register the address book.

In step S310, the address book registering unit 50 of the controller client apparatus 14 specifies the device configuration information ID and the address book ID, and requests the device configuration managing unit 23 of the server apparatus 10 to register the address book. The device configuration managing unit 23 adds a record to the address book configuration information table 33 illustrated in FIG. 55, based on the request to register the address book from the controller client apparatus 14.

For example, when the "register" button is pressed in a status where an address book ID "Address_002" is selected among the address book IDs included in the address book ID list in the address book selection screen of FIG. 60, the device configuration managing unit 23 adds three records as illustrated in FIG. 55.

After making the request to register the address book in step S310, the device configuration information creating unit 44 of the controller client apparatus 14 causes the device configuration information management screen of FIG. 59A to transition to the device configuration information management screen of FIG. 59B.

FIG. 59B is an image diagram of an example of a device configuration information management screen after the process of registering the address book has ended. In the device configuration information management screen of FIG. 59B, the address book ID registered in step S310 is displayed at the item "address book" in the device configuration information.

Furthermore, in the device configuration information management screen of FIG. 59B, the item "status" has transitioned from preparation in progress to preparation completed. The controller can press the "register" link at application and settings in the device configuration information management screen, to register the application and the setting file by the same procedures as those of the first embodiment.

Then, in step S311, the controller presses the "schedule" button in the device configuration information management screen of FIG. 59B, to make a request for execution scheduling for the registered device configuration information. When the "schedule" button is pressed, the process proceeds to step S312, and the device configuration information creating unit 44 specifies the device configuration information ID and requests the device configuration managing unit 23 of the server apparatus 10 to make an execution scheduling. The device configuration managing unit 23 causes the "status" in the device configuration information associated with the device configuration information ID to transition from preparation completed to execution scheduled.

When the process of the sequence diagram illustrated in FIG. 58 is ended, the controller client apparatus 14 causes the device configuration information management screen to transition to a device configuration information management screen in which the item "status" indicates execution scheduled and a "release scheduling" button is displayed at the item "operation".

Operation of Installing Address Book—Second Embodiment

Figure 61:
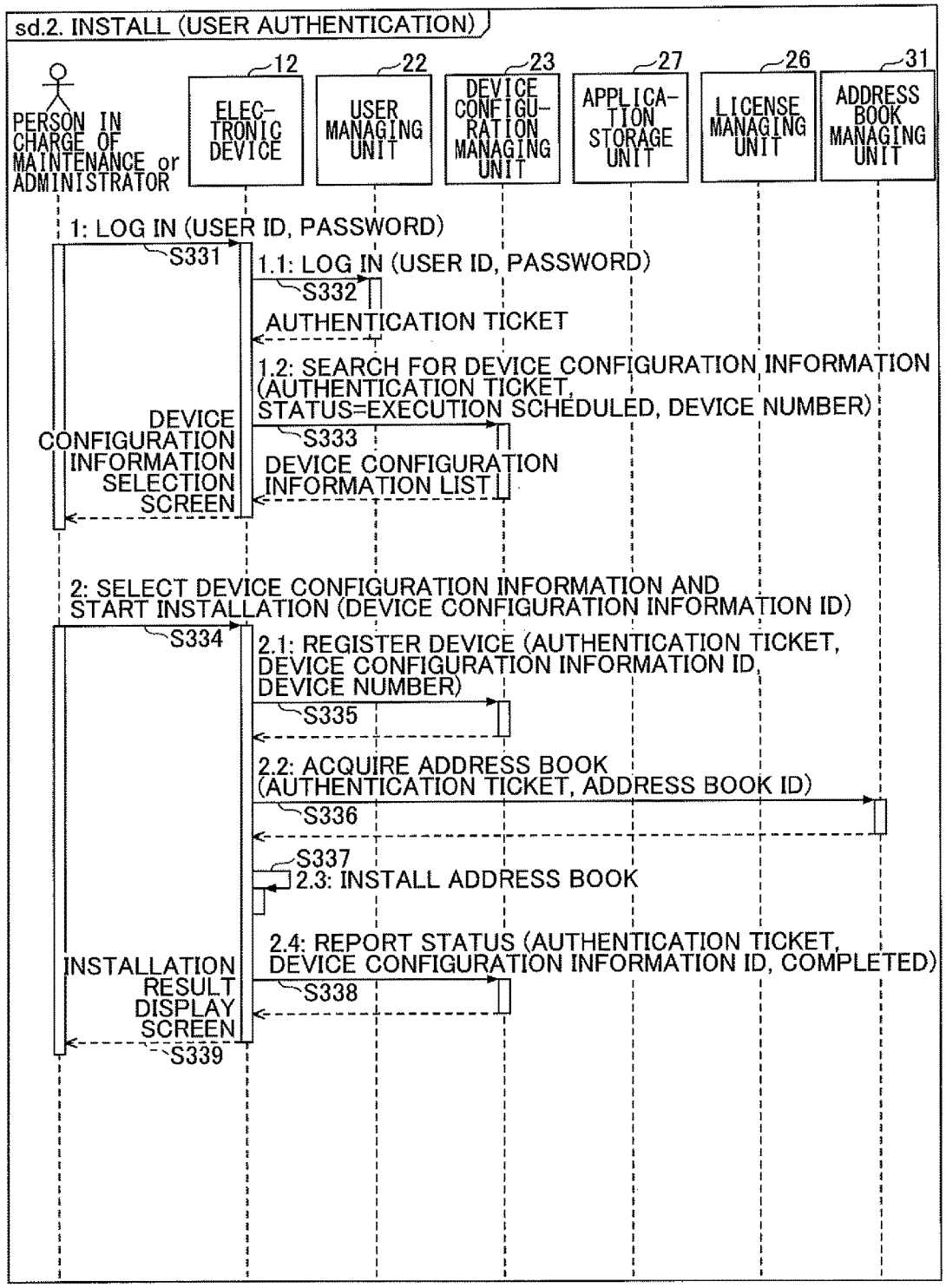
FIG. 61 is a sequence diagram of an example of an operation of installing an address book according to the second embodiment of the present invention.

FIG. 61 is a sequence diagram of an example of an operation of installing an address book. The processes of steps S331 through S333 are the same as steps S31 through S33 of FIG. 26. The device registering unit 64 of the electronic device 12, which has received the returned device configuration information list, displays a device configuration information selection screen, for example, as illustrated in FIG. 62. FIG. 62 is an image diagram of an example of a device configuration information selection screen.

In step S334, the operator of the electronic device 12 presses an "install" button in the device configuration information selection screen of FIG. 62, etc., to select device configuration information and request to start the installing of an address book. Note that when device configuration information can be uniquely identified as in the device configuration information selection screen of FIG. 62, the installing of an address book may be automatically started without displaying an "install" button.

Furthermore, even when a plurality of device configuration information items are registered, when the description and the address book are the same, one of the device configuration information items may be automatically selected and the installing of the address book may be automatically started, without displaying an "install" button.

A typical case is a case in which a plurality of the electronic devices 12, which are used for the same purpose, are delivered at once.

After starting to install the address book, if a device number is not registered in the device configuration information selected by the operator, in step S335, the device registering unit 64 of the electronic device 12 requests the device configuration managing unit 23 of the server apparatus 10 to register the electronic device 12. In the request to register the electronic device 12 of step S335, the device registering unit 64 specifies the device number of the electronic device 12 and the device configuration information ID of the device configuration information in which the device number is to be registered, and requests to register the device number. The device configuration managing unit 23 registers the device number of the electronic device 12 in the device configuration information having the specified device configuration information ID. Furthermore, the device configuration managing unit 23 updates the status in the specified device configuration information to "execution in progress".

Next, in step S336, the address book installation processing unit 69 of the electronic device 12 specifies the address book ID of the device configuration information selected by the operator in step S334, and acquires the address book from the address book managing unit 31 of the server apparatus 10. The device configuration managing unit 23 updates the status in the address book configuration information associated with the specified address book ID, to "execution in progress".

In step S337, the address book installation processing unit 69 installs the address book acquired from the server apparatus 10. In step S338, the status reporting unit 67 of the electronic device 12 reports the status "completed" to the device configuration managing unit 23 of the server apparatus 10. The device configuration managing unit 23 updates the status of the specified device configuration information to "completed".

Furthermore, the device configuration managing unit 23 updates the status of the address book configuration information associated with the specified device configuration information ID, to "completed". Subsequently, in step S339, the electronic device 12 displays an installation result display screen on the operation panel, and completes the operation of installing the address book.

Here, a description is given of the operation scenario in which the controller associates the device configuration information with a tenant, and the device configuration information is used to install an address book in the electronic device 12; however, the device configuration information may be associated with a device number. Furthermore, here, a description is given of an example of installing an address book; however, the operations of transferring or copying an address book may be implemented in a similar manner.

It is to be noted that there is a case where an address book is used for specifying the transmission destination of electronic data in the electronic device 12, or a case where an address book is used as an account when logging in. That is, an address book is not merely data that is the target of backup and/or restoring; an address book may be used as an account for logging into various services.

Figure 63:
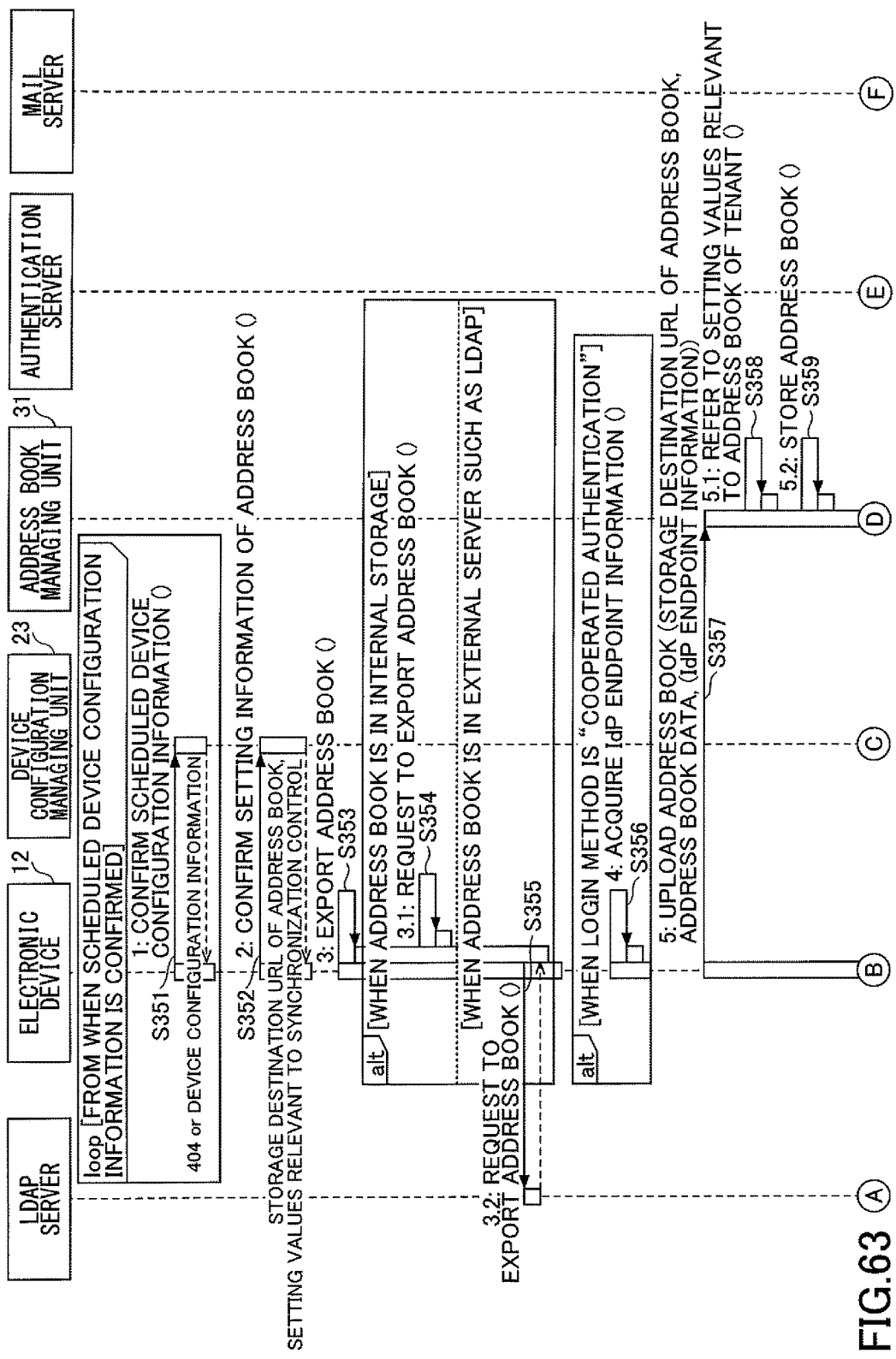
FIG. 63 is a sequence diagram of an example of a process of synchronizing an address book, which is installed in the electronic device, with an authentication server according to the second embodiment of the present invention (1/2)
Figure 64:
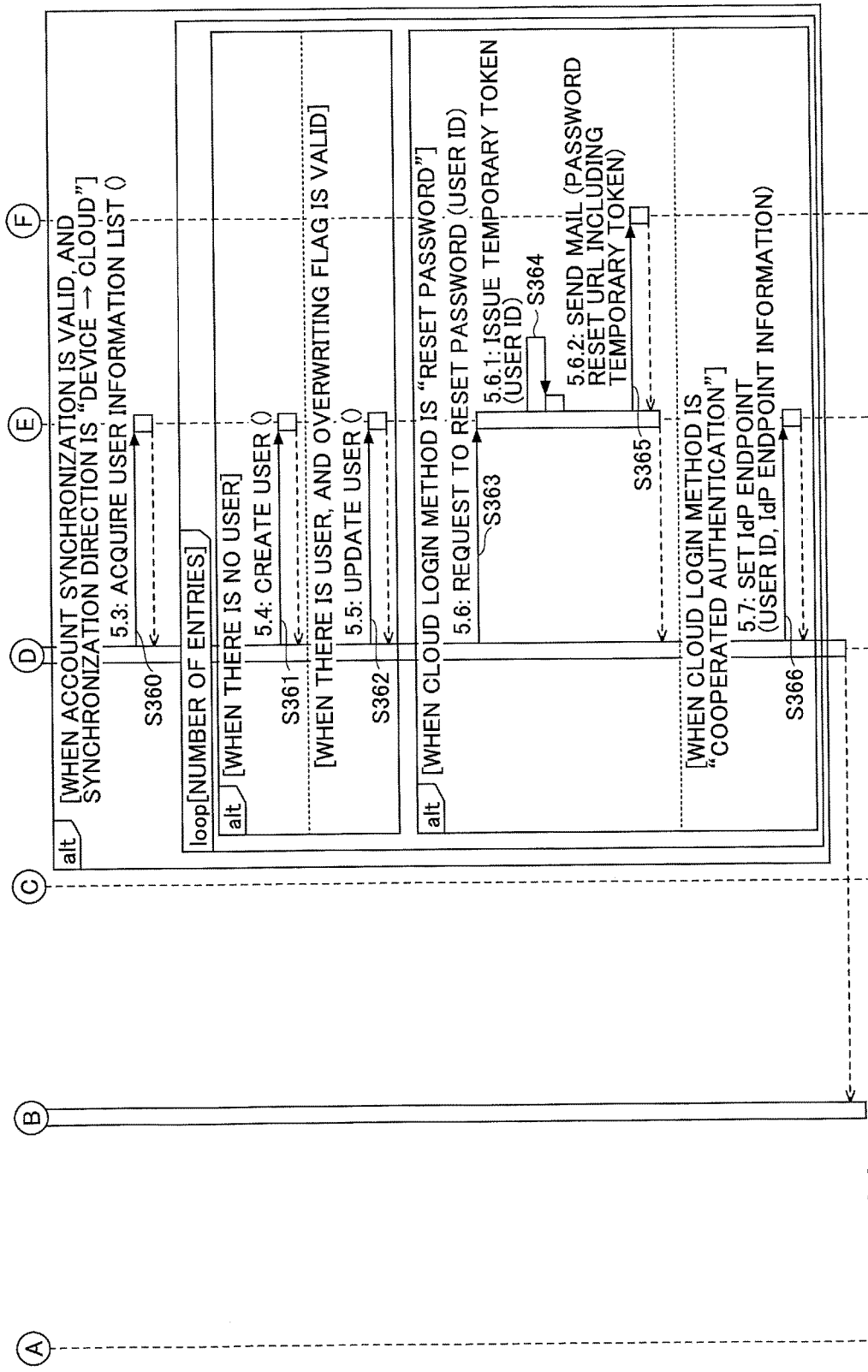
FIG. 64 is a sequence diagram of an example of a process of synchronizing an address book, which is installed in the electronic device, with an authentication server according to the second embodiment of the present invention (2/2)

In the information processing system 1 according to the second embodiment, an address book, which is installed in the electronic device 12, may be synchronized with an authentication server, as illustrated in FIGS. 63 and 64. FIGS. 63 and 64 indicate a sequence diagram of an example of a process of synchronizing an address book, which is installed in the electronic device 12, with an authentication server.

When the electronic device 12 confirms the device configuration information for which execution is scheduled, the process proceeds from step S351 to step S352, and the electronic device 12 identifies an address book ID from the address book configuration information associated with the confirmed device configuration information. The electronic device 12 confirms the setting information of the identified address book ID, and acquires the storage destination Uniform Resource Locater (URL) of the address book and setting values relevant to synchronization control, from the server apparatus 10. The setting values relevant to synchronization control include validation/invalidation of account synchronization, the synchronization direction, and validation/invalidation of an overwriting flag at the time of synchronization.

In step S353, the electronic device 12 exports the address book. When the address book is in an internal storage of the electronic device 12, in step S354, the electronic device 12 performs a process of exporting the address book. When the address book is in an external server such as an LDAP server, the electronic device 12 requests the external server to perform a process of exporting the address book (step S355).

Furthermore, when the login method is cooperated authentication, the electronic device 12 acquires identity provider (IdP) endpoint information (step S356). In step S357, the electronic device 12 specifies the storage destination URL of the address book, address book data, and IdP endpoint information, and uploads the address book to the address book managing unit 31 of the server apparatus 10.

In step S358, the address book managing unit 31 refers to the setting values relevant to the address book of the tenant, and in step S359, the address book managing unit 31 stores the address book. When the account synchronization is valid and the synchronization direction is from the electronic device 12 to the authentication server, in step S360, the address book managing unit 31 acquires a user information list from the authentication server.

The processes of steps S360 and onward are repeated for a number of times corresponding to the number of user information items (entries). When the user included in the address book is not in the user information list of the authentication server, in step S361, the address book managing unit 31 requests the authentication server to create a user, to synchronize the user accounts.

When the user included in the address book is in the user information list of the authentication server, but the overwriting flag at the time of synchronization is valid, in step S362, the address book managing unit 31 requests the authentication server to perform user update, to synchronize the user accounts.

Note that when the passwords cannot be synchronized, in step S363, the address book managing unit 31 specifies a user ID, and requests the authentication server to reset a password. In step S364, the authentication server issues a temporary token in association with the user ID.

In step S365, the authentication server requests the mail server to send a mail to the user. The mail to be sent to the user includes a password reset URL including the temporary token. The user, who has received the mail, accesses the password reset URL including the temporary token, and sets a password. Furthermore, when the passwords cannot synchronized, in step S366, the address book managing unit 31 may perform cooperated authentication by using the electronic device 12 as the IdP endpoint.

Furthermore, in the information processing system 1 according to the second embodiment, as illustrated in FIG. 65, the address book, which is installed in the electronic device 12, may be synchronized with the authentication server. FIG. 65 is a sequence diagram of another example of the process of synchronizing the address book installed in the electronic device 12 with the authentication server. In the process of the sequence diagram of FIG. 65, the address book in the electronic device 12 is synchronized with the user information in the authentication server.

For example, in step S381, the controller changes the user information of the authentication server. In step S382, the authentication server reports the change, which is made to the user information, as an event, to the event reporting unit 32 of the server apparatus 10. In step S383, the event reporting unit 32 reports, to the address book managing unit 31, that a change has been made to the user information at the authentication server. In step S384, the address book managing unit 31 refers to setting values relevant to synchronization control.

When the account synchronization is valid and the synchronization direction is from the authentication server to the electronic device 12, in step S385, the address book managing unit 31 updates the address book by the user information that has been changed at the authentication serer.

In step S386, the device configuration managing unit 23 detects the change to the address book made by the address book managing unit 31. The process of step S386 may be performed by having the device configuration managing unit 23 send a query to the address book managing unit 31 at predetermined time intervals, or by having the address book managing unit 31 send a report to the device configuration managing unit 23.

In step S387, the device configuration managing unit 23 creates device configuration information, etc., for applying the address book to the electronic device 12. Then, in step S388, the device configuration managing unit 23 changes the status of the created device configuration information to "execution scheduled". Subsequently, by the above-described operation of installing the address book, the change made to the user information at the authentication server is applied to the address book of the electronic device 12.

Overview—Second Embodiment

As described above, according to the second embodiment, the operations of installing, transferring, and copying an address book to the electronic device 12 can be easily performed, and an address book can be shared among a plurality of the electronic devices 12 in the tenant. Furthermore, according to the second embodiment, an address book, which is used by a plurality of the electronic devices 12 in the tenant, can be aligned with an authentication platform.

According to one embodiment of the present invention, an information processing system is provided, by which an application can be easily installed in an electronic device.

The information processing system and the application installation method are not limited to the specific embodiments described in the detailed description, and variations and modifications may be made without departing from the spirit and scope of the present invention.

The server apparatus 10 is an example of the at least one information processing apparatus. The device configuration managing unit 23 is an example of the managing of a configuration information item. The application storage unit 27 is an example of the storing of an application. The device configuration information searching unit 63 is an example of the acquiring of the configuration information item. The application installation processing unit 65 and the application migration processing unit 68 are examples of the installing of the application. The tenant ID is an example of organization identification information. The device number is an example of device identification information. The device configuration in formation having in a status where the execution is scheduled is an example of the configuration information item for which status information is indicating a status in which execution of the configuration information item is scheduled.

What is claimed is:

1. An information processing system for installing an application, the information processing system comprising:
   at least one information processing apparatus; and
   at least one electronic device, wherein
   the at least one information processing apparatus includes a processor, in communication with a memory, executing a process including:
      managing a configuration information item required for installing the application in the at least one electronic device,
         the configuration information item including a list of one or more applications to be installed, license information required for installing the application, and a status information item, managed in association with each other,
         the status information item indicating that the configuration information item is not scheduled to be applied to the at least one electronic device,
         the configuration information item being registered in the at least one information processing apparatus according to an operation input via a user interface of the at least one information processing apparatus in a preliminary operation before the application is installed; and
      receiving an operation that causes the status information item to transition from indicating that the configuration information item is not scheduled to be applied to the at least one electronic device, to indicating that the configuration information item is scheduled to be applied to the at least one electronic device and indicating that the configuration information is made public to the at least one electronic device, and
      storing the application, and wherein
   the at least one electronic device includes a processor, in communication with a memory, executing a process including:
      acquiring, from the at least one information processing apparatus over a communication network, the configuration information item including the status information item indicating that the configuration information item is scheduled to be applied to the at least one electronic device, the configuration information item being acquired from the at least one information processing apparatus in response to an operation input via a user interface of the at least one electronic device; and
      installing, in the at least one electronic device, the application acquired from the at least one information processing apparatus according to the acquired configuration information item; and wherein the received operation causes the status information item to transition from indicating that the configuration information item is not scheduled to be applied to the at least one electronic device, to indicating that the configuration information item is scheduled to be applied to the at least one electronic device and indicating that the configuration information is made public to the at least one electronic device.

2. The information processing system according to claim 1, wherein the acquiring of the configuration information item from the at least one information processing apparatus becomes possible only after the status information item transitions from indicating that the configuration information item is not scheduled to be applied to the at least one electronic device, to indicating that the configuration information item is scheduled to be applied to the at least one electronic device.

3. The info illation processing system according to claim 1, wherein
the managing of the configuration information item includes managing organization identification information for uniquely identifying an organization, in association with the configuration information item, and
the acquiring of the configuration information item includes specifying the organization identification information, and acquiring the configuration information item managed in association with the specified organization identification information from the at least one information processing apparatus.

4. The information processing system according to claim 3, wherein
the managing of the configuration information item includes managing a plurality of the configuration information items in association with the organization identification information,
the acquiring of the configuration information item includes specifying the organization identification information, acquiring the plurality of the configuration information items managed in association with the specified organization identification information, and prompting an operator to select one of the plurality of the configuration information items, and
the installing of the application includes installing the application, which has been acquired from the at least one information processing apparatus according to the configuration information item selected by the operator.

5. The information processing system according to claim 4, wherein the acquiring of the configuration info Illation item includes displaying information by which the operator can distinguish the application, on a screen in which the operator selects one of the plurality of the configuration information items.

6. The information processing system according to claim 4, wherein
the managing of the configuration information item includes managing information by which the operator can distinguish the at least one electronic device in which the configuration information item is to be used, the information being included in and associated with the configuration information item, and
the acquiring of the configuration information item includes displaying the information by which the operator can distinguish the at least one electronic device, on a screen in which the operator selects one of the plurality of the configuration information items.

7. The information processing system according to claim 4, wherein the managing of the configuration information item includes automatically selecting one of the plurality of the configuration information items without prompting the operator to select one of the plurality of the configuration information items, in a case where the plurality of the configuration information items have the same content.

8. The information processing system according to claim 1, wherein
the managing of the configuration information item includes managing device identification information for uniquely identifying the at least one electronic device, in association with the configuration information item, and
the acquiring of the configuration information item includes specifying the device identification information, and acquiring the configuration information item managed in association with the specified device identification information from the at least one information processing apparatus.

9. The information processing system according to claim 1, wherein
the managing of the configuration information item includes managing a setting to be applied to the at least one electronic device in which the application has been installed, the setting being included in and associated with the configuration information item, and
the at least one electronic device further executes, by the processor, a process including applying the setting to the at least one electronic device in which the application has been installed, according to the acquired configuration information item.

10. The information processing system according to claim 9, wherein
the managing of the configuration information item includes managing a setting to be applied to the application that has been installed in the at least one electronic device, the setting being included in and associated with the configuration information item, and
the at least one electronic device further executes, by the processor, a process including applying the setting to the application that has been installed in the at least one electronic device, according to the acquired configuration information item.

11. The information processing system according to claim 1, wherein
the information processing system comprises a second electronic device,
the process executed by the at least one information processing apparatus includes invalidating the license information that is registered in the at least one electronic device that is a copy source of the configuration information item, in response to a copy request including a specification to transfer the license information from the at least one electronic device that is the copy source to the second electronic device that is a copy destination, and
the second electronic device includes a processor, in communication with a memory, executing a process including installing the application, which has been acquired from the at least one information processing apparatus, according to the acquired configuration information item, in the second electronic device that is the copy destination, after the license information registered in the at least one electronic device that is the copy source is invalidated.

12. The information processing system according to claim 11, wherein the managing of the configuration information item
includes managing data indicating that the at least one
electronic device that is the copy source is exporting
setting information, the data being included in and
associated with the configuration information item, the at least one electronic device that is the copy source
further executes, by the processor, a process including
collecting the setting information of the at least one
electronic device that is the copy source, and
sending the collected setting information to the at least
one information processing apparatus, and the second electronic device that is the copy destination
further executes, by the processor, a process including
acquiring, from the at least one information processing
apparatus, the setting information of the at least one
electronic device that is the copy source, upon waiting for the exporting of the setting information to be
completed at the at least one electronic device that is
the copy source, and
changing setting information of the second electronic
device that is the copy destination.

13. The information processing system according to claim
12, wherein
the collecting of the setting information of the at least one
electronic device that is the copy source includes
collecting setting information of the application to be
installed, and
the changing of the setting information of the second
electronic device that is the copy destination includes
changing setting information of the application after the
application is installed in the electronic device that is
the copy destination.

14. The information processing system according to claim
13, wherein the invalidating of the license information that
is registered in the at least one electronic device that is the
copy source is performed upon waiting for the exporting of
the setting information to be completed at the at least one
electronic device that is the copy source, in a case where the
copy request includes the specification to transfer the license
information from the at least one electronic device that is the
copy source of the configuration information item to the
second electronic device that is the copy destination.

15. The information processing system according to claim
1, wherein
the managing of the configuration information item
includes managing information of an address book to
be installed in the at least one electronic device, the
information being included in and associated with the
configuration information item,
the at least one information processing apparatus further
executes, by the processor, a process including managing the address book, and
the at least one electronic device further executes, by the
processor, a process including installing the address
book in the at least one electronic device, according to
the acquired configuration information item.

16. The information processing system according to claim
15, wherein
the managing of the address book includes reading the
address book from the at least one electronic device
that is a copy source of the configuration information
item, and
the installing of the address book includes installing the
address book, which has been read from the at least one
electronic device that is the copy source of the configuration information item, in the second electronic
device that is a copy destination of the configuration
information item.

17. The information processing system according to claim
15, wherein the managing of the address book includes
applying a change, which is made to user information of an
authentication server, to user information of the address
book, to synchronize the user information of the authentication server with the user information of the address book.

18. The information processing system according to claim
15, wherein the managing of the address book includes
applying a change, which is made to user information of the
address book, to user information of an authentication
server, to synchronize the user information of the authentication server with the user information of the address book.

19. A method of installing an application, the method
being executed by a computer in communication with a
memory, the method being implemented in an information
processing system including at least one information processing apparatus and at least one electronic device, the
method comprising:
storing the application by the at least one information
processing apparatus;
managing, by the at least one information processing
apparatus, a configuration information item required
for installing the application in the at least one electronic device,
the configuration information item including a list of
one or more applications to be installed, license
information required for installing the application,
and a status information item, managed in association with each other,
the status information item indicating that the configuration information item is scheduled to be
applied to the at least one electronic device,
the configuration information item being registered
in the at least one information processing apparatus according to an operation input via a user
interface of the at least one information processing
apparatus in a preliminary operation before the
application is installed;
receiving, by the at least one information processing
apparatus, an operation that causes the status information item to transition from indicating that the
configuration information item is not scheduled to be
applied to the at least one electronic device, to
indicating that the configuration information item is
scheduled to be applied to the at least one electronic
device and indicating that the configuration information is made public to the at least one electronic
device, and
acquiring, by the at least one electronic device from the at
least one information processing apparatus over a communication network, the configuration information
item including the status information item indicating
that the configuration information item is scheduled to
be applied to the at least one electronic device, the
configuration information item being acquired from the
at least one information processing apparatus in
response to an operation input via a user interface of the
at least one electronic device; and
installing, in the at least one electronic device by the at
least one electronic device, the application acquired
from the at least one information processing apparatus
according to the acquired configuration information
item; and wherein the received operation causes the status information item to transition from indicating that the configuration information item is not scheduled to be applied to the at least one electronic device, to indicating that the configuration information item is scheduled to be applied to the at least one electronic device and indicating that the configuration information is made public to the at least one electronic device.

\* \* \* \* \*